US011992766B2

United States Patent
Saito et al.

(10) Patent No.: US 11,992,766 B2
(45) Date of Patent: May 28, 2024

(54) GAME SYSTEM, GAME CONTROL DEVICE INFORMATION STORAGE MEDIUM, AND METHOD OF CONTROLLING GAME SYSTEM

(71) Applicant: KONAMI DIGITAL ENTERTAINMENT CO., LTD., Tokyo (JP)

(72) Inventors: Yoshimasa Saito, Tokyo (JP); Tomohiro Nakada, Tokyo (JP); Toru Ono, Tokyo (JP); Yasunori Kobayashi, Tokyo (JP); Kazuma Tsurumoto, Tokyo (JP); Syogo Yamazaki, Tokyo (JP); Yuyaandrew Yamashita, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 217 days.

(21) Appl. No.: 17/461,970

(22) Filed: Aug. 30, 2021

(65) Prior Publication Data
US 2021/0394067 A1    Dec. 23, 2021

Related U.S. Application Data

(63) Continuation of application No. PCT/JP2020/009251, filed on Mar. 4, 2020.

(30) Foreign Application Priority Data

Mar. 4, 2019    (JP) .................................. 2019-038876

(51) Int. Cl.
*A63F 13/56*    (2014.01)
*A63F 13/57*    (2014.01)
(Continued)

(52) U.S. Cl.
CPC .............. *A63F 13/56* (2014.09); *A63F 13/57* (2014.09); *A63F 13/65* (2014.09); *A63F 13/812* (2014.09); *A63F 2300/5553* (2013.01)

(58) Field of Classification Search
CPC .......... A63F 13/56; A63F 13/57; A63F 13/65; A63F 13/812; A63F 2300/5553
See application file for complete search history.

(56) References Cited

U.S. PATENT DOCUMENTS

| 6,533,663 | B1 * | 3/2003 | Iwao | ....................... A63F 13/45 463/31 |
| 8,128,476 | B1 * | 3/2012 | Sidhu | .................. A63F 3/00643 463/16 |

(Continued)

FOREIGN PATENT DOCUMENTS

| JP | 2004283249 A | 10/2004 |
| JP | 2009247474 A | 10/2009 |

(Continued)

OTHER PUBLICATIONS

Color field, "Super Robot Wars Z III: Tengoku-hen, Perfect bible", Jun. 4, 2016, pp. 14-15, Kadokawa Dwango Corporation (See English translation of the International Search Report and the English translation of the Written Opinion of the International Searching Authority of PCT/JP2020/009251).

(Continued)

*Primary Examiner* — Malina D. Blaise
(74) *Attorney, Agent, or Firm* — HEA LAW PLLC

(57) ABSTRACT

At least one memory device of the game system that stores a plurality of instructions, which when executed by the at least one processor, cause the at least one processor to: control a motion of a user object based on first performance information, control a motion of an opponent object based on second performance information, modify performance change information associated with a target area in the (Continued)

virtual space based on a change command from the user or the opponent, change the first performance information in a case where the user object is located in the target area based on the performance change information associated with the target area, and change the second performance information in a case where the opponent object is located in the target area based on the performance change information associated with the target area.

15 Claims, 23 Drawing Sheets

(51) Int. Cl.
*A63F 13/65* (2014.01)
*A63F 13/812* (2014.01)

(56) References Cited

U.S. PATENT DOCUMENTS

| | | | | |
|---|---|---|---|---|
| 9,656,170 | B2* | 5/2017 | Ando | A63F 13/10 |
| 10,335,689 | B2* | 7/2019 | Wada | A63F 13/35 |
| 2002/0160835 | A1* | 10/2002 | Fujioka | A63F 13/822 |
| | | | | 463/31 |
| 2003/0060248 | A1* | 3/2003 | Yamashita | A63F 13/45 |
| | | | | 463/1 |
| 2004/0143852 | A1* | 7/2004 | Meyers | A63F 13/822 |
| | | | | 463/43 |
| 2008/0287196 | A1* | 11/2008 | Miki | A63F 13/335 |
| | | | | 463/42 |
| 2009/0227373 | A1* | 9/2009 | Yamamoto | A63F 13/44 |
| | | | | 463/43 |
| 2012/0046093 | A1* | 2/2012 | Yamaguchi | A63F 13/216 |
| | | | | 463/43 |
| 2012/0142429 | A1* | 6/2012 | Muller | A63F 13/69 |
| | | | | 463/42 |
| 2012/0190456 | A1* | 7/2012 | Rogers | A63F 13/60 |
| | | | | 463/42 |
| 2013/0165233 | A1* | 6/2013 | Wada | A63F 13/46 |
| | | | | 463/42 |
| 2014/0066199 | A1* | 3/2014 | Takagi | A63F 13/53 |
| | | | | 463/31 |
| 2014/0309007 | A1* | 10/2014 | Volzer | A63F 13/65 |
| | | | | 463/16 |
| 2017/0203216 | A1* | 7/2017 | Wada | A63F 13/537 |
| 2017/0228130 | A1* | 8/2017 | Palmaro | G06F 3/0482 |
| 2018/0207537 | A1* | 7/2018 | Kishimoto | A63F 13/69 |
| 2019/0247747 | A1* | 8/2019 | Choi | A63F 13/795 |
| 2020/0254344 | A1* | 8/2020 | Maruyama | A63F 13/58 |
| 2021/0016166 | A1* | 1/2021 | Nelson, Jr. | A63F 13/795 |

FOREIGN PATENT DOCUMENTS

| | | |
|---|---|---|
| JP | 2014198106 A | 10/2014 |
| JP | 2015036036 A | 2/2015 |
| JP | 2018202082 A | 12/2018 |

OTHER PUBLICATIONS

Fighting Studio, "Game Boy Advance, Perfect Strategy Series 13, Medarot G Winning Strategy, Kabuto and Kuwagata Version", Aug. 30, 2002, pp. 26-30, Futaba Publishers Ltd. (See English translation of the International Search Report and the English translation of the Written Opinion of the International Searching Authority of PCT/JP2020/009251).

International Search Report for PCT/JP2020/009251 dated Jun. 2, 2020 with English translation pp. 1-4.

Form PCT/ISA/237 with PCT/IB/338 and PCT/IB/373 for PCT/JP2020/009251 dated Sep. 16, 2021 pp. 1-10.

Office Action of Nov. 24, 2020, for relating JP application No. 2019-038874 with English translation pp. 1-5.

Office Action of Aug. 13, 2019, for relating JP application No. 2019-038875 with English translation pp. 1-3.

Office Action of Mar. 7, 2023, for corresponding JP Patent Application No. 2019-038876 with English translation, pp. 1-6.

* cited by examiner

FIG.11

| CARD ID | PLAYER NAME | POSITION | IMAGE | OVERALL ABILITY | ABILITY | | | INFLUENCE VALUE | | | | | | | COST | SKILL |
|---|---|---|---|---|---|---|---|---|---|---|---|---|---|---|---|---|
| | | | | | RUNNING | PASSING | ... | A1 | A2 | A3 | A4 | A5 | A6 | A7 | | |
| C1 | PLAYER PC1 | GK | — | 85 | 80 | 90 | ... | 0 | 0 | 0 | 0 | 2 | 0 | 1 | 4 | — |
| ... | ... | ... | ... | ... | ... | ... | ... | ... | ... | ... | ... | ... | ... | ... | ... | ... |

| SERIAL NUMBER | CARD ID |
|---|---|
| 1 | C1 |
| 2 | C11 |
| 3 | C18 |
| 4 | C2 |
| 5 | C12 |
| 6 | C3 |
| ... | ... |

| MEMBER NUMBER | CARD ID | STARTING MEMBER FLAG | POSITION NUMBER |
|---|---|---|---|
| 1 | C1 | 1 | 1 |
| 2 | C2 | 1 | 2 |
| 3 | C3 | 1 | 3 |
| ... | ... | ... | ... |
| 11 | C11 | 1 | 11 |
| 12 | C12 | 0 | |
| ... | ... | ... | ... |
| 18 | C18 | 0 | |

| ELAPSED TIME | | 25200 |
|---|---|---|
| SCORE | USER TEAM | 0 |
| | OPPONENT TEAM | 0 |

| CARD POINT | USER | 0 |
|---|---|---|
|  | OPPONENT | 1 |
| ELAPSED TIME | | 1800 |

| AREA | MOMENTUM VALUE |
|------|----------------|
| A1 | +2 |
| A2 | 0 |
| A3 | 0 |
| A4 | +1 |
| A5 | 0 |
| A6 | −2 |
| A7 | 0 |

| CHARACTER NUMBER | TEAM | CARD ID | ABILITY | | PARTICIPATION FLAG | SUBSTITUTION FLAG | POSITION NUMBER | POSITION | ORIENTATION | MOVEMENT SPEED | PLAYBACK MOTION | PLAYBACK FRAME |
|---|---|---|---|---|---|---|---|---|---|---|---|---|
| | | | ORIGINAL ABILITY | CURRENT ABILITY | | | | | | | | |
| | | | RUNNING ... | RUNNING ... | | | | | | | | |
| 101 | USER TEAM | C1 | 85 ... | 85 ... | 1 | 0 | 1 | --- | --- | --- | --- | --- |
| 102 | USER TEAM | C2 | 80 ... | 85 ... | 1 | 0 | 2 | --- | --- | --- | --- | --- |
| ... | ... | ... | ... ... | ... ... | ... | ... | ... | ... | ... | ... | ... | ... |
| 118 | USER TEAM | C18 | 75 ... | 75 ... | 0 | 0 | | --- | --- | --- | --- | --- |
| 201 | OPPONENT TEAM | C30 | 82 ... | 82 ... | 1 | 0 | 1 | --- | --- | --- | --- | --- |
| ... | ... | ... | ... ... | ... ... | ... | ... | ... | | | | | |
| 218 | OPPONENT TEAM | C25 | 70 ... | 70 ... | 0 | 0 | | | | | | |

| | CARD ID | COST | INFLUENCE VALUE (INCREASE EFFECT) | | | | | | | USAGE FLAG | ELAPSED TIME |
|---|---|---|---|---|---|---|---|---|---|---|---|
| | | | A1 | A2 | A3 | A4 | A5 | A6 | A7 | | |
| 1 | C7 | 3 | 2 | 0 | 0 | 0 | 0 | 0 | 0 | 1 | 14400 |
| 2 | C9 | 4 | 1 | 0 | 2 | 0 | 0 | 0 | 0 | 0 | 0 |
| 3 | C2 | 3 | 0 | 1 | 0 | 0 | 1 | 0 | 0 | 0 | 0 |
| 4 | C5 | 2 | 0 | 0 | 0 | 0 | 0 | 0 | 1 | 1 | 0 |
| 5 | C6 | 5 | 0 | 0 | 0 | 2 | 0 | 0 | 2 | 1 | 1800 |

| | CARD ID | COST | INFLUENCE VALUE (DECREASE EFFECT) | | | | | | | USAGE FLAG | ELAPSED TIME |
|---|---|---|---|---|---|---|---|---|---|---|---|
| | | | A1 | A2 | A3 | A4 | A5 | A6 | A7 | | |
| 1 | C30 | 3 | 0 | 0 | 0 | 1 | 0 | 0 | 1 | 1 | 3600 |
| 2 | C24 | 4 | 1 | 0 | 2 | 0 | 0 | 0 | 0 | 0 | 0 |
| 3 | C28 | 2 | 0 | 1 | 0 | 0 | 0 | 0 | 0 | 0 | 0 |
| 4 | C22 | 5 | 0 | 3 | 0 | 0 | 1 | 0 | 1 | 0 | 0 |
| 5 | C34 | 4 | 0 | 0 | 0 | 0 | 0 | 2 | 1 | 1 | 10800 |

D1057

GAME SYSTEM, GAME CONTROL DEVICE INFORMATION STORAGE MEDIUM, AND METHOD OF CONTROLLING GAME SYSTEM

CROSS-REFERENCE TO RELATED APPLICATION

This application is a continuation application of International Application PCT/JP2020/009251 filed on Mar. 4, 2020, which claims priority from Japanese application JP 2019-038876 filed on Mar. 4, 2019, the content of these applications is incorporated herein by reference in their entirety.

FIELD OF THE INVENTION

The present invention relates to a game system, a game control device, an information storage medium, and a method of controlling a game system.

DESCRIPTION OF THE RELATED ART

Games in which game objects move around in a virtual space are known. For example, an example of such a game is a sports game in which characters (an example of game objects) belonging to the user team and the opposing team play a sports match, such as soccer in a virtual space (JP2004283249A).

SUMMARY OF THE INVENTION

In the sports games described above, how the user is involved with the game objects is limited to, for example, controlling the game objects, selecting actions (e.g., commands) to be performed by the game objects, or previously setting the action guidelines (e.g., roles, strategies) for the game objects.

One or more embodiments of the present invention have been conceived in view of the above, and an object thereof is to provide a game system, a game control device, a program, and a game control method capable of providing a new way of user involvement with game objects.

In order to solve the above described problems, a game system according to an aspect of the present invention executes a game in which a user and an opponent play against each other, where a user object, which is a game object used by the user, and an opponent object, which is a game object used by the opponent, move in a virtual space. The game system includes at least one processor, and at least one memory device that stores a plurality of instructions, which when executed by the at least one processor, cause the at least one processor to: control a motion of the user object based on first performance information relating to a performance of the user object; control a motion of the opponent object based on second performance information relating to a performance of the opponent object; modify performance change information relating to a change of the first performance information and the second performance information based on a change command from the user or the opponent, the performance change information being associated with a target area in the virtual space; change the first performance information when the user object is located in the target area, based on the performance change information associated with the target area; and change the second performance information when the opponent object is located in the target area based on the performance change information associated with the target area.

A game control device according to an aspect of the present invention executes a game in which a user and an opponent play against each other, where a user object, which is a game object used by the user, and an opponent object, which is a game object used by the opponent, move in a virtual space. The game control device includes at least one processor; and at least one memory device that stores a plurality of instructions, which when executed by the at least one processor, cause the at least one processor to: control a motion of the user object based on first performance information relating to a performance of the user object; control a motion of the opponent object based on second performance information relating to a performance of the opponent object; modify performance change information relating to a change of the first performance information and the second performance information based on a change command from the user or the opponent, the performance change information being associated with a target area in the virtual space; change the first performance information when the user object is located in the target area based on the performance change information associated with the target area; and change the second performance information when the opponent object is located in the target area based on the performance change information associated with the target area.

A game control method according to an aspect of the present invention is a control method in which a user and an opponent play against each other, where a user object, which is a game object used by the user, and an opponent object, which is a game object used by the opponent, move in a virtual space. The method includes controlling a motion of the user object based on first performance information relating to a performance of the user object, controlling a motion of the opponent object based on second performance information relating to a performance of the opponent object, modifying performance change information relating to a change of the first performance information and the second performance information based on a change command from the user or the opponent, the performance change information being associated with a target area in the virtual space, changing the first performance information when the user object is located in the target area based on the performance change information associated with the target area, and changing the second performance information when the opponent object is located in the target area based on the performance change information associated with the target area.

BRIEF DESCRIPTION OF THE DRAWINGS

FIG. 11 is a diagram showing an example of card list data;

FIG. 12 is a diagram showing an example of owned card list data;

FIG. 13 is a diagram showing an example of member data;

FIG. 14 is a diagram showing an example of progress data;

FIG. 15 is a diagram showing an example of card point data;

FIG. 16 is a diagram showing an example of momentum value data;

FIG. 17 is a diagram showing an example of character status data;

FIG. 18 is a diagram showing an example of first card usage status data;

FIG. 19 is a diagram showing an example of second card usage status data;

DETAILED DESCRIPTION OF THE INVENTION

Embodiments of the present invention will be described below with reference to the accompanying drawings.

Figure 1:
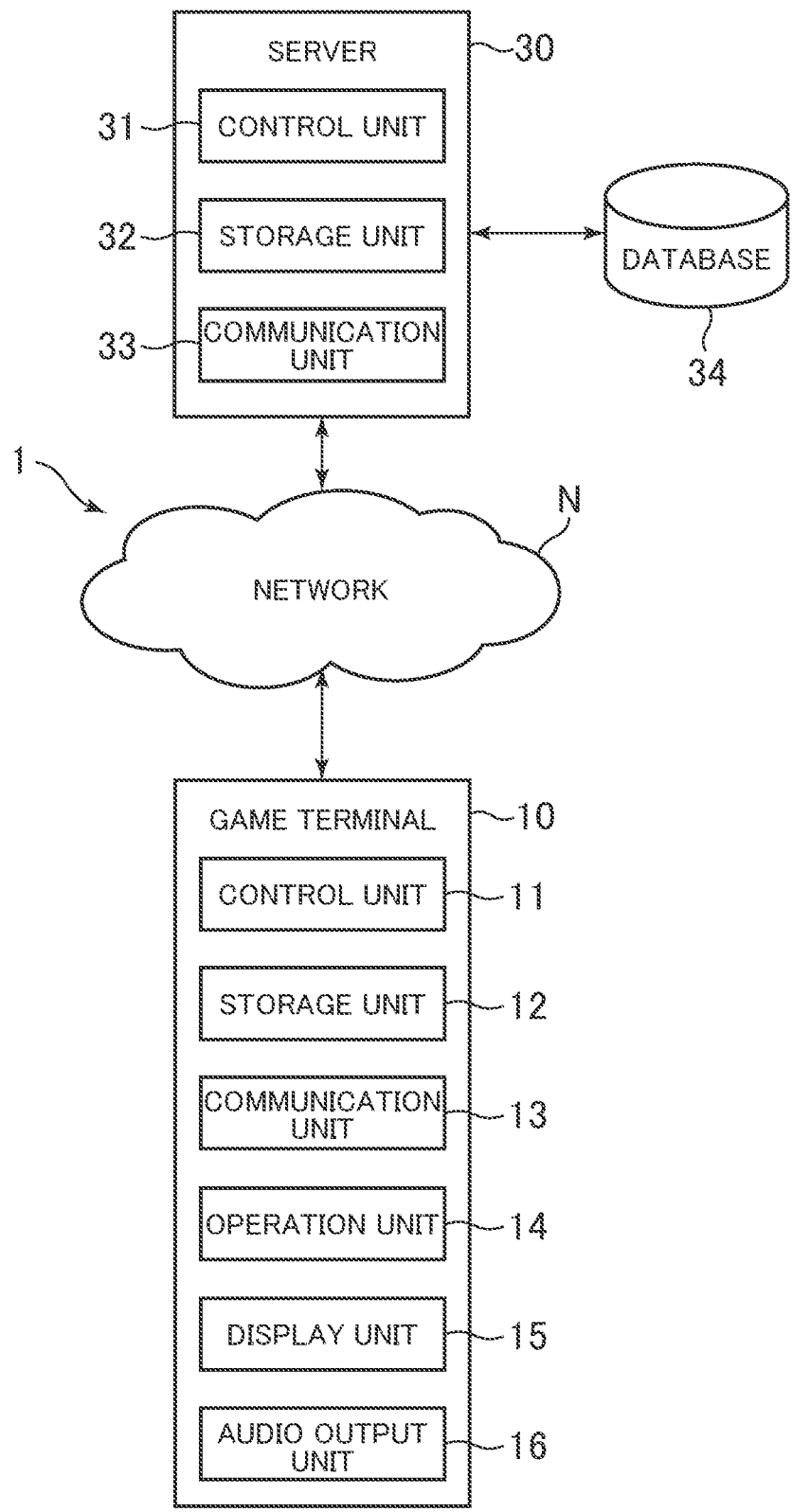
FIG. 1 is a diagram illustrating an example of an overall configuration of a game system according to an embodiment of the present invention.

[1. Configuration of game system] FIG. 1 shows an example of an overall configuration of a game system 1 according to an embodiment of the present invention. As shown in FIG. 1, the game system 1 of this embodiment includes a game terminal 10 and a server 30.

A game terminal 10 is a computer used by users to play games. For example, the game terminal 10 is a mobile phone (including a smartphone), a mobile information terminal (including a tablet computer), a desktop computer, a laptop computer, a consumer game machine (a stationary game machine), a portable game machine, or an arcade game machine. FIG. 1 shows one game terminal 10, although the game system 1 may include a plurality of game terminals 10 respectively used by a plurality of users.

As shown in FIG. 1, the game terminal 10 includes a control unit 11, a storage unit 12, a communication unit 13, an operation unit 14, a display unit 15, and an audio output unit 16. The control unit 11 includes at least one microprocessor (CPU) and executes information processing according to programs stored in the storage unit 12. The storage unit 12 includes a main storage unit (e.g., RAM) and an auxiliary storage unit (e.g., non-volatile drive), and stores programs and data. The communication unit 13 is used for data communication with other devices via a communication network N. The game terminal 10 is capable of communicating with the server 30 or other game terminal 10 (not shown) via the network N.

The operation unit 14 is used by users to perform operations. The display unit 15 is for displaying images, such as a liquid crystal display and an organic EL display. The audio output unit 16 is for outputting audio data, such as a speaker or headphones.

FIG. 1 shows the operation unit 14 and the display unit 15 separately, although the operation unit 14 and the display unit 15 may be integrally formed as a touch panel. In this regard, it is not necessary to integrate the operation unit 14 and the display unit 15 as a touch panel, and the operation unit 14 may be provided separately from the display unit 15, for example, as a button (key), lever (stick), touch pad (track pad), or mouse. The operation unit 14 may be used by users to perform operations by voice or gesture.

The operation unit 14, the display unit 15, and the audio output unit 16 may be installed in the game terminal 10 itself, or provided as external devices connected to the game terminal 10. For example, the display unit 15 may be a monitor, television receiver, head-mounted display (HMD), or projector connected to the game terminal 10 as an external device.

The server 30 is a server computer, for example. As shown in FIG. 1, the server 30 includes a control unit 31, a storage unit 32, and a communication unit 33. The control unit 31, the storage unit 32, and the communication unit 33 are respectively the same as the control unit 11, the storage unit 12, and the communication unit 13 of the game terminal 10. The server 30 can access a database 34. The database 34 may be built in the server 30 or in a server computer different from the server 30.

The programs and data are supplied to the game terminal 10 or the server 30 from remote locations via the network N and stored in the storage unit 12 or the storage unit 32. The game terminal 10 or the server 30 may include components for reading the programs and data (e.g. optical disk drive or memory card slot) stored in the information storage media (e.g. optical disk or memory card). The programs and data may be supplied to the game terminal 10 or the server 30 via the information storage medium.

In the following, a case will be described in which the game terminal 10 is a smart phone or a tablet computer equipped with a touch panel.

[2. Overview of game] The game system 1 (game terminal 10) is capable of executing various games. For example, the game system 1 can execute a variety of games regardless of game format or genre, such as sports games (games based on baseball, soccer, tennis, American football, basketball, volleyball etc.), racing games, fighting games, combat games, card games, role-playing games, or simulation games. The game may be executed by the game terminal 10 alone or by data communication between the game terminal 10 and the server 30 or other game terminal 10.

In the following, a soccer game based on soccer will be described as an example of a game played in the game system 1. In this soccer game, a soccer match is played between a user team, which is a soccer team organized by the user, and an opponent team, which is a soccer team of the opponent. The opponent may be a computer or another user, although in the following, assume that the opponent is a computer.

[2-1] In this soccer game, a player card, which is a card object associated with a game character representing a soccer player (hereinafter referred to as "player character"), is given to the user. In other words, a player card obtained by making a player character into a card object is given to the user. The player character may be a game character that imitates a real soccer player or a game character that imitates a fictional soccer player.

For example, one or more player cards are given to the user when the user first starts playing a soccer game. For example, the user can draw player cards by spending game points. When the lottery of player cards is conducted, the user is given a player card selected from a group of player cards prepared in the game system 1 based on the lottery process. For example, the user can exchange player cards with other users, or receive player cards from other users. The user forms his or her own soccer team (user team) using the player cards obtained in the above manner, and uses the soccer team to play a soccer match with the opponent team.

Figure 2:
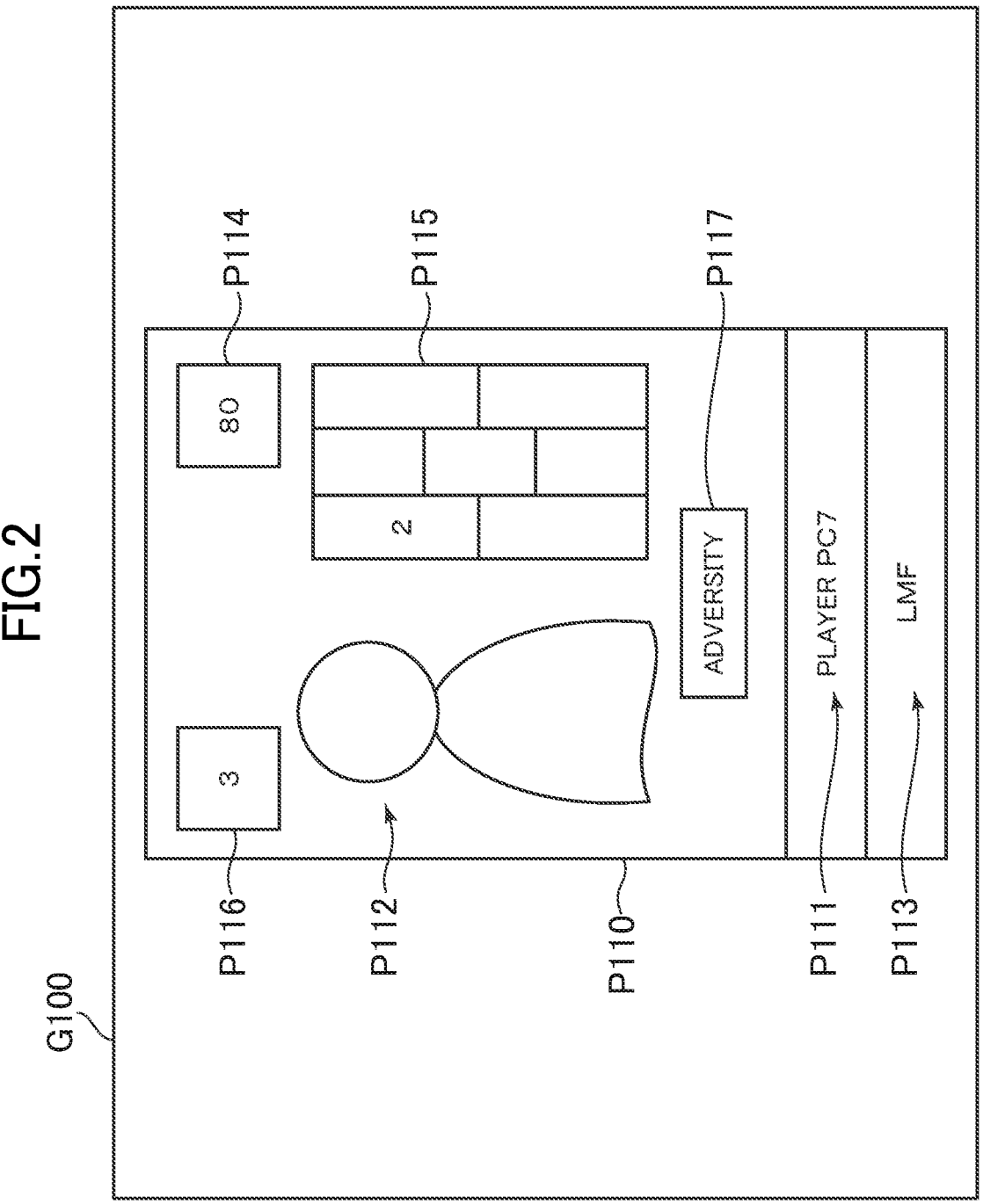
FIG. 2 is a diagram illustrating an example of a card information image.

FIG. 2 shows an example of a card information image G100, which indicates information of the player card. The card information image G100 is an image displayed on the display unit of the game terminal 10. As shown in FIG. 2, the card information image G100 includes a part P110 corresponding to an images of the player card. The part P110 includes parts P111 to P117.

The parts P111, P112, and P113 respectively indicate a name, an image, and a specialty position of the player character associated with the player card. In this embodiment, the player character's specialty position is one of GK (goalkeeper), CB (center back), LSB (left sideback), RSB (right sideback), DMF (defensive midfielder), CMF (central midfielder), LMF (left midfielder) (left midfielder), RMF (right midfielder), OMF (offensive midfielder), LWG (left wing), RWG (right wing), ST (second top), CF (center forward).

The part P114 shows overall ability information of the player character associated with the player card. The overall ability information indicates the overall ability of the player character. For example, the overall ability information takes a value from "0" to "100", and when the value is higher, the overall ability of the player character is higher. Although not shown in the card information image G100, each player character is associated with a plurality of items of ability information each indicating a level of ability. For example, the plurality of items of ability information includes a plurality of numerical values ranging from "0" to "100" that indicate levels of the abilities (e.g., running ability, passing ability, shooting ability, dribbling ability, defensive ability) and are associated with each player character. When the numerical value is higher, the ability is higher. For example, each player character may be associated with information indicating whether the character has mastered a special skill as ability information. The overall ability information of a player character is calculated based on a plurality of items of ability information of the player character.

The parts P115, P116, and P117 respectively indicate influence information, cost information, and skill information of the player card.

As described below, in this soccer game, the player cards are used during a match between the user team and the opponent team to set a specific area on the pitch to be a dominant area where the user team has an advantage over the opponent team (see FIGS. 6 to 9). In the area where the user team has the advantage, the abilities of the player characters belonging to the user team are increased. The influence information, the cost information, and the skill information are information related to this function.

[2-2] The influence information indicates whether and how much influence the player card has on each of the areas on the pitch. As described below, when the player card has more influence on an area, the area more easily become a dominant area of the user team when the player card is used (see FIGS. 6 to 9).

Figure 3:
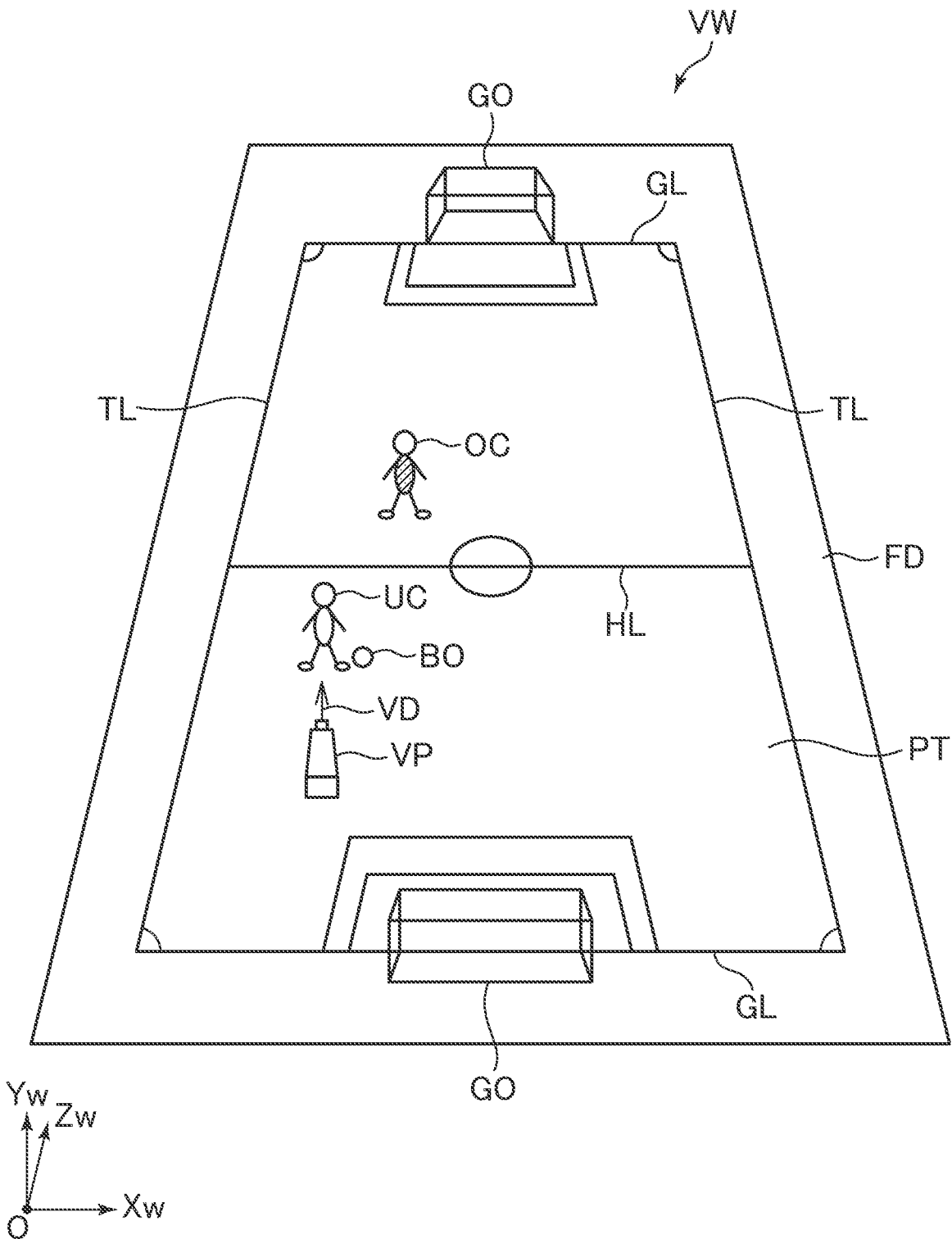
FIG. 3 is a diagram illustrating an example of a virtual space.

In a soccer game, a virtual space (game space) is set up to represent a venue of the soccer game when a soccer match is played between the user team and the opponent team. FIG. 3 shows an example of the virtual space. A virtual space VW shown in FIG. 3 is a virtual three-dimensional space in which Xw, Yw, and Zw axes, three mutually orthogonal coordinate axes, are set. The position in the virtual space VW is specified by three-dimensional coordinates in the XwYwZw coordinate system.

As shown in FIG. 3, an object representing a soccer field FD is placed in the virtual space VW. Two touch lines TL, two goal lines GL, and one halfway line HL are shown on the field FD. A soccer match is played on a pitch PT bounded by the touchlines TL and the goal lines GL.

An object representing a soccer goal GO is placed on the field FD. Further, objects representing a soccer ball BO, a user character UC (a player character belonging to the user team), and an opponent character OC (a player character belonging to the opponent team) are placed on the field FD. Although omitted in FIG. 2, eleven objects representing eleven user characters UC belonging to the user team and eleven objects representing eleven opponent characters OC belonging to the opponent team are placed on the field FD. In the following, if there is no need to distinguish between the user character UC and the opponent character OC, they are collectively referred to as "player characters PC."

The player character PC performs actions such as moving, passing, shooting, pressing, and tackling. Under certain conditions, the player character PC is associated with the ball BO. In this case, the movement of the player character PC is a dribbling motion.

Motion data is used to make the player character PC move. "Motion data" is data that specifies the changes in the posture of the player character PC for each frame when the player character PC is made to move. The motion data is played for the player character PC (i.e., changing the posture of the player character PC according to the motion data), and the player character PC is thereby made to perform motions. That is, in the soccer game, the motion data corresponding to various motions such as moving, passing, shooting, pressing, and tackling are prepared. For example, in order to make the player character PC pass, the motion data of the passing is played for the player character PC (i.e., the posture of the player character PC is changed according to the motion data of the passing action).

A virtual viewpoint VP is set in the virtual space VW. As described below, a virtual space image representing the virtual space VW viewed from the viewpoint VP in a viewing direction VD is displayed on the display unit 15 (see FIGS. 6 to 8). For example, the viewpoint VP and the viewing direction VD are determined based on the position of the ball BO so that the ball BO is included in the virtual space image.

Figure 4:
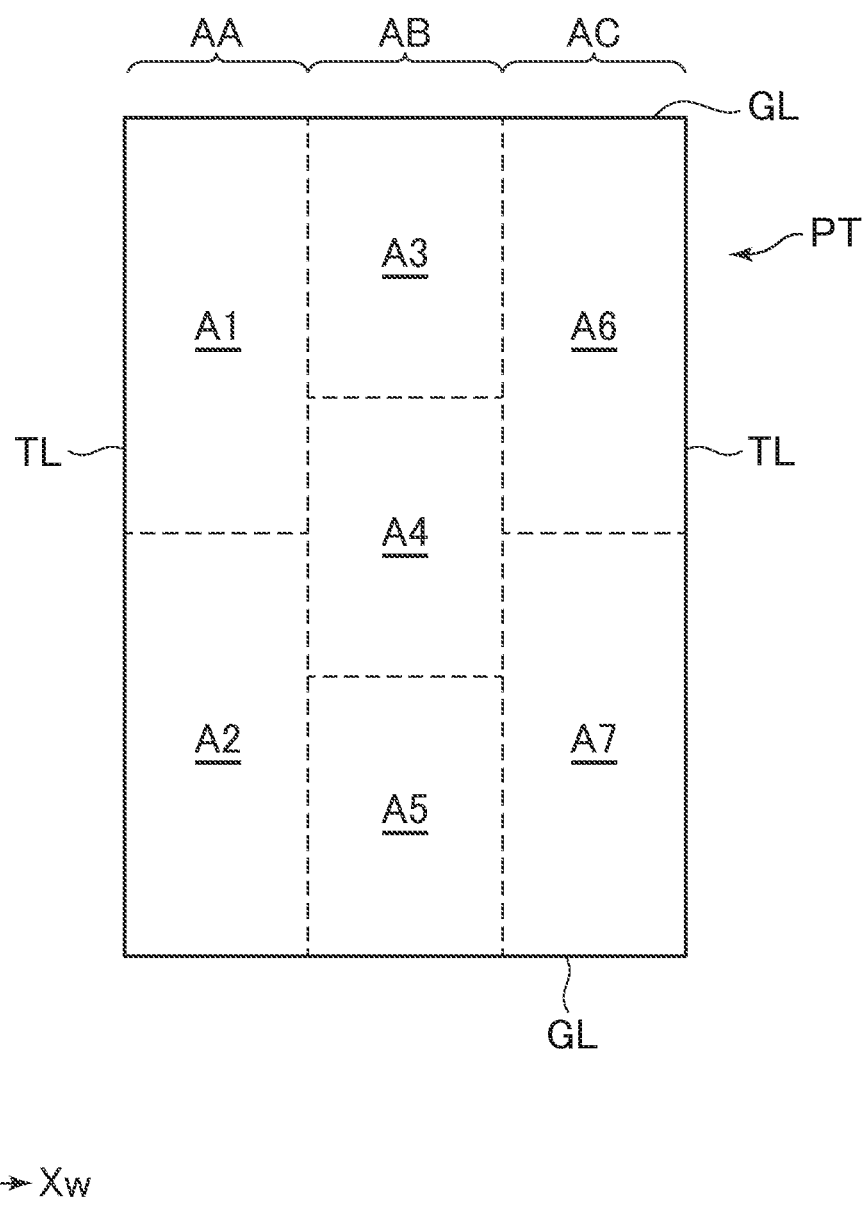
FIG. 4 is a diagram illustrating an example of a plurality of areas set on a pitch.

In the soccer game, a plurality of areas are set on the pitch PT. FIG. 4 shows an example of the areas set on the pitch PT. In the example shown in FIG. 4, seven areas A1 to A7 are set on the pitch PT. The areas A1 and A2 are the area AA divided into two equal parts on one side of the touch lines TL in the touch line TL direction. The areas A6 and A7 are the area AC divided into two equal parts on the other side of the touch lines TL in the touch line TL direction. The areas A3 to A5 are the area AB (central area) divided into three equal parts between the area AA and the area AC in the touch line TL direction. In the following, when it is not necessary to distinguish between the areas A1 to A7, the areas A1 to A7 may be collectively referred to as "area A."

The influence information indicates whether and how much influence the player card has on each of the areas A1 to A7 on the pitch PT. When the influence on the area A is greater, the area A more easily become a dominant area of the user team when the player card is used.

For example, the influence information is information associating the seven areas A1 to A7 set on the pitch PT with numerical information indicating the presence and extent of the influence on each area A. In the part P115 shown in FIG. 2, the number "2" is associated with the area A1. This indicates that the player card affects the area A1. This also indicates that the influence of the player card on the area A1 is "2." In the part P115 shown in FIG. 2, the numerical values are not respectively associated with the areas A2 to A7, which indicates that the numerical value "0" is associated with each of the areas A2 to A7. This means that the player card does not affect each of the areas A2 to A7. In the following, the above-mentioned numerical values associated with each of the areas A1 to A7 are described as "influence values."

In the influence information described above, the areas to which the influence values indicating the presence and extent of influence are associated correspond to the areas A1 to A7 in the pitch PT as shown in FIG. 4. This allows the user to easily grasp the influence information. The setting of the areas is not limited to the example shown in FIG. 4, and areas different from the areas A1 to A7 shown in FIG. 4 may be set. The way of displaying the influence information is not limited to the part P115 shown in FIG. 2, and the influence information may be displayed in other ways.

[2-3] The cost information indicates the cost required to use a player card during a match between the user team and the opponent team. Details are described below (see FIGS. 6 to 8).

[2-4] The skill information indicates skills set in the player card. For example, a skill has an effect of increasing or decreasing the influence value. In the example shown in FIG. 2, the skill "Adversity" is set on the player card. This skill has the effect of increasing the influence value when the player card is used while the user's soccer team is in the lead (losing). For example, if the player card shown in FIG. 2 is used by the user while the user team is leading the opponent team, the influence value of the area A1 becomes 3 by adding 1 to the normal value of 2.

[2-5] In this soccer game, the user uses the player cards of the user to form his or her soccer team (user team) to be used in a soccer match against the opponent team. Specifically, the user freely combines the cards selected from the user's player cards according to a predetermined rule, thereby setting a deck that corresponds to a soccer team (user team) to be used in a soccer match.

Figure 5:
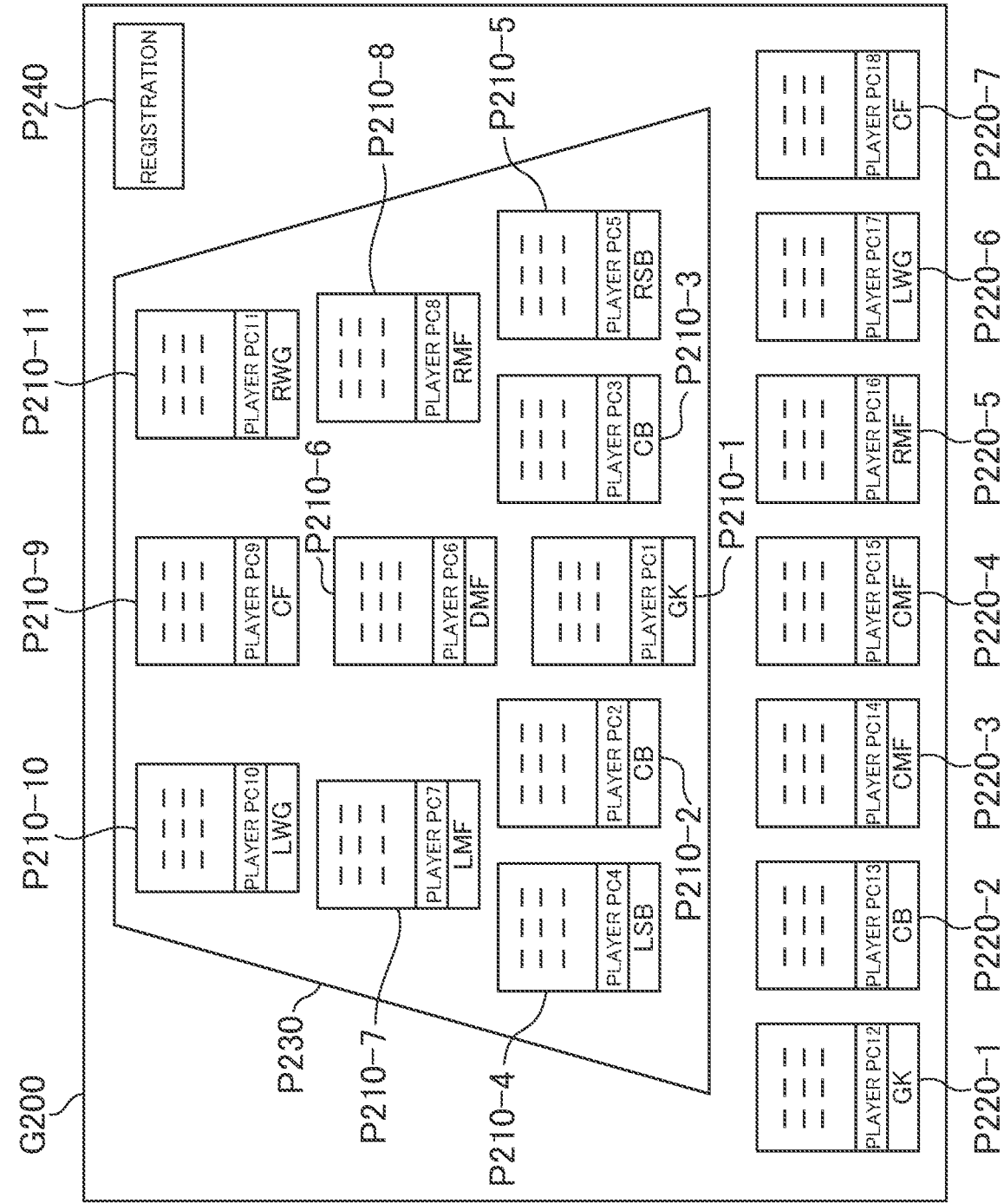
FIG. 5 is a diagram illustrating an example of a deck setup image.

FIG. 5 shows an example of a deck setup image G200 for setting up a deck corresponding to a soccer team. The deck setup image G200 is an image displayed on the display unit 15 of the game terminal 10.

In the deck setup image G200, eleven player cards corresponding to the starting members and seven player cards corresponding to the reserve members are specified from the player cards of the user.

As shown in FIG. 5, the deck setup image G200 includes eleven parts P210-1 to P210-11. The eleven parts P210-1 to P210-11 represent the eleven player cards specified as the player cards corresponding to the starting members. The eleven parts P210-1 to P210-11 are displayed on the part P230 indicating the pitch PT, and are displayed at the positions corresponding to the formation specified by the user. In the example shown in FIG. 5, the parts P210-1 to P210-11 are displayed at the positions corresponding to the "4-3-3" formation.

As shown in FIG. 5, the deck setup image G200 includes seven parts P220-1 to P220-7. These seven parts P220-1 to P220-7 represent the seven player cards specified as player cards corresponding to the reserve members.

For example, the part P210-1 is associated with processing for displaying a card list image, which shows a list of player cards owned by the user, on the display unit 15. As such, when the part P210-1 is specified (e.g., when a tap operation is performed on the part P210-1), the card list image is displayed on the display unit 15. Then, when one of player cards displayed in the card list image is specified, such a player card is displayed as the part P210-1. The same applies to the parts P210-2 to P210-11 and the parts P220-1 to P220-7.

As shown in FIG. 5, the deck setup image G200 includes a part P240. The part P240 indicates "Registration" and is associated with the processing for registering (storing) the deck formed by the user. As such, when the part P240 is specified, such processing is executed to register the deck formed by the user (see FIG. 13).

Figure 6:
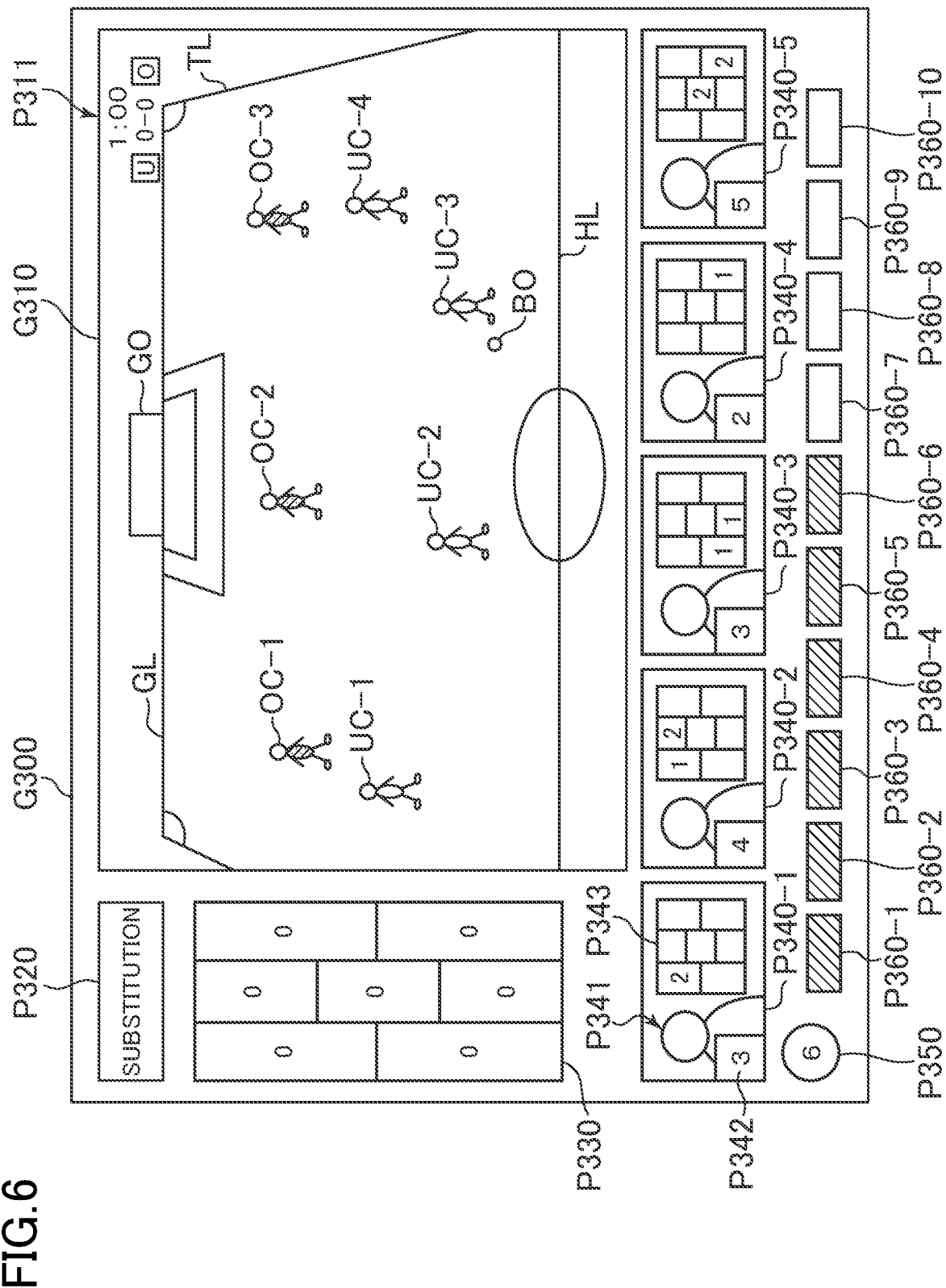
FIG. 6 is a diagram illustrating an example of a match image.

[2-6] FIG. 6 shows an example of a match image G300 displayed on the display unit 15 of the game terminal 10 during a match between the user team and the opponent team.

As shown in FIG. 6, the match image G300 includes a virtual space image G310. The virtual space image G310 shows the virtual space VW viewed from the viewpoint VP in the viewing direction VD.

The virtual space image G310 includes a part P311. The part P311 shows the elapsed time since the start of the match and the current scores of the two teams. The elapsed time since the start of the match is represented by the time in the virtual space VW. For example, the time in the virtual space VW is set such that one minute in the real world corresponds to ten minutes in the virtual space VW. One minute in the virtual space VW may correspond to one minute in the real world.

In the example shown in FIG. 6, the user characters UC-1, UC-2, UC-3, UC-4, the opponent characters OC-1, OC-2, OC-3, the ball BO, and the goal GO are displayed in the virtual space image G310.

At the start of the match, eleven player characters PC, which are respectively associated with eleven player cards set as the starting members in the deck of the user, are placed in the virtual space VW as eleven user characters UC.

A deck corresponding to the opponent's soccer team (opponent team) is also set for the opponent similarly to the user. At the start of the match, eleven player characters PC, which are respectively associated with eleven player cards set as the starting members in the deck of the opponent, are placed in the virtual space VW as eleven opponent characters OC. If the opponent is a computer, the computer uses a deck predetermined by a game developer, for example. Alternatively, a deck registered by another user may be used by the computer.

For example, when a player character PC associated with a player card is placed in the virtual space VW, the player character PC has an ability corresponding to the ability information associated with the player card, and motions of the player character PC are controlled based on the ability information associated with the player card. For example, movement speed and dribbling speed of the player character PC are controlled based on the ability information (e.g., running ability information or dribbling ability information) associated with the player card. For example, accuracy of a pass or a shot of the player character PC is controlled based on the ability information (e.g., pass ability information or shoot ability information) associated with the player card. For example, success of a pass, a shot, a dribble, or a tackle by the player character PC is controlled based on the ability information (e.g., passing ability information, shooting ability information, dribbling ability information, defensive ability information) associated with the player card. Specifically, the success probability of the player character PC in passing, shooting, dribbling, or tackling is controlled based on the ability information associated with the player card.

In this soccer game, both the user character UC and the opponent character OC are controlled by the computer. In other words, the computer determines a type and content of a motion to be performed by each user character UC, and each user character UC performs the motion of the type and content determined by the computer. The same applies to the opponent character OC.

As such, the virtual space image G310 displays the user characters UC and the opponent characters OC, who act according to the computer's instructions, and the user basically watches the user characters UC and the opponent characters OC, who are controlled by the computer, play a soccer match as a coach or a team owner.

As explained below, in this soccer game, the user is involved in the game by using the player cards displayed in the match image G300.

As shown in FIG. 6, the match image G300 includes a part P320. The part P320 is labeled "substitution" and is associated with the processing for displaying a player substitution image on the display unit 15 to accept a player substitution instruction. As such, when the part P320 is specified, the player substitution image is displayed in the display unit 15, and the user character UC playing in the match can be replaced by a reserve member user character UC.

The match image G300 also includes a part P330. In the part P330, a numerical value is displayed in association with each of the areas A1 to A7. In the following, the numerical values associated with the areas A1 to A7 in the part P330 will be described as "momentum values."

As described below, in this soccer game, the player cards are used during a match between the user team and the opponent team to set an area A on the pitch PT to be a dominant area where the user team has an advantage over the opponent team. In the area where the user team has the advantage, the abilities of the user player characters UC are increased. The momentum value associated with the area A indicates whether the area A is the dominant area of the user team. In other words, the momentum value associated with the area A indicates whether the ability of the user character UC increases in the area A.

For example, if the momentum value associated with an area A is greater than zero, such an area A is set as a dominant area where the user team is dominant over the opponent team (in other words, an inferior area where the opponent team is inferior to the user team). In the dominant area of the user team, the ability information of a user character UC is set higher than the original ability information (normal ability information) of such a user character UC.

On the other hand, if the momentum value associated with an area A is less than zero, such an area A is set as a dominant area where the opponent team is dominant over the user team (in other words, an inferior area where the user team is inferior to the opponent team). In the dominant area of the opponent team, the ability information of an opponent character OC is set higher than the original ability information (normal ability information) of such an opponent character OC.

If the momentum value associated with an area A is zero, such an area A is not set as the dominant area for either the user team or the opponent team. In the following, the area A that is not set as the dominant area for either the user team or the opponent team is referred to as a "balanced area." In the balanced area, the ability information of the user character UC and the opponent character OC is not changed and remains the same as the original information.

The match image G300 includes five parts P340-1, P340-2, P340-3, P340-4, and P340-5. In this soccer game, the momentum value of at least one of the areas A1 to A7 can be changed by using the player card. The parts P340-1 to P340-5 show the five player cards that are candidates for the player cards available to the user. In the following, the candidate player card available to the user are described as "user's candidate card."

In this soccer game, five player cards are randomly selected from the eleven player cards corresponding to the eleven user characters UC playing in the match as the user's candidate cards based on a predetermined probability, and five parts P340-1 to P340-5 representing such five candidate cards are displayed in the match image G300.

As shown in FIG. 6, the part P340-1 contains parts P341, P342, and P343. The part P341 is an image of the player character associated with the user's candidate card. The parts P342 and P343 show the cost and influence information of the user's candidate card. The same applies to the parts P340-2 to P340-5. In the following, if it is not necessary to distinguish between the parts P340-1 to P340-5, the parts P340-1 to P340-5 may be collectively referred to as "part P340."

The match image G300 further includes a part P350 and parts P360-1, P360-2, P360-3, P360-4, P360-5, P360-6, P360-7, P360-8, P360-9, and P360-10. The part P350 shows current card points of the user. The parts P360-1 to P360-10 also show current card points of the user. For example, as shown in FIG. 6, if the user's card points are "6", the parts P360-1 to P360-6 are displayed differently from the remaining parts P360-7 to P360-10 to indicate that the user's card points are "6."

When a player card with a cost of "n" is used by the user, the user's card points are consumed by n points. As such, if the user's card points are less than n points, the player card with the cost "n" or more among the user's candidate cards is not used. The card points are increased over time. For example, each time a predetermined period of time (e.g., one minute in the virtual space VW) elapses, the card points are increased by one point.

[2-7] The part P340-1 is associated with processing for using the player card associated with the part P340-1. The same applies to the parts P340-2 to P340-5. As such, the user specifies any part P340 from P340-1 to P340-5, thereby using any player card from among the five candidate cards. When a player card is used by the user, the momentum value of at least one of the areas A1 to A7 is changed based on the influence information of the used player card.

Figure 7:
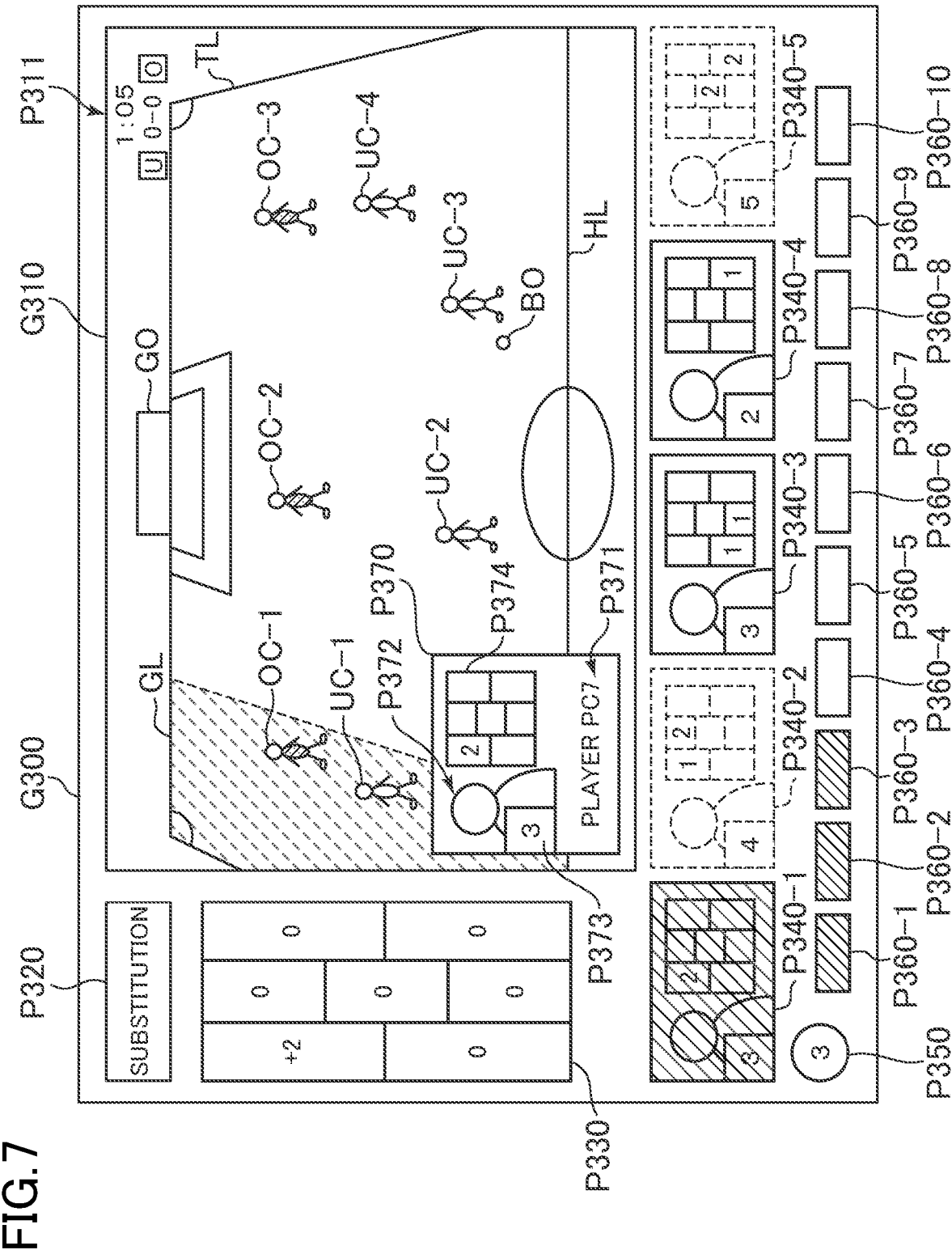
FIG. 7 is a diagram illustrating an example of the match image when a user uses a player card.

FIG. 7 shows an example of the match image G300 when the part P340-1 is specified by the user, i.e., when the player card associated with the part P340-1 is used by the user.

As shown in FIG. 7, the match image G300 in this case includes a part P370. The part P370 shows a player card that is used by the user. In the following, the player card used by the user is referred to as the "user's used card."

The part P370 includes parts P371, P372, P373, and P374. The parts P371 and P372 show the names and images of the player characters associated with the user's used cards. The parts P373 and P374 show the cost and influence information of the user's used cards.

When the player card associated with the part P340-1 is used by the user, as shown in FIG. 7, the display of the part P340-1 is updated to indicate that the player card associated with the part P340-1 has been used, and the part P340-1 is in an unusable state. In the example shown in FIG. 7, the part P340-1 is shaded with rightward-ascending lines.

The cost of the player card associated with the part P340-1 is set to "3", and thus, as indicated by the parts P350 and P360-1 to P360-10, the user's card points are consumed by 3 points and the remaining amount of the user's card points is reduced from "6" to "3." In this case, the user's candidate card with the cost higher than "3" cannot be used, and thus the display of the parts P340-2 and P340-5 associated with the player cards with the cost of "4" or "5" is updated to indicate that the user cannot specify the parts P340-2 and P340-5. In the example shown in FIG. 7, the parts P340-2 and P340-5 are represented by dotted lines.

In the influence information of the player card associated with the part P340-1, the influence value of the area A1 is set to "2", and thus the momentum value of the area A1 is increased by two and the momentum value of the area A1 is updated from "0" to "+2" as indicated by the part P330. As a result, the area A1 is set as the dominant area of the user team.

When the area A1 is the dominant area of the user team, as shown in FIG. 7, the area A1 is distinguished from other areas A that are not the dominant area of the user team in the virtual space image G310 to indicate that the area A1 is the dominant area of the user team. In the example shown in FIG. 7, the area A1 is distinguished by rightward-ascending dotted lines.

If a user character UC is located in the dominant area of the user team, the ability information of the user character UC is set to be higher than the original ability information of the user character UC. In other words, the values of the user character UC's abilities (running, passing, shooting, dribbling, defending) are set to higher than the original values. Here, all of the values of the ability information associated with the user character UC are set higher than the original values, although only some of the values of the ability information associated with the user character UC may be set to higher than the original values.

In the example shown in FIG. 7, the user character UC-1 is located in the area A1, which is the dominant area of the user team, and thus the values of the abilities of the user character UC-1 are set to be higher than the original values. In this case, the areas A other than the area A1 are not the dominant area of the user team, and thus, when the user character UC-1 moves outside of the area A1, the values of the abilities of the user character UC-1 are returned to the original values. When the user character UC-1 who has been moved out of the area A1 moves into the area A1, the values of the abilities of the user character UC-1 are set to be higher than the original values.

In the example shown in FIG. 7, the user characters UC-2, UC-3, and UC-4 are not located in the area A1. For example, if the user character UC-2 moves into the area A1, the values of the abilities of the user character UC-2 are set to be higher than the original values.

In the example shown in FIG. 7, the opponent character OC-1 is located in the area A1, although the ability information of the opponent character OC-1 is not changed. In this embodiment, the ability information of the opponent character OC is not changed even if the opponent character OC is located in the dominant area of the user team, although the values of the abilities of the opponent character OC may be set to be lower than the original values when the opponent character OC is located in the dominant area of the user team.

[2-8] Similarly to the user, the opponents also have their own card points, and five player cards are randomly selected based on a predetermined probability as candidate cards for the opponents to use from the eleven player cards corresponding to the eleven opponent characters OC participating in the match. The opponent can also use any of the five candidate cards within the range of the opponent's card points.

Figure 8:
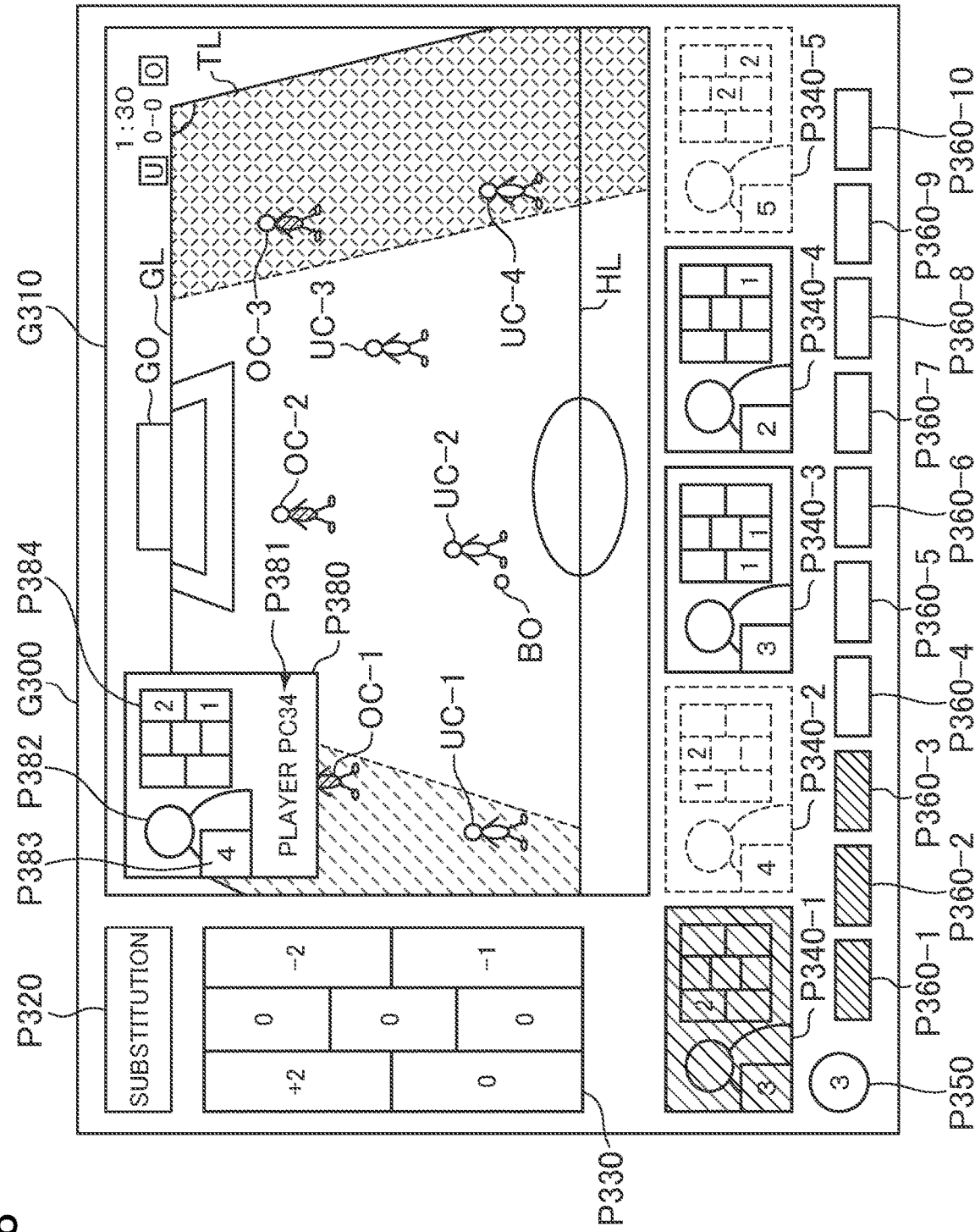
FIG. 8 is a diagram illustrating an example of the match image when an opponent uses a player card.

FIG. 8 shows an example of the match image G300 when a player card is used by the opponent. As shown in FIG. 8, the match image G300 in this case includes a part P380. The part P380 shows the card used by the opponent. The part P380 includes parts P381, P382, P383, and P384. The parts P381 to P384 are the same as the parts P371 to P374 in FIG. 7, and thus descriptions thereof are omitted here.

In this case, although the opponent's card points are not shown on the match image G300, the cost of the card used by the opponent is set to "4" and thus the opponent's card points are reduced by 4 points.

In this case, the influence value of the area A6 is set to "2" in the influence information of the card used by the opponent, and thus the momentum value of the area A6 is reduced by two and updated from "0" to "−2" as shown by the part P330. Further, the influence value of the area A7 is set to "1", and thus the momentum value of the area A7 is decreased by one and updated from "0" to "−1" as shown by the part P330. As a result, the areas A6 and A7 are set as the dominant areas of the opponent team.

When the areas A6 and A7 are the dominant areas of the opponent team, as shown in FIG. 8, the areas A6 and A7 are distinguished from other areas A that are not the dominant areas of the opponent team in the virtual space image G310 to indicate that the areas A6 and A7 are the dominant areas of the opponent team. In the example shown in FIG. 8, the areas A6 and A7 are distinguished by both rightward-ascending dotted lines and rightward-descending dotted lines.

If an opponent character OC is located in the dominant area of the opponent team, the ability information of the opponent character OC is set to be higher than the original ability information of the opponent character OC. In other words, the values of the opponent character OC's abilities (running, passing, shooting, dribbling, defending) are set to higher values than the original values. Here, all of the values of the ability information associated with the opponent character OC are set higher than the original values, although only some of the values of the ability information associated with the opponent character OC may be set to higher than the original values.

In the example shown in FIG. 8, the opponent character OC-3 is located in the area A6, which is the dominant area of the opponent team, and thus the values of the abilities of the opponent character OC-3 are set to be higher than the original values.

In this case, the areas A3 to A5 adjacent to the areas A6 and A7 are not the dominant areas of the opponent team, and thus, when the opponent character OC-3 moves out of the areas A6 and A7, the values of the abilities of the opponent character OC-3 are returned to the original values. When the opponent character OC-3 that has been moved out of the areas A6 and A7 moves into the areas A6 and A7, the values of the abilities of the opponent character OC-3 are again set to be higher than the original values.

In the example shown in FIG. 8, the opponent characters OC-1 and OC-2 are not located in the areas A6 and A7. For example, if the opponent character OC-2 moves into the areas A6 and A7, the values of the abilities of the opponent character OC-2 are set to be higher than the original values.

On the other hand, in the example shown in FIG. 8, the user character UC-4 is located in the area A6, but the ability information of the user character UC-4 is not changed. In the present embodiment, even if a user character UC is located in the dominant area of the opponent team, the ability information of the user character UC is not changed. However, if the user character UC is located in the dominant area of the opponent team, the values of the abilities of the user character UC may be set to be lower than the original values.

[2-9] The effect of increasing or decreasing the momentum value by the user's used card or the opponent's used card disappears over time. For example, for every predetermined time (e.g., five minutes in the virtual space VW) after a player card is used, the increasing or decreasing effect on each area A is weakened by one point.

In the example shown in FIG. 7, the player card associated with part P340-1 is used, whereby the momentum value of the area A1 is increased by two and changed to "+2." That is, the effect of increasing the momentum value of the area A1 by "2" is generated, and the area A1 becomes the dominant area of the user team. In this case, when the predetermined time has passed after the player card is used, the effect of increasing "1" disappears out of the effect of increasing "2." In other words, the momentum value of the area A1 is decreased by one and updated from "+2" to "+1." Subsequently, when the predetermined time has further passed, the remaining effect of increasing "1" disappears. In other words, the momentum value of the area A1 is decreased by one and updated from "+1" to "0", and all the increasing effects of the used card disappear and the area A1 becomes a balanced area. In this embodiment, a new player card is selected as the user's candidate card at this point, and such a player card is displayed as the part P340-1.

Similarly, in the example shown in FIG. 8, a player card is used by the opponent, whereby the momentum value in the area A6 is decreased by two to "−2" and the momentum value in the area A7 is decreased by 1 to "−1." In other words, the decreasing effect of "2" is generated for the momentum value of the area A6 and the decreasing effect of "1" is generated for the momentum value of the area A7, which makes the areas A6 and A7 the dominant areas of the opponent team. In this case, when a predetermined time has passed after the player card is used, the effect of decreasing "1" disappears out of the effect of decreasing "2" from the momentum value of the area A6. That is, the momentum value of the area A6 is increased by one and updated from "−2" to "−1." Further, the effect of decreasing "1" from the momentum value of the area A7 disappears. That is, the momentum value of the area A7 is increased by 1 and updated from "−1" to "0", and the area A7 becomes a balanced area. Subsequently, when a predetermined time has passed, the remaining effect of decreasing "1" disappears out of the effect of decreasing "2" from the momentum value of the area A6. In other words, the momentum value of the area A6 is increased by one and updated from "−1" to "0" and the area A6 becomes a balanced area, and all the decreasing effects of the above used card disappear. In this embodiment, a new player card is selected as a candidate card for the opponent at this point.

Figure 9:
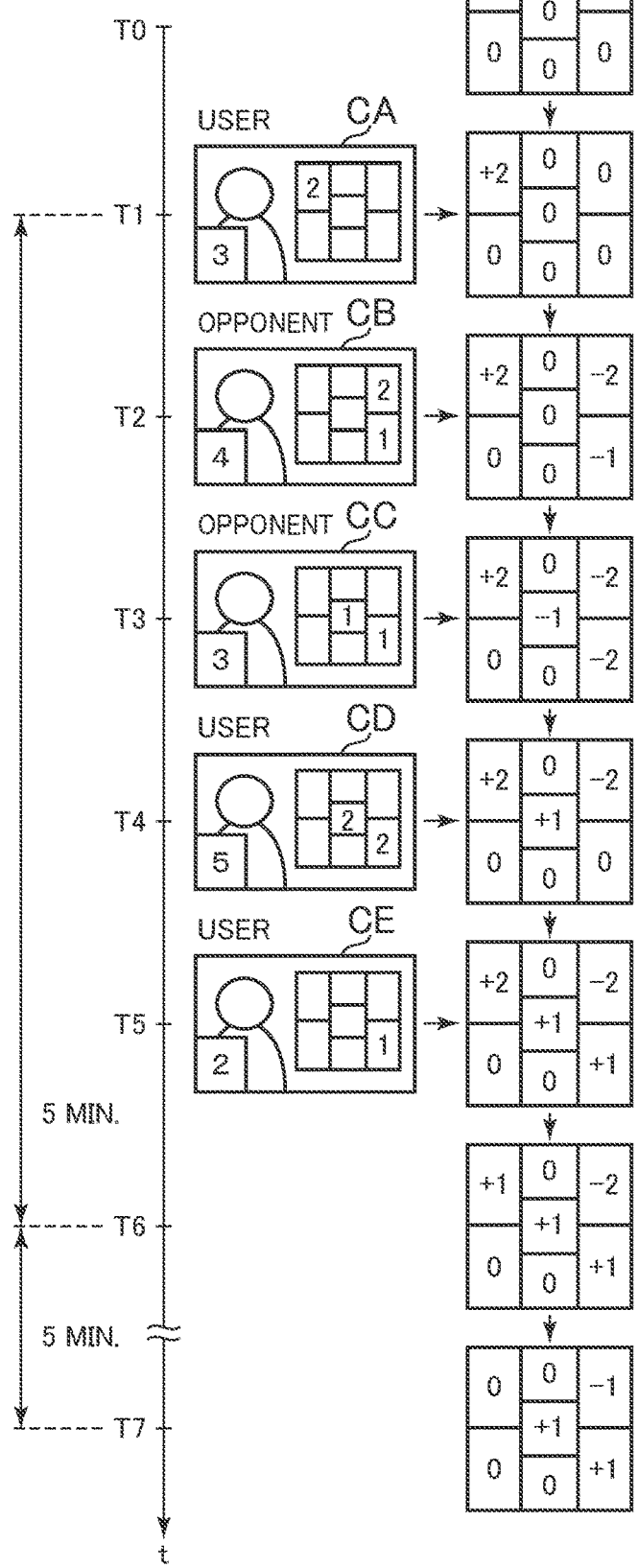
FIG. 9 is a diagram illustrating an example of a change in momentum values with the use of player cards and passage of time.

[2-10] FIG. 9 shows an example of the change in the momentum values with the use of the player cards and the passage of time. The t-axis shown in FIG. 9 is a time axis, and "5 minutes" indicates the time in the virtual space VW.

The time point T0 shown in FIG. 9 indicates the start of the match. In the example shown in FIG. 9, a momentum value of each of the areas A1 to A7 is set to "0" at the time point T0, and each of the areas A1 to A7 is set to a balanced area.

In the example shown in FIG. 9, the player card CA is used by the user at time point T1, which is later than time point T0. In this case, the influence value of the player card CA on the area A1 is set to "2", and thus "2" is added to the momentum value "0" of the area A1, which is updated to "+2." As a result, the area A1 is set as the dominant area of the user team.

In the example shown in FIG. 9, the player card CB is used by the opponent at time point T2, which is later than time point T1. In this case, the influence value of the player card CB on the area A6 is set to "2", and thus "2" is subtracted from the momentum value "0" of the area A6, which is updated to "−2." Further, the influence value of the player card CB on the area A7 is set to "1", and thus "1" is subtracted from the momentum value "0" of the area A7, which is updated to "−1." As a result, the areas A6 and A7 are set as the dominant areas of the opponent team.

In the example shown in FIG. 9, the player card CC is used by the opponent at time point T3, which is later than time point T2. In this case, the influence value of the player card CC on the area A4 is set to "1", and thus "1" is subtracted from the momentum value "0" of the area A4, which is updated to "−1." As a result, the area A4 is also set as the dominant area of the opponent team. Further, the influence value of the player card CC on the area A7 is set to "1", and thus "1" is further subtracted from the momentum value "−1" of the area A7, which is updated to "−2."

In the example shown in FIG. 9, the player card CD is used by the opponent at time point T4, which is later than time point T3. In this case, the influence value of the player card CD on the area A4 is set to "2", and thus "2" is added to the momentum value "−1" of the area A4, which is updated to "+1." As a result, the area A4 is set as the dominant area of the user team. Further, the influence value of the player card CC on the area A7 is set to "2", and thus "2" is added to the momentum value "−2" of the area A7, which is updated to "0." As a result, the area A4 is set as the balanced area.

The area A4 is set to the dominant area of the opponent team at the time point T3, but the player card CD is used by the user at the time point T4 and thus the area A4 is changed to the dominant area of the user team. In this case, the user uses the player card CD and thereby regaining the area A4 from the opponent. The area A7 is set to the dominant area of the opponent team at the time point T3, but the player card CD is used by the user at the time point T4 and thus the area A7 is changed to the balanced area. In this case, the user uses the player card CD and thereby preventing the area A7 from being the dominant area of the opponent team.

At the time point T4, the momentum values of the areas A1 and A4 are respectively set to "+2" and "+1", and the areas A1 and A4 are set as the dominant areas of the user team. In this case, the values of the abilities of the user characters UC located in the areas A1 and A4 are set higher than the original values. In this case, the momentum value of the area A1 is greater than the momentum value of the area A4, although in this soccer game, the degree of increase (degree) of each ability in the area A1 is set to be the same as in the area A4. In other words, if the momentum value of an area A is greater than zero, the degree of increase of the abilities of the user characters UC in the area A are set to be the same regardless of the momentum value.

However, in the state of the time point T4, the area A1 is less likely to become a balanced area or a dominant area of the opponent team than the area A4. For example, if the opponent uses a player card with the influence value of "1" for the area A4, the area A4 becomes a balanced area, and if the opponent uses a player card with the influence value of "2" for the area A4, the area A4 becomes a dominant area of the opponent team. On the other hand, even if the opponent uses a player card with the influence value of "1" for the area A1, the area A1 does not become a balanced area, and even if the opponent uses a player card with the influence value of "2" for the area A1, the area A1 does not become a dominant area of the opponent team.

If the momentum value of an area A is greater than zero, the degree of increase in the value of the abilities in the area A may be changed depending on the momentum values. In other words, in the case of the time point T4, the degree of increase in a value of each ability in the area A1 may be different from the degree of increase in a value of each ability in the area A4. For example, the degree of increase in the value of each ability in the area A1 may be greater than the degree of increase in a value of each ability in the area A4.

In the example shown in FIG. 9, the player card CE is used by the opponent at time point T5, which is later than time point T4. In this case, the influence value of the player card CE on the area A7 is set to "1", and thus "1" is added to the momentum value "0" of the area A7, which is updated to "+1." As a result, area A7 is set as the dominant area of the user team.

At the time point T5, the sum of the influence values in the area A7 of the user's used cards (player cards CA, CD, CE) is "3", and the sum of the influence values in the area A7 of the opponent's used cards (player cards CB, CC) is "2." In this case, the momentum value of the area A7 is a value obtained by subtracting "2", which is the sum of the influence values of the area A7 of the opponent's used cards from "3", which is the sum of the influence values of the area A7 of the user's used cards. That is, in this soccer game, the momentum value of an area An (n: an integer from 1 to 7) is the value obtained by subtracting the sum of the influence values of the area An of the opponent's used cards from the sum of the influence values of the area An of the user's used cards.

Time point T6 shown in FIG. 9 is later than the time point T5 and represents a time point five minutes after the time point T1. In other words, at the time point T6, five minutes have passed since the time point T1 when the player card CA is used. In one example, after a player card is used, the effect of increasing or decreasing the momentum value of the area A by such a player card is weakened by one point for every five minutes in the virtual space VW, and the effect of increasing the momentum value of the area A1 by "1" with the use of the player card CA disappears at the time point T6 out of the effect of increasing the momentum value of the area A1 by "2." As such, "1" is subtracted from "+2", which is the momentum value of the area A1, and the momentum value of the area A1 is updated to "+1."

Time point T7 shown in FIG. 9 indicates a time point that is five minutes later than the time point T6. At time point T7, another 5 minutes have passed since the time point T6, and the remaining effect of increasing the momentum value of area A1 by "1" out of the increasing effect of "2" by the player card CA disappears. As such, "1" is subtracted from "+1" of the momentum value of the area A1, which is updated to "0." As a result, the area A1 returns to the balanced area. At the time point T7, all or some of the effects of increasing or decreasing the momentum values of the areas A3, A6, and A7 by the player cards CB, CC, CD, and CE have also disappeared.

[2-11] In the soccer game described above, the ability of the user character UC is higher than the original ability in the dominant area of the user team, and the ability of the opponent character OC is higher than the original ability in the dominant area of the opponent team. The user character UC with a higher ability than the original ability is more likely to win a competition with the opponent character OC. For example, the user character UC with a higher ability than the original ability can easily dribble past the opponent character OC or take the ball BO from the opponent character OC holding the ball BO. On the other hand, the user character UC is less likely to win a competition with then opponent character OC with a higher ability than the original ability. The user then uses a player card to change the momentum value of the area A so as to make the area A the dominant area of the user team or prevent the area A from being the dominant area of the opponent team, thereby getting involved in the user team (user character UC) and the game to win the match. Similarly, the opponent also uses a player card to change the momentum value of the area A so as to make the area A the dominant area of the opponent team or prevent the area A from being the dominant area of the user team, thereby getting involved in the opponent team (opponent character OC) and the game to win the match.

The soccer game described above provides a new way for a user to be involved in the user team (user character UC) by changing a momentum value of each of areas A1 to A7 using the player card.

In other words, the soccer game can provide a new interest to the user by enabling the user to be indirectly involved in the user team (user character UC) by changing the momentum value of each of areas A1 to A7 instead of being directly involved in the user team (user character UC) by operating the user character UC.

In a game of viewing a soccer match between the user team (user character UC) and the opponent team (opponent character OC) that are controlled by the computer, the degree of user involvement in the user team (user character UC) is lower than a game where the user character UC is controlled by the user. However, the soccer game described above increases the degree of user involvement in the user team (user character UC) controlled by the computer.

Further, the soccer game described above can provide a new interest to the user in which each player card has a different influence on each of areas A1 to A7, and the user can specify any player card to use among a plurality of player cards having different influences on the areas A1 to A7 so as to specify an area A to change its momentum value and the degree of change in the momentum value of the area A (in other words, specify which area A's momentum value is to be changed and how it is to be changed).

In the soccer game described above, the user's candidate cards are limited to five player cards (parts P340-1 to P340-5), and the options that the user can specify as the area A where the momentum value is to be changed and the degree of change of the momentum value in the area A are limited. As such, it is possible to provide users with the entertainment of specifying the area A where the momentum value is to be changed and the degree of change of the momentum value of the area A from among the limited options.

In the soccer game described above, five player cards randomly selected based on a predetermined probability are presented to the user as the user's candidate cards (parts P340-1 to P340-5), and thus the user's candidate cards are not always the same and can be varied.

Further, the soccer game described above limits the period of time in which the cards used by the user or the opponent have an influence on the area A. As such, it is possible to provide user with the entertainment of using the player cards while considering that the cards used by the user or the opponent have a limited period of influence on the area A.

In the soccer game described above, the player card serves both as a player character PC (user character UC) that acts in the virtual space VW and as an item to change the momentum value of the area A. As such, when constructing a deck, it is necessary to consider both the performance of the player character PC (overall ability information and ability information) and the performance of the item (influence information) to change the momentum value of the area A. This provides the user with the entertainment of setting up the deck while considering both the performance (overall ability information and ability information) as the player character PC and the performance (influence information) as the item to change the momentum value of the area A.

In the soccer game described above, the player card plays both roles described above, thus eliminating the need to prepare and obtain items to change the momentum value of the area A separately from the player character PC.

In the soccer game described above, a cost is set for each player card, and if the user's card points fall below the cost of a player card, such a player card cannot be used. This provides the user with the entertainment of using the player card in consideration of the user's card points and the cost of the player card.

[2-12] In the above description, the user's candidate card is selected from the eleven player cards corresponding to the eleven user characters UC playing in the match, although the user's candidate card may be selected from eighteen player cards, which are members of the user's deck (i.e., the eighteen player cards corresponding to the eighteen user characters UC belonging to the user team). Alternatively, the user's candidate card may be selected from the seven player cards corresponding to the seven user characters UC that are not playing in the match.

In the above explanation, five player cards are selected as the user's candidate cards, although four or fewer player cards may be selected as the user's candidate cards, or six or more player cards may be selected. In this regard, for example, eleven player cards corresponding to the eleven user characters UC playing in the match may be set as the user's candidate cards so that the user can select a card to use from the eleven player cards. Further, for example, eighteen player cards that are the members of the user's deck (i.e., the eighteen player cards corresponding to the eighteen user characters UC belonging to the user team) may be set as the user's candidate cards so that the user can select a card to use from the eighteen player cards.

In the above description, the user selects members of the deck from the player cards of the user to set up the user's deck. Alternatively, the user may select members of the deck from all the player cards available in the game system 1 to set up the user's deck.

In the above description, each of the areas A1 to A7 has a momentum value common to both the user team and the opponent team, although the teams may separately set a momentum value for each of the areas A1 to A7. In other words, each of the areas A1 to A7 has two momentum values, which are a momentum value of the user team and a momentum value of the opponent team. For example, the sum of the influence values of the user's used cards in the area A1 is set as the momentum value of the user team in the area A1, and the ability information of the user character UC located in the area A1 may be changed based on the momentum value of the user team in the area A1. For example, if the momentum value of the user team in the area A1 (the sum of the influence values of the user's used cards in the area A1) is greater than zero, the ability information of the user character UC located in the area A1 may be set higher than the original ability information. Similarly, the sum of the influence values of the opponent's used cards in the area A1 is set as the momentum value of the opponent team in the area A1, and the ability information of the opponent character OC located in the area A1 may be changed based on the momentum value of the opponent team in the area A1. For example, if the momentum value of the opponent team in the area A1 (the sum of the influence values of the opponent's used cards in the area A1) is greater than zero, the ability information of the opponent character OC located in the area A1 may be set higher than the original ability information. The same applies to the areas A2 to A7.

In the above description, the card points of the user are provided and a cost is determined for each player card, although such a configuration is not mandatory. For example, a gauge that expands (or contracts) over time may be associated with each player card, and the player card may not be used until the length of the gauge associated with the player card reaches a predetermined length, and the player card may be used when the length of the gauge reaches the predetermined length. The concept of cost may be eliminated and, for example, the user may be allowed to use each player card only once at any given time.

In the above description, the user character UC is controlled by the computer, although the user may control the user character UC. For example, the user may operate a user character UC to be operated among the user characters US belonging to the user team, and the computer may operate the other user characters UC. In this case, one user may operate the user character UC and use the player card, or the user may operate the user character UC and another user who is a collaborator of the user may use the player card.

In the above description, a momentum value of at least one of the areas A1 to A7 is changed by using a player card, although a momentum value of at least one of the areas A1 to A7 may be changed by using an item other than the player card. Alternatively, the user may directly specify at least one of the areas A1 to A7 to change the momentum value of the specified area A. For example, seven parts respectively indicating the areas A1 to A7 may be displayed in the match image G300 instead of the parts P340-1 to P340-5, and at least one of the seven parts may be specified.

In the above explanation, the case has been described in which a plurality of areas A are set on the pitch PT, although only one area A may be set on the pitch PT. The entire pitch PT may be set as one area A.

In the above description, the case has been described in which the fixed areas A1 to A7 are set within the pitch PT, although the user may freely set the location, size, or shape of the area A. The location, size, or shape of the area A may be determined by the user before the start of the match or at the halftime.

In the above explanation, the case has been described in which the player card serves both the roles of the player character PC (user character UC) acting in the virtual space VW and the item for changing the momentum value of the area A, although the player card does not have to serve both the roles. In other words, a card may be provided as an item to change the momentum value of the area A separately from the player character PC acting in the virtual space VW. In this case, the card may indicate tactics or strategies, for example, rather than the player character. Further, the item to change the momentum value in the area A may be an item other than the card.

In the above description, the soccer game has been described as an example of a game executed in the game system 1. In this regard, the new user involvement in game objects, in which the user changes the parameters associated with the areas in the virtual space so as to relate to the game objects moving in the virtual, is also applicable to sports games other than soccer games, games other than sports games, games other than competitive games, and various games in which game objects move in the virtual space.

[3. Functional block] FIG. 10 is a functional block diagram related to the functions described above in the functional blocks implemented in the game system 1.

Figure 10:
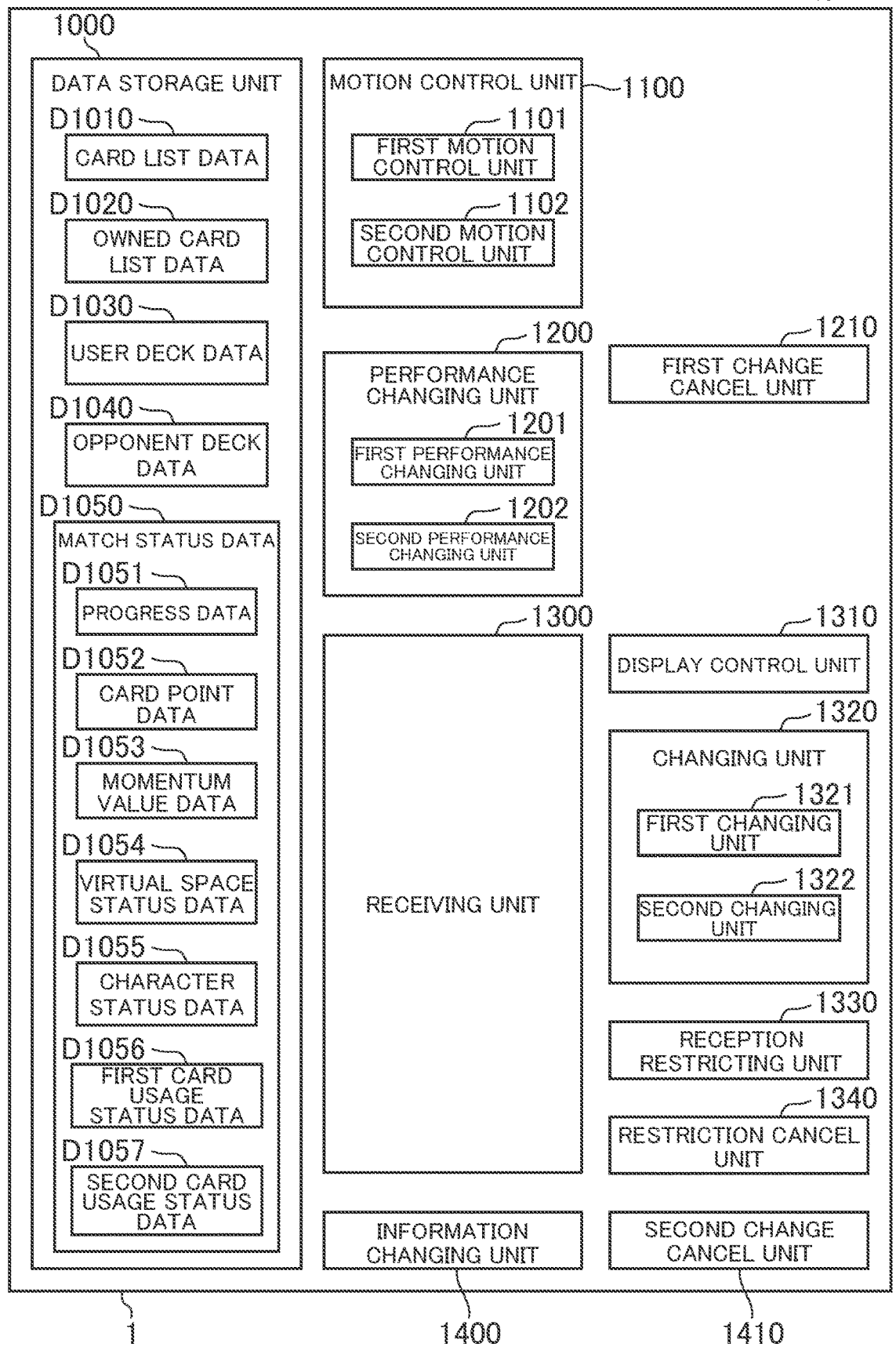
FIG. 10 is a functional block diagram showing functional elements of the game system according to an embodiment of the present invention.

As shown in FIG. 10, the game system 1 includes a data storage unit 1000, a motion control unit 1100, a performance changing unit 1200, a first change cancel unit 1210, a receiving unit 1300, a display control unit 1310, a changing unit 1320, a reception restricting unit 1330, a restriction cancel unit 1340, an information changing unit 1400, and a second change cancel unit 1410.

For example, the data storage unit 1000 is implemented by at least one of the storage unit 12, the storage unit 32, and the database 34. For example, the functional blocks other than the data storage unit 1000 are implemented by the control unit 11 of the game terminal 10. Some of the functional blocks other than the data storage unit 1000 may be implemented by the control unit 11 of the game terminal 10, and the rest may be implemented by the control unit 31 of the server 30. Alternatively, all of the functional blocks other than the data storage unit 1000 may be implemented by the control unit 31 of the server 30.

[3-1] In the game system 1, a game is executed in which a game object moves in a virtual space. For example, in the game system 1, a game is executed in which a plurality of game objects each move in a virtual space. Specifically, in the game system 1, a plurality of game objects that are members of a game object group are placed in a virtual space, and a game is executed in which each of the game objects moves in the virtual space.

The "virtual space" is a virtual space displayed on the display unit. In other words, the "virtual space" is a virtual space constructed in the main memory (or VRAM). The "virtual space" may be a three-dimensional space or a two-dimensional space.

The "game object" is an object that moves in the virtual space. In other words, the "game object" is an object that is placed in the virtual space and changes its position in the virtual space. The "game object" may also be referred to as a moving object, which represents an object moving in the virtual space. For example, the display unit 15 displays an image of the virtual space, thereby displaying the "game object."

For example, the "game object" is an object that represents a person. The "person" may be a real person or an imaginary person. For example, the "game object" may be an object that represents a living being other than a person. The "living being" may be real or fictional. For example, the "game object" may be an object other than a living being. For example, the "game object" may represent a robot, a car, or a motorcycle. For example, each "game object" has performance information regarding its performance. For example, a game character is an example of the "game object".

The "game object" moves in the virtual space in response to an instruction from a computer. In other words, "a game in which a plurality of game objects each move in the virtual space" means, for example, a game in which a plurality of game objects each move in the virtual space according to the computer's instructions.

"Game objects each move according to the computer's instructions" are game objects that move in a direction determined by the computer. In other words, the "game objects each move in the virtual space according to the computer's instructions" are game objects that are determined by a computer as to whether to move, moving direction, and moving manner. The "game objects each move in the virtual space according to the computer's instructions" are game objects that are, for example, operated by the computer and may be referred to as a CPU character.

For example, in the case of a game in which the user's game objects operated by the computer act in the virtual space, the user's game objects correspond to an example of "game objects each move according to the computer's instructions." For example, in the case of a game in which opponent objects (game objects that are competing against the user or the user's game objects) controlled by the computer act in the virtual space, the opponent objects correspond to an example of "game objects each move according to the computer's instructions." Further, for example, in the case of a game in which a first game object operated by the user and a second game object operated by the computer act in the virtual space, the second game object corresponds to an example of "game objects each move according to the computer's instructions."

Further, "game objects each move in the virtual space according to the computer's instructions" means that the computer's instructions are given to each of the game objects, and each of the game objects moves in the virtual space according to the respective computer's instructions.

The "game object" may be a game object that moves in the virtual space in response to the user's instruction (operation).

The soccer game described above corresponds to an example of a "game in which a game object moves in a virtual space" or a "game in which a plurality of game objects that are members of a game object group are placed in a virtual space, and the game objects moves in the virtual space." In the soccer game described above, the virtual space VW corresponds to an example of a "virtual space."

In the soccer game described above, the player character PC (user character UC or opponent character OC) corresponds to an example of the "game object". In a soccer game such as the soccer game described above in which the user watches a soccer match between a user team operated by the computer and an opponent team operated by the computer as a coach or a team owner, each player character PC (user character UC) belonging to the user team is an example of the "game objects each move according to the computer's instructions." In this case, each player character PC (opponent character OC) belonging to the opponent team is also an example of the "game objects each move according to the computer's instructions." For example, in the case of a soccer game in which a soccer match is played between a user team operated by a user and an opponent team operated by a computer, a player character PC (opponent character OC) belonging to the opponent team is an example of the "game objects each move according to the computer's instructions." In this case, a player character PC (user character UC) that belongs to the user team and is not operated by the user, i.e., a player character PC operated by the computer, is also an example of a "game objects each move according to the computer's instructions."

[3-2] The data storage unit 1000 stores the data necessary to execute a game. Here, an example of the data necessary to execute the soccer game described above will be discussed as an example of the data stored in the data storage unit 1000. As shown in FIG. 10, the data storage unit 1000 stores card list data D1010, owned card list data D1020, user deck data D1030, opponent deck data D1040, and match status data D1050.

[3-2-1] The card list data D1010 is data indicating a list of player cards provided by the game system 1. FIG. 11 shows an example of the card list data D1010. As shown in FIG. 11, the card list data D1010 includes "card ID", "player name", "position", "image", "overall ability", "ability", "influence value", "cost", and "skill" fields.

The "card ID" field indicates a card ID, which is identification information that uniquely identifies each player card. The "player name", "position", "image", "overall ability", and "ability" fields indicate a name, specialty position, image, overall ability information, and ability information of a player character associated with the player card. The "ability" field includes numerical values that indicate levels of abilities (e.g., running, passing, shooting, dribbling, defending) of the player character associated with the player card.

The "influence value", "cost", and "skill" fields indicate the influence information, cost information, and skill information of the player card. In the "Influence value" field, influence values of the player card for each of the areas A1 to A7 are registered.

[3-2-2] The owned card list data D1020 is data showing the list of player cards owned by the user. FIG. 12 shows an example of the owned card list data D1020. In a case where the owned card list data D1020 is stored in the storage unit 32 of the server 30 or the database 34, the owned card list data D1020 is stored for each user (associated with the user ID). The user ID is identification information for uniquely identifying each user.

As shown in FIG. 12, the owned card list data D1020 includes "serial number" and "card ID" fields. The "serial number" field indicates a serial number that uniquely identifies the player card owned by the user. The "card ID" field indicates a card ID of the player card owned by the user. If the user has a plurality of player cards, the card IDs of these player cards are the same but the serial numbers are different.

[3-2-3] The user deck data D1030 is data indicating the deck used by the user (i.e., the deck set by the user). In a case where the user deck data D1030 is stored in the storage unit 32 of the server 30 or the database 34, the user deck data D1030 is stored for each user (associated with the user ID).

As mentioned above, the deck corresponds to a soccer team (see FIG. 5), and the user deck data D1030 includes formation data. The formation data is data indicating the soccer formation (e.g. "4-3-3") set by the user. The user deck data D1030 includes the member data D1031.

FIG. 13 shows an example of the member data D1031. The member data D1031 is a list of player cards that are set as members of the deck from the player cards registered in the owned card list data D1020. As shown in FIG. 13, the member data D1031 includes "member number", "card ID", "starting member flag", and "position number" fields.

The "member number" field indicates a member number that uniquely identifies a member of the deck. The "card ID" field indicates a card ID of a player card selected as a member of the deck. In the "starting member flag" field, a starting member flag indicating whether the player card is set as a starting member is registered. The starting member flag is set to ON (1) when the player card is set as a starting member, and set to OFF (0) when the player card is not set as a starting member. The "position number" field indicates a position in the formation.

For example, the starting member flag is set to ON for the player cards associated with the parts P210-1 to P210-11 of the deck setup image G200, and the starting member flag is set to OFF for the player cards associated with the parts P220-1 to P220-7. For example, the numerical value "n" is set in the "position number" field for the player card associated with the part P210-n. The "position number" field is set to null for the player cards associated with the parts P220-1 to P220-7.

[3-2-4] The opponent deck data D1040 is data indicating the deck used by the opponent. Similarly to the user deck data D1030, the opponent deck data D1040 includes formation data and member data.

[3-2-5] The match status data D1050 is data indicating the current status of the match between the user team and the opponent team. As shown in FIG. 10, the match status data D1050 includes progress data D1051, card point data D1052, momentum value data D1053, virtual space status data D1054, character status data D1055, first card usage status data D1056, and second card usage status data D1057.

[3-2-6] The progress data D1051 indicates the progress of the match. FIG. 14 shows an example of the progress data D1051. As shown in FIG. 14, the progress data D1051 includes "elapsed time" and "score" fields. The "elapsed time" field indicates the time that has elapsed since the start of the game. This elapsed time is indicated by the time in the virtual space VW. For example, a numerical value indicating the elapsed time in ⅟60th of a second is registered in the "elapsed time" field. In the example shown in FIG. 14, the value "25200" is registered in the "elapsed time" field, which indicates that seven minutes have passed since the start of the match. The "score" field indicates the scores of each of the user team and the opponent team.

[3-2-7] The card point data D1052 is data regarding the card points of the user and the opponent. FIG. 15 shows an example of the card point data D1052. As shown in FIG. 15, the card point data D1052 includes "card point" and "elapsed time" fields. The "card point" field indicates the current card points of the user and the opponent.

The "elapsed time" field indicates elapsed time. This elapsed time is indicated by the time in the virtual space VW. For example, a numerical value indicating the elapsed time in ⅟60th of a second is registered in the "elapsed time" field.

As mentioned above, each time a predetermined time (e.g., one minute in the virtual space VW) elapses, the card points of each of the user and the opponent are increased by one point. The "elapsed time" field is used to determine whether a predetermined time has elapsed.

For example, in the case where the card points of each of the user and the opponent are increased by one point for every time one minute elapses in the virtual space VW, the value of the "elapsed time" field is increased as time passes, and, when the value of the "elapsed time" field reaches 3600 or more, the card points of the user and the opponent are each increased by one point, and the value of the "elapsed time" field is initialized to zero. Then, the value of the "elapsed time" field is increased as time passes, and again, when the value of the "elapsed time" field reaches 3600 or more, the card points of both the user and the opponent are increased by one point.

[3-2-8] The momentum value data D1053 is data relating to a momentum value of each of the areas A1 to A7. FIG. 16 shows an example of the momentum value data D1053. The momentum value data D1053 includes "area" and "momentum value" fields and indicates a current momentum value for each of the areas A1 to A7.

[3-2-9] The virtual space status data D1054 is data indicating the current status of the virtual space VW. For example, the virtual space status data D1054 includes status information indicating the current state of the viewpoint VP (e.g., position, viewing direction VD) and the state information indicating the current state of the ball BO (e.g., position, movement direction, movement speed).

[3-2-10] The character status data D1055 shows the current status of each of the player characters PC (user character UC and opponent character OC). FIG. 17 shows an example of the character status data D1055. As shown in FIG. 17, the character status data D1055 includes "character number", "team", "card ID", "ability", "participation flag", "substitution flag", "position number", "position", "orientation", "movement speed", "playback motion", and "playback frame" fields.

The "character number" field indicates a character number that uniquely identifies each of the player characters PC (user character UC and opponent character OC). The "team" field indicates the team that the player character PC belongs to. The "card ID" field indicates a card ID of a player card with which the player character PC is associated.

The "ability" field includes subfields of "original ability" and "current ability." The "original ability" field indicates the original (normal) value of the player character PC's abilities (e.g., running, passing, shooting, dribbling, defending). The "current ability" field indicates the current value of the abilities of the player character PC.

To start the match, the values of the various abilities registered in the "ability" field of the card list data D1010 are registered in the "original ability" and "current ability" fields. The value of the "current ability" field is referred to when making the player character PC perform actions during the match.

For example, if a player character PC is on the user team and located in the dominant area of the user team, the values of the "current ability" field is increased so that the player character PC's ability is higher than the original ability. When the player character PC moves out of the dominant area of the user team, the values of the "original ability" field are registered in the "current ability" field so that the player character PC's ability returns to the original ability.

The "participation flag" field includes a participation flag indicating whether the player character PC is (or has been) participating in the match. If the player character PC has not played in the match yet, the participation flag is set to OFF (0), and if the player character PC plays in the match, the participation flag is set to ON (1).

The "substitution flag" field includes a substitution flag indicating whether the player character PC has been substituted by another player character PC in the match. The substitution flag is initialized to OFF (0), and is set to ON (1) when the player character PC in the match is substituted by another player character PC.

As such, the player character PC with the participation flag set to ON and the substitution flag set to OFF is a player character PC that is currently participating in the match. The player character PC with both the participation flag and the substitution flag set to ON is a player character PC that has played in the match but has already been substituted by another player PC. The player character PC with both the participation flag and the substitution flag set to OFF is a reserve player character PC that has not yet played in the match.

The information of the player character PC playing in the match is stored in the fields of "position number", "position", "orientation", "movement speed", "playback motion" and "playback frame." For the player character PC that is not playing in the match, such fields are set to null.

The "position number" field indicates which position in the formation the player character is assigned to. The "position" field indicates the current position of the player character in the virtual space VW. The "orientation" field indicates the current orientation the player character is facing. The position and orientation are indicated in the world coordinate system. The "movement speed" indicates the current movement speed of the player character. The "playback motion" field indicates the motion data currently being played for the player character. In other words, the "playback motion" field indicates the type of motion that the player character is currently performing. The "playback frame" field indicates the current playback position of the motion data. For example, which frame of the motion data is currently being played is registered in the "playback frame" field.

[3-2-11] The first card usage status data D1056 is data indicating the usage status of the player card by the user. FIG. 18 shows an example of the first card usage status data D1056. The first card usage status data D1056 includes information about five player cards selected as the user's candidate cards. The match image G300 shows the five parts P340-1 to P340-5, which represent the five player cards registered in the first card usage status data D1056.

As shown in FIG. 18, the first card usage status data D1056 includes "card ID", "cost", "influence value (increase effect)", "usage flag", and "elapsed time" fields. The "card ID" and "cost" fields indicate the card ID and cost information of the player card selected as the user's candidate card.

The "influence value (increase effect)" field indicates the current influence value of the player card for each of the areas A1 to A7. That is, the "influence value (increase effect)" field indicates the effect of the player card to increase a momentum value of each of the areas A1 to A7. The "usage flag" field includes a usage flag indicating whether the player card has been used by the user. If the player card is not used by the user, the usage flag is set to OFF (0), and if the player card is used by the user, the usage flag is set to ON (1).

The "elapsed time" field indicates elapsed time. This elapsed time is indicated by the time in the virtual space VW. For example, a numerical value indicating the elapsed time in 1/60th of a second is registered in the "elapsed time" field. As described above, in the soccer game, when a player card is used, the increase effect by the player card on the momentum value of the area A is weakened for every predetermined amount of time (e.g., five minutes in the virtual space VW). The "elapsed time" field is used to determine whether a predetermined time has elapsed.

For example, in the case where the player card's increase effect on the momentum value of the area A is weakened every five minutes in the virtual space VW after the player card is used, the value of the "elapsed time" field increases over time. When the value of the "elapsed time" field reaches 18000 or more, it is determined that five minutes have passed, and the value of the "elapsed time" field is initialized to zero. The value of the "elapsed time" field is increased again as time passes and reaches 18000 or more, it is determined that five minutes have passed.

[3-2-12] The second card usage status data D1057 is data showing the usage status of the player card by the opponent. FIG. 19 shows an example of the second card usage status data D1057. As shown in FIG. 19, the second card usage status data D1057 includes "card ID", "cost", "influence value (decrease effect)", "usage flag", and "elapsed time" fields. The "influence value (decrease effect)" field indicates the current influence value of the player card for each of the areas A1 to A7. That is, the "influence value (decrease effect)" field indicates the effect of the player card to decrease a momentum value of each of the areas A1 to A7. The other fields are the same as in the first card usage status data D1056, and thus are not described here.

[3-2-13] The data to be stored in the data storage unit 1000 is not limited to the data described above. For example, the data for specifying the areas A1 to A7 on the pitch PT are also stored in the data storage unit 1000.

[3-3] Next, the basic structure of the motion control unit 1100, the performance changing unit 1200, the first change cancel unit 1210, the receiving unit 1300, the information changing unit 1400, and the second change cancel unit 1410 will be explained.

[3-3-1] The motion control unit 1100 controls a motion of a game object based on the performance information of the game object. For example, the motion control unit 1100 controls a motion of each of the game objects placed in the virtual space based on the performance information of each of the game objects. For example, the motion control unit 1100 moves the game object in the virtual space. For example, the motion control unit 1100 causes the game object to perform actions other than movement in the virtual space.

The "performance information" is information about performance of a game object and is associated with the game object. For example, "performance information" is information that indicates the level of performance of the game object. For example, "performance information" may be information that indicates the presence of a particular performance. For example, information indicating whether a game object has mastered a certain skill is also an example of "performance information." The "performance information" may be numerical information representing the performance, or non-numerical information representing the performance.

"Controls a motion of a game object based on the performance information" means to control the speed, accuracy (precision), or result (success or failure) of the motion of the game object based on the performance information. For example, "control the speed of the action of the game object based on performance information" means to control the speed of movement of the game object based on the performance information. The phrase "controls a motion of a game object based on the performance information" may mean to determine whether to make a game object perform a special motion based on the performance information (e.g., whether the game object has acquired a skill to perform the special motion).

In the soccer game described above, the ability information of the player character PC is an example of "performance information." In other words, numerical values indicating levels of abilities of the player character PC (e.g., running, passing, shooting, dribbling, defensing) is an example of "performance information."

The motion control unit 1100 controls a motion of a player character PC based on the ability information of the player character PC. For example, the motion control unit 1100 controls the movement speed and dribbling speed of the player character PC based on the ability information (e.g., running ability information or dribbling ability information) of the player character PC. The motion control unit 1100 controls the accuracy of the kicking motion (e.g., passing or shooting) of the player character PC based on the ability information (e.g., passing ability information or shooting ability information) of the player character PC. In addition, the motion control unit 1100 controls whether the player character PC can successfully pass, shoot, dribble, or tackle based on the ability information of the player character PC (e.g., passing ability information, shooting ability information, dribbling ability information, defensing ability information). Specifically, the motion control unit 1100 controls the success probability of pass, shot, dribble, or tackle of the player character PC based on the ability information.

In the soccer game described above, the overall ability information of the player character PC can also be an example of "performance information," and the motion control unit 1100 may control the motion of the player character PC based on the overall ability information of the player character PC.

Further, in a case where information indicating whether a player character has mastered a special skill is associated with each player character as "ability information," such information may also correspond to "performance information." In this case, the motion control unit 1100 may determine whether to make a player character PC perform a special move (e.g., a special feint move) based on information about whether the player character PC has mastered the special skill (the skill to perform the special move).

[3-3-2] The performance changing unit 1200 changes (modifies) the performance information when the game object is located in a target area in the virtual space based on first change information (performance change information) related to the change of the performance information associated with the target area. The performance changing unit 1200 changes the performance information of one of a plurality of game objects in the virtual space when the game object is positioned in a target area based on the first change information associated with the target area.

The "target area" is an area in the virtual space. The "target area" is an area to which the first change information is associated. The "target area" is an area in which whether a game object is located is to be determined. The "target area" is an area where the performance information of the game object should be changed. In other words, the "target area" is an area where the performance information of the game object is set to the performance information that has been changed based on the first change information.

For example, the target area is a part of the virtual space. For example, the virtual space includes a plurality of target areas, and each of the target areas is associated with the first change information. In this case, the performance changing unit 1200 changes performance information, for each of the target areas in the virtual space, when a game object is located in a target area based on the first change information associated with such a target area. The virtual space may include only one target area. Alternatively, the entire virtual space may a single target area.

The target area may be a fixed area set by the game developer, for example, or an area freely set by the user. In other words, a position, size, or shape of the target area in the virtual space may be set in advance by the game developer, or may be freely set by the user before the start of the match or at halftime.

The "performance information when a game object is located in a target area in the virtual space" is performance information used (referred to) by the motion control unit 1100 to control the motion of a game object when the game object is located in the target area.

The "first change information" is information as the basis for changing performance information, and may be rephrased as "performance change information", for example.

For example, "first change information" is information as the basis for determining whether to change the performance information of a game object.

For example, "first change information" is information as the basis for determining how to change the performance information of a game object. Specifically, "first change information" is the information as the basis for determining whether to change the performance information so as to increase the performance of the game object (or to change the performance information so as to decrease the performance of the game object).

Alternatively, "first change information" may be information as the basis for determining whether to change the performance information of the game object in favor of the user (or whether to change the performance information of the game object to disadvantage of the user).

In the case of a game in which the user's game object acts in the virtual space, changing the performance information of the user's game object so as to increase the performance of the game object is an example of "to change the performance information of the game object in favor of the user." Further, changing the performance information of the user's game object so as to decrease the performance of the game object is an example of "to change the performance information of the game object to disadvantage of the user."

In the case of a game in which an opponent object, which is a game object competing against the user or the user's game object, acts in the virtual space, changing the performance information of the opponent object so as to decrease the performance of the opponent object is an example of "to change the performance information of the game object in favor of the user." Further, changing the performance information of the opponent object so as to increase the performance of the opponent object is an example of "to change the performance information of the game object to disadvantage of the user."

In the case of a game in which a game object used by the user and a game object used by the opponent act in the virtual space, changing the performance information of the game object used by the user so as to increase the performance of the game object, or changing the performance information of the game object used by the opponent so as to decrease the performance of the game object is an example of "to change the performance information of the game object in favor of the user." Further, changing the performance information of the game object used by the user so as to decrease the performance of the game object, or changing the performance information of the game object used by the opponent so as to increase the performance of the game object is an example of "to change the performance information of the game object to disadvantage of the user."

In the case of a game in which a game object group used by the user and a game object group used by the opponent act in the virtual space, a game object that is a member of the game object group used by the user corresponds to "game object used by the user", and a game object that is a member of the game object group used by the opponent corresponds to "game object used by the opponent."

Alternatively, "first change information" may be, for example, information as the basis for determining the degree of change in the performance information of the game object.

For example, index information that indicates superiority or inferiority (advantage or disadvantage) of a game object in a target area is set as "first change information." For example, if the index information (first change information) indicates that the game object has an advantage in the target area, the performance information is changed to increase the performance of the game object. For example, if the index information (first change information) indicates that the game object has a disadvantage in the target area, the performance information is changed to decrease the performance of the game object.

"Changing the performance information when a game object is located in a target area in the virtual space" means setting the performance information when the game object is located in the target area to the performance information that is changed from the original performance information. Here, "original performance information" indicates the performance information before the change and the performance that the game object originally has. In other words, the "original performance information" is the performance information when the game object is located in an area outside the target area (an area with which no first change information is associated). In other words, "original performance information" is performance information when the game object is located in an area outside the target area (an area with no first change information associated). In other words, the "original performance information" is performance information that is used (referred to) by the motion control unit 1100 so as to control the motion of the game object when the game object is located in an area outside the target area (an area with which the first change information is not associated).

For example, the performance changing unit 1200 determines whether to change the performance information when the game object is located in the target area based on the first change information associated with the target area. Specifically, the performance changing unit 1200 determines whether the first change information associated with the target area satisfies a predetermined condition, thereby determining whether to change the performance information when the game object is located in the target area. Upon determining to change the performance information, the performance changing unit 1200 changes the performance information when the game object is located in the target area.

For example, the performance changing unit 1200 may determines a degree of changing the performance information when the game object is located in the target area based on the first change information associated with the target area. That is, the performance changing unit 1200 may determines the degree of changing the performance information when the game object is located in the target area to a degree that is determined based on the first change information associated with the target area.

In other words, the performance changing unit 1200 sets the performance information when the game object is located in the target area to the performance information that is changed based on the first change information associated with the target area. Here, "performance information that is changed based on the first change information" means performance information obtained by changing the original performance information of the game object based on the first change information.

If the performance information when the game object is located in the target area is changed by the performance changing unit 1200, the performance information changed by the performance changing unit 1200 is used by the motion control unit 1100 to control the motion of the game object.

The performance changing unit 1200 changes the performance information of the game object in response to the movement of the game object into the target area based on the first change information associated with the target area. "Changes the performance information of the game object in response to the movement of the game object into the target area" may indicate changing the performance information of the game object immediately after the game object moves into the target area, or changing the performance information of the game object after a predetermined period of time has elapsed after the game object moves into the target area. Alternatively, "changes the performance information of the game object in response to the movement of the game object into the target area" may indicate changing the performance information of the game object before the game object moves into the target area and it is determined that the game object moves into the target area.

The performance changing unit 1200 may change the performance information when the game object is located in the target area based on the first change information associated with the target area and type information regarding the type of the game object.

The "type information" is information about the type of the game object and is associated with the game object.

For example, an example of "type information" is information indicating whether a game object is a game object of a certain type or not.

For example, an example of "type information" is information indicating whether a game object has a particular performance.

For example, in the case of a game in which a game object (or a game object group) used by the user and a game object (or a game object group) used by the opponent act in the virtual space, the information indicating the game object used by the user (or a game object that is a member of the game object group used by the user) or the game object used by the opponent (or a game object that is a member of the game object group used by the opponent) is an example of "type information."

For example, when the game object type is a specific type, the performance changing unit 1200 may not change the performance information when the game object is located in the target area based on the first change information, and only when the game object type is not a specific type, the performance changing unit 1200 may change the performance information when the game object is located in the target area based on the first change information.

For example, when the game object type is not a specific type, the performance changing unit 1200 may not change the performance information when the game object is located in the target area based on the first change information, and only when the game object type is a specific type, the performance changing unit 1200 may change the performance information when the game object is located in the target area based on the first change information.

For example, the performance changing unit 1200 may set the degree of the change of the performance information when the game object is located in the target area based on the first change information to be smaller (or larger) in the case where the game object is a specific type than in the case where the game object is not a specific type.

For example, the performance changing unit 1200 may change the performance information when the game object is located in the target area only when the first change information associated with the target area satisfies a predetermined condition and the type of the game object located in the target area is a specific type. For example, when the first change information associated with the target area satisfies a first condition and the type of the game object located in the target area is a first type, or when the first change information associated with the target area satisfies a second condition and the type of the game object located in the target area is a second type, the performance changing unit 1200 may change the performance information when the game object is located in the target area.

For example, if the first change information satisfies the first condition, the performance changing unit 1200 may change the performance information when the game object is located in the target area so as to increase the performance if the game object is the first type, and may change the performance information when the game object is located in the target area so as to decrease the performance if the game object is the second type.

On the other hand, if the first change information satisfies the second condition, the performance changing unit 1200 may change the performance information when the game object is located in the target area so as to increase the performance if the game object is the second type, and may change the performance information when the game object is located in the target area so as to decrease the performance if the game object is the first type.

For example, the target area may be associated with first change information corresponding to each type of game object. The performance changing unit 1200 may change the performance information when the game object is located in the target area based on the first change information that is corresponding to the type of the game object and associated with the target area.

In the soccer game described above, each of the areas A1 to A7 corresponds to an example of "target area", and a momentum value of each of the areas A1 to A7 corresponds to an example of "first change information." The sum of the influence values of area An of the cards used by the user (increase effect on the momentum value of the area An) also corresponds to an example of "first change information" of area An (n: integer from 1 to 7). That is, among the player cards registered in the first card usage status data D1056, the sum of the influence values of area An (increase effect on the momentum value of the area An) of the player card with the usage flag "ON" is also an example of the "first change information" of area An. The sum of the influence values of area An of the cards used by the opponent (decrease effect on the momentum value of the area An) also corresponds to an example of "first change information" of area An (n: integer from 1 to 7). That is, among the player cards registered in the second card usage status data D1057, the sum of the influence values of area An (decrease effect on the momentum value of the area An) of the player card with the usage flag "ON" is also an example of the "first change information" of area An. The team to which the player character PC belongs is an example of "type information."

In the soccer game described above, the performance changing unit 1200 changes the ability information when the player character PC is located in the area A1 based on the momentum value of the area A1 and the team to which the player character PC belongs. The same applies to the areas A2 to A7.

If a user character UC is located in the dominant area of the user team, the performance changing unit 1200 sets the ability information of the user character UC higher than the original ability information. In other words, when the momentum value of the area A1 is greater than zero and the player character PC located in the area A1 is a user character UC, the performance changing unit 1200 sets the ability information of the player character PC located in the area A1 higher than the original ability information. In other words, if the sum of the influence values of the area A1 of the user's used cards (the increase effect on the momentum value of the area A1) is greater than the sum of the influence values of the area A1 of the opponent's used cards (the decrease effect on the momentum value of the area A1) and a player character PC located in the area A1 belongs to the user team, the performance changing unit 1200 sets the ability information of the player character PC located in the area A1 higher than the original ability information.

If an opponent character OC is located in the dominant area of the opponent team, the performance changing unit 1200 sets the ability information of the opponent character OC higher than the original ability information. In other words, when the momentum value of the area A1 is less than zero and the player character PC located in the area A1 is an opponent character OC, the performance changing unit 1200 sets the ability information of the player character PC located in the area A1 higher than the original ability information. In other words, if the sum of the influence values of the area A1 of the user's used cards (the increase effect on the momentum value of the area An) is smaller than the sum of the influence values of the area A1 of the opponent's used cards (the decrease effect on the momentum value of the area An), and a player character PC located in the area A1 belongs to the opponent team, the performance changing unit 1200 sets the ability information of the player character PC located in the area A1 higher than the original ability information.

When the user character UC is located in the dominant area of the opponent team, the performance changing unit 1200 may set the ability information of the user character UC lower than the original ability information. When the opponent character OC is located in the dominant area of the user team, the performance changing unit 1200 may set the ability information of the opponent character OC lower than the original ability information.

The performance changing unit 1200 may limit the type of the player character PC for which the ability information is changed to the user character UC. In other words, the performance changing unit 1200 may not change the ability information of the opponent character OC even if the opponent character OC is located in the dominant area of the opponent team. Alternatively, the performance changing unit 1200 may limit the type of the player character PC for which the ability information is changed to the opponent character OC.

The information on whether a user character UC has acquired a special skill may also "type information." For example, in a case where the user character UC has acquired a special skill, the performance changing unit 1200 may increase the degree of increase in the ability information when the user character UC is located in the dominant area of the user team compared to a case where the user character UC has not acquired a special skill. Alternatively, in a case where the user character UC has acquired a special skill, the performance changing unit 1200 may reduce the degree of decrease in the ability information when the user character UC is located in the dominant area of the opponent team compared to a case where the user character UC has not acquired a special skill. Further, if the user character UC has acquired a special skill, the performance changing unit 1200 may not reduce the ability information when the user character UC is located in the dominant area of the opponent team. The same applies to the opponent character OC. In this way, the performance changing unit 1200 may change the ability information by considering whether the user character UC (or the opponent character OC) has acquired a special skill.

The information on whether the user character UC is a skilled player (in other words, the number of years of experience of the user character UC as a soccer player) can also be "type information." For example, in a case where the user character UC is a skilled player (i.e., the user character UC has more than a predetermined number of years of experience), the performance changing unit 1200 may increase the degree of increase in the ability information when the user character UC is located in the dominant area of the user team compared to a case where the user character UC is not a skilled player (i.e., the user character UC has less than a predetermined number of years of experience). Alternatively, in a case where the user character UC is a skilled player, the performance changing unit 1200 may reduce the degree of decrease in the ability information when the user character UC is located in the dominant area of the opponent team compared to a case where the user character UC is not a skilled player. Further, if the user character UC is a skilled player, the performance changing unit 1200 may not reduce the ability information when the user character UC is located in the dominant area of the opponent team. The same applies to the opponent character OC. In this way, the performance changing unit 1200 may change the ability information by considering whether the user character UC (or the opponent character OC) is a skilled player.

Each of the areas A1 to A7 may have two momentum values, which are a momentum value of the user team and a momentum value of the opponent team. That is, for example, the sum of the influence values in the area A1 of the user's used cards may be set as the momentum value of the user team in the area A1, and the sum of the influence values in the area A1 of the opponent's used cards may be set as the momentum value of the opponent team in the area A1. In this case, for example, if the momentum value of the user team in the area A1 (the sum of the influence values of the user's used cards in the area A1) is greater than zero, the performance changing unit 1200 may set the ability information of the user character UC located in the area A1 higher than the original ability information. Similarly, if the momentum value of the opponent team in the area A1 (the sum of the influence values of the opponent's used cards in the area A1) is greater than zero, the performance changing unit 1200 may set the ability information of the opponent character OC located in the area A1 higher than the original ability information. The same applies to the areas A2 to A7.

[3-3-3] The first change cancel unit 1210 cancels the change of the performance information of the game object based on the first change information (performance change information) associated with the target area in response to the game object in the target area moving out of the target area.

To "cancel the change of the performance information based on the first change information associated with the target area" means to change the performance information of the game object from the state in which the change is made based on the first change information associated with the target area to the state in which the change is canceled.

For example, the first change cancel unit 1210 immediately cancels the change when the game object located in the target area moves out of the target area. Alternatively, the first change cancel unit 1210 may cancel the change when a predetermined period of time has elapsed after the game object located in the target area is moved outside of the target area. Further, the first change cancel unit 1210 may cancel the change when it is determined that the game object moves out of the target area before the game object moves out of the target area.

For example, when the game object located in the target area moves to an area that is outside of the target area and is not associated with the first change information, the first change cancel unit 1210 restores the performance information of the game object to the original performance information, thereby cancelling the change based on the first change information associated with the target area.

Alternatively, when the game object located in the first target area moves to the second target area, the first change cancel unit 1210 changes the performance information of the game object from the state in which the change is made based on a first change state associated with the first target area to the state in which the change is made based on a first change state associated with the second target area, thereby canceling the change based on the first change state associated with the first target area.

In the soccer game described above, for example, when the area A1 is the dominant area of the user team (i.e., the momentum value of the area A1 is greater than zero), the performance changing unit 1200 sets the ability information of the user character UC located in the area A1 higher than the original ability information. If the user character UC located in the area A1 moves out of the area A1 after the performance changing unit 1200 makes such change (the change of the ability information of the user character UC based on the momentum value of the area A1), the first change cancel unit 1210 cancels such change by the performance changing unit 1200. The same applies to the areas A2 to A7.

For example, when the area A1 is the dominant area of the opponent team (i.e., the momentum value of the area A1 is smaller than zero), the performance changing unit 1200 sets the ability information of the opponent character OC located in the area A1 higher than the original ability information. If the opponent character OC located in the area A1 moves out of the area A1 after the performance changing unit 1200 makes such change (the change of the ability information of the opponent character OC based on the momentum value of the area A1), the first change cancel unit 1210 cancels such change by the performance changing unit 1200. The same applies to the areas A2 to A7.

[3-3-4] The receiving unit 1300 receives a change command to change the first change information (performance change information) associated with the target area. The information changing unit 1400 changes the first change information (performance change information) associated with the target area based on the change command.

"Change command" is a command to change the first change information associated with a target area. For example, if the virtual space includes a plurality of target areas, the "change command" may indicate at least one of the target areas as an area in which the first change information should be changed. For example, the "change command" may include a command on how to change the first change information. Specifically, the "change command" may include a command on the extent to which the first change information is to be changed.

To "change the first change information" is to change the first change information so as to affect the decision of whether to change the performance information of the game object. Alternatively, to "change the first change information" is to change the first change information so as to affect the decision on how to change the performance information of the game object.

For example, if the first change information includes information on a numerical value, to "change the first change information" is to increase or decrease the numerical value indicated by the first change information. For example, if the first change information includes information that indicates one of a plurality of hierarchies, to "change the first change information" is to change the hierarchy indicated by the first change information to another hierarchy.

The receiving unit 1300 receives a change operation to change the first change information (performance change information) associated with the target area from the user. The information changing unit 1400 changes the first change information (performance change information) associated with the target area based on the change operation of the user. When the change operation is performed by the user, the information changing unit 1400 changes the first change information associated with the target area.

"Change operation" is an operation to instruct a change of the first change information associated with a target area. The "change operation" is performed by the user with the use of the operation unit 14. To "receive a change operation" is to determine whether the change operation has been performed based on an operation signal supplied by the operation unit 14. To "receive a change operation" may be to receive information indicating that the change operation has been performed from another device.

For example, if the virtual space includes a plurality of target areas and each target areas is associated with first change information, the receiving unit 1300 receives a change operation that includes a specification operation to specify (select) at least one of the target areas as an area where the first change information should be changed. When the specification operation is received, the information changing unit 1400 changes the first change information associated with the target area specified by the specification operation among the plurality of target areas.

For example, the receiving unit 1300 receives a change operation that includes a specification operation to specify how the first change information is to be changed. Specifically, the receiving unit 1300 receives a change operation that includes a specification operation to specify to what extent the first change information is to be changed. When the specification operation is received, the information changing unit 1400 changes the first change information associated with the target area in a manner (extent) specified by the specification operation.

In the soccer game described above, the operation of specifying any of the parts P340-1 to P340-5 of the match image G300 corresponds to an example of "change command", "change operation", and "specification operation." That is, the receiving unit 1300 receives an operation to specify one of the parts P340-1 to P340-5. The information changing unit 1400 changes a momentum value of at least one of the areas A1 to A7 based on the specified part P340. For example, when the part P340-1 shown in FIG. 6 is specified, the player card associated with the part P340-1 has the influence value of the area A1 set to "2", and thus the information changing unit 1400 increases the momentum value of the area A1 by two (see FIG. 7).

Seven parts representing the areas A1 to A7 may be displayed in the match image G300 instead of the parts P340-1 to P340-5. In this case, an operation to specify at least one of the seven parts that represent the areas A1 to A7 corresponds to an example of "change command", "change operation", and "specification operation". That is, the receiving unit 1300 may receive an operation to specify at least one of the seven parts, and the information changing unit 1400 may change the momentum value of the area A corresponding to the specified part.

Each of the areas A1 to A7 may have two momentum values, which are a momentum value of the user team and a momentum value of the opponent team. That is, for example, the sum of the influence values in the area A1 of the user's used cards may be set as the momentum value of the user team in the area A1, and the sum of the influence values in the area A1 of the opponent's used cards may be set as the momentum value of the opponent team in the area A1. The same applies to the areas A2 to A7. In this case, the information changing unit 1400 may change the momentum value of the user team in at least one of the areas A1 to A7 based on the change command of the user. The information changing unit 1400 may change the momentum value of the opponent team in at least one of the areas A1 to A7 based on the change command of the opponent.

[3-3-5] The second change cancel unit 1410 cancels the change by the information changing unit 1400 when a predetermined period of time has elapsed in a state where the first change information (performance change information) associated with the target area is changed by the information changing unit 1400.

The "predetermined period of time" is a period of time during which the first change information associated with the target area is changed. In other words, the "predetermined period of time" is a period during which a change made by the information changing unit 1400 remain in effect.

The length of the "predetermined period of time" may or may not be constant. For example, the length of the "predetermined period of time" may be randomly determined. For example, the length of the "predetermined period of time" may vary depending on the target area.

For example, the "predetermined period of time" starts from a point of time at which the first change information associated with the target area is changed by the information changing unit 1400.

For example, the "predetermined period of time" may start from a point of time at which a predetermined condition is satisfied after the first change information associated with the target area is changed by the information changing unit 1400.

Specifically, for example, the "predetermined period of time" may start from a point of time at which, after the first change information associated with a target area is changed by the information changing unit 1400, any game object moves into such a target area. For example, in a game between a user and an opponent, when the first change information associated with a target area is changed in response to the user's change command, the "predetermined period of time" may start from a point of time at which a game object (user object) used by the user moves into the target area after the change is made. On the other hand, when the first change information associated with a target area is changed in response to the opponent's change command, the "predetermined period of time" may start from a point of time at which a game object (opponent object) used by the opponent moves into the target area after the change is made.

To "cancel the change by the information changing unit 1400" means to change the first change information associated with the target area from the state in which the change is made based by the information changing unit 1400 to the state in which the change is canceled.

For example, the second change cancel unit 1410 unconditionally (immediately) cancels the change made by the information changing unit 1400 when the predetermined period of time has elapsed. Alternatively, the second change cancel unit 1410 may cancel the change made by the information changing unit 1400 under a predetermined condition when the predetermined period of time has elapsed. For example, when the predetermined period of time has elapsed, the second change cancel unit 1410 may randomly determine whether to cancel the change by the information changing unit 1400 based on a predetermined probability, and, if it is determined to cancel the change, may cancel the change by the information changing unit 1400. If it is determined not to cancel the change, after another predetermined period of time has elapsed, the second change cancel unit 1410 may randomly determine whether to cancel the change by the information changing unit 1400 based on the predetermined probability.

In the soccer game described above, for example, the player card associated with the part P340-1 shown in FIG. 6 has the influence value of area A1 set to "2", and thus, when the part P340-1 is specified by the user (i.e., the player card associated with the part P340-1 is used by the user), the information changing unit 1400 increases the momentum value of the area A1 by two. In this case, when a predetermined period of time elapses after the part P340-1 is specified (i.e., the player card associated with part P340-1 is used), the second change cancel unit 1410 decreases the momentum value of the area A1 by one, and, when another predetermined time elapses, decreases the momentum value of the area A1 by one. In this way, the change in the momentum value of the area A1 by the information changing unit 1400 (increase by two) is canceled.

As described above, in the case where the momentum value of the area A1 is increased by two when the user specifies the part P340-1 shown in FIG. 6 (i.e., the player card associated with the part P340-1 is used), the second change cancel unit 1410 may wait for any of the user characters UC to be positioned in the area A1 if none of the user characters UC is positioned in the area A1. When a predetermined period of time elapses after any of the user characters UC is positioned in area A1, the second change cancel unit 1410 may decrease the momentum value of the area A1 by one, and when another predetermined period of time elapses, may decrease the momentum value of the area A1 by one.

[3-4] Next, the display control unit 1310, which is a functional block related to the receiving unit 1300, will be described.

[3-4-1] The display control unit 1310 displays an instruction object, in which at least one of the target areas is associated with the second change information relating to the change in the first change information, on the display unit 15 as the instruction object for instructing a change in the first change information associated with at least one of the target areas.

The "second change information" is information as the basis for determining how to change the first change information. For example, "second change information" is information that indicates the degree of change when the first change information is changed.

Specifically, "second change information" is information that indicates whether to change the first change information so that the performance of the game object readily increases (or such that the performance of the game object readily decreases). In other words, "second change information" may be information indicating whether to change the first change information to the user's advantage (or to the user's disadvantage). Whether it is advantageous (or disadvantageous) for the user is determined by the rules of the game.

The "instruction object" is an object displayed on the display unit 15 to allow the user to instruct a change in the first change information associated with at least one of the target areas. In other words, the "instruction object" is an object that is displayed on the display unit 15 to receive an instruction for a combination of at least one of the target areas and the second change information.

To "display an instruction object on the display unit 15" is to display an image containing the instruction object on the display unit 15. To "display the image on the display unit 15" may be sending the data for displaying the image to a game terminal 10 and thereby displaying the image on the display unit 15 of the game terminal 10. The "data for displaying the image" may be, for example, data indicating the image itself, data for generating the image, or data indicating the display of the image.

For example, the display control unit 1310 displays a plurality of instruction objects, in each of which at least one of the target areas is associated with the second change information, on the display unit 15. In this case, the instruction objects in each of which at least one target area is associated with the second change information are displayed on the display unit 15. In this case, the instruction objects are displayed on the display unit 15 as a plurality of options to select a combination of at least one target area and the second change information. The display control unit 1310 may display the instruction objects at a time or sequentially on the display unit 15. For example, the display control unit 1310 may display a predetermined number of instruction objects in order on the display unit 15.

The receiving unit 1300 receives the specification of an instruction object to be displayed on the display unit 15. To "receive the specification of an instruction object" is to receive the specification operation to specify an instruction object displayed on the display unit 15. For example, an operation to press a predetermined button while a cursor is pointing at an instruction object and an operation to tap or double-click on an instruction object are examples of "specification operation." The "predetermined button" may be a real button or a virtual button displayed on the display unit 15.

To "receive the specification of an instruction object" is to receive data indicating that the instruction object displayed on the display unit 15 has been specified. The specification of an instruction object may be received at any time during the game, or at multiple occasions set during the game.

When the instruction objects are displayed on the display unit 15, the receiving unit 1300 receives the specification of at least one of the instruction objects. To "receives the specification of at least one of the instruction objects" is to receive a specification operation to specify at least one of the multiple instruction objects. Alternatively, to "receives the specification of at least one of the instruction objects" is to receive data indicating that at least one of the instruction objects has been specified.

In response to the specification of the instruction object, the information changing unit 1400 changes the first change information associated with the target area associated with the specified instruction object based on the second change information associated with the specified instruction object. When the instruction objects are displayed on the display unit 15, the information changing unit 1400 changes the first change information associated with the target area associated with the instruction object specified from the instruction objects based on the second change information associated with the specified instruction object.

For example, when the instruction object is specified, the information changing unit 1400 changes the first change information associated with the target area associated with the specified instruction object in a manner (degree, etc.) indicated by the second change information associated with the specified instruction object.

[3-4-2] For example, in a game, a plurality of game objects, each of which is associated with at least one of a plurality of target areas and the second change information, move in the virtual space, and an instruction object is associated with at least one of the game objects.

In this case, there are a plurality of game objects each of which is associated with at least one target area and the second change information in the virtual space. The game objects moving in the virtual space include a game object associated with an instruction object. In this case, game objects other than the game object associated with at least one target area and the second change information may be placed in the virtual space. That is, the game object that is not associated with at least one of the at least one target area and the second change information may move in the virtual space. In this regard, only the game objects that are associated with at least one target area and the second change information may move in the virtual space.

In the above case, in response to the specification of the instruction object, the information changing unit 1400 changes the first change information associated with the target area associated with the game object based on the second change information associated with the game object associated with the specified instruction object.

[3-4-3] For example, in a game, a plurality of game objects in a predetermined group of game objects move in the virtual space. Each game object in the predetermined group of game objects is associated with at least one of a plurality of target areas and the second change information. The display control unit 1310 displays a plurality of instruction objects associated with the game objects in the predetermined group of game objects on the display unit 15. The receiving unit 1300 receives a specification of at least one of the instruction objects. The information changing unit 1400 changes the first change information associated with the target area associated with the game object based on the second change information associated with the game object associated with the instruction object specified from the instruction objects.

The "predetermined group of game objects" is a group of game objects.

For example, the "predetermined group of game objects" is a group of game objects set by the user before the start of the game. Specifically, the "predetermined group of game objects" is a group of game objects selected by the user as a plurality of game objects to be used in the game from the group of game objects of the user. Alternatively, the "predetermined group of game objects" may be a group of game objects set by the user by selecting a plurality of game objects to be used in the game from a plurality of groups of game objects predetermined by the game developer.

For example, the "predetermined group of game objects" may be a group of game objects owned by the user. Alternatively, the "predetermined group of game objects" may be a group of game objects predetermined by the game developer, for example.

In "a plurality of game objects in a predetermined group of game objects move in the virtual space", "a plurality of game objects in a predetermined group of game objects" may be some of a predetermined group of game objects or all of a predetermined group of game objects. In the soccer game described above, the user team corresponds to an example of "predetermined group of game objects", and eleven user characters UC participating in the match among the user characters UC belonging to the user team correspond to an example of "a plurality of game objects in a predetermined group of game objects." In the case of a soccer game where no reserve member is set and all user characters UC belonging to the user team participate in the match (i.e., the user team consists of eleven user characters), all user characters UC belonging to the user team (an example of "a plurality of game objects in a group of game objects") are equivalent to "a plurality of game objects in a predetermined group of game objects."

In "displays a plurality of instruction objects associated with the game objects in the predetermined group of game objects on the display unit 15", "game objects in the predetermined group of game objects" may be some of the game objects in the predetermined group of game objects, or all of the game objects in the predetermined group of game objects. In the above phrase, "game objects in the predetermined group of game objects" may be different from or the same as "a plurality of game objects in a predetermined group of game objects" in "a plurality of game objects in a predetermined group of game objects move in the virtual space." That is, the plurality of game objects associated with the plurality of instruction objects displayed on the display unit 15 may be different from or the same as the plurality of game objects moving in the virtual space. In the latter case, "a plurality of instruction objects associated with the game objects in the predetermined group of game objects" are a plurality of instruction objects associated with a plurality of game objects moving in the virtual space. In the soccer game described above, the five user characters UC belonging to the user team and of the eleven user characters UC participating in the match correspond to an example of "game objects in the predetermined group of game objects" in "displays a plurality of instruction objects associated with the game objects in the predetermined group of game objects on the display unit 15."

"A plurality of instruction objects associated with the game objects" are a plurality of instruction objects each associated with at least one of the plurality of game objects. For example, "a plurality of instruction objects associated with the game objects" are a plurality of instruction objects respectively associated with the plurality of game objects.

For example, in a game, the plurality of game objects specified by the user from the predetermined group of game objects move in the virtual space, and the display control unit 1310 controls the display unit 15 to display the plurality of instruction objects associated with the game objects among the plurality of game objects specified by the user.

Here, "the game objects among the plurality of game objects specified by the user" may be some of the game objects specified by the user (plurality of game objects moving in the virtual space) from among the predetermined group of game objects, or all of the game objects specified by the user (plurality of game objects moving in the virtual space) from among the predetermined group of game objects.

For example, the display control unit 1310 controls the display unit 15 to display a plurality of instruction objects associated with a plurality of game objects selected from a predetermined group of game objects based on a predetermined probability.

Here, the "predetermined probability" is the probability that each game object is selected. The same probability or different probabilities may be set for respective game objects.

For example, when the total number of game objects included in the predetermined group of game objects is N (N: an integer equal to or greater than 3), then "a plurality of game objects selected from a predetermined group of game objects based on a predetermined probability" are M game objects (M: an integer equal to or greater than 2 and less than N) that are randomly selected from the N game objects based on predetermined probability.

[3-4-4] In the soccer game described above, the areas A1 to A7 correspond to examples of "a plurality of target areas", and the influence information corresponds to an example of "second change information." Further, the player card corresponds to an example of "instruction object." Specifically, each of the parts P340-1 to P340-5 displayed in the match image G300 corresponds to an example of an "instruction object." Further, the eighteen user characters UC belonging to the user team (i.e., the eighteen player characters PC associated with the eighteen player cards in the user's deck) correspond to an example of "predetermined group of game objects."

In the soccer game described above, eleven user characters UC participating in a match among eighteen user characters UC belonging to the user team move in the virtual space VW. The display control unit 1310 displays, in the match image G300, five parts P340-1 to P340-5 representing five player cards associated with five user characters UC randomly selected from the eleven user characters UC based on the predetermined probability. The receiving unit 1300 receives the specification of one of the parts P340-1 to P340-5. The information changing unit 1400 changes a momentum value of at least one of the areas A1 to A7 based on the specified part P340. For example, the influence value of the area A1 of the player card associated with the part P340-1 shown in FIG. 6 is set to "2", and thus, when the part P340-1 is specified, the information changing unit 1400 increases the momentum value of the area A by two (see FIG. 7).

The display control unit 1310 may display, in the match image G300, the eleven parts P340 indicating the eleven player cards associated with the eleven user characters UC that are participating in the match among the eighteen user characters UC belonging to the user team.

The display control unit 1310 may also display, in the match image G300, a plurality of parts P340 indicating a plurality of player cards associated with a plurality of user characters UC selected from the seven user characters UC that are not participating in the match among the eighteen user characters UC belonging to the user team. Alternatively, the display control unit 1310 may display, in the match image G300, the seven parts P340 indicating the seven player cards associated with the seven user characters UC that are not participating in the match among the eighteen user characters UC belonging to the user team.

The display control unit 1310 may also display, in the match image G300, a plurality of parts P340 indicating a plurality of player cards associated with a plurality of user characters UC, which are selected regardless of whether they are participating in the match from among the eighteen user characters UC belonging to the user team. Alternatively, the display control unit 1310 may display, in the match image G300, eighteen parts P340 indicating the eighteen player cards associated with the eighteen user characters UC belonging to the user team.

The display control unit 1310 may display an item object other than a card as an "instruction object" in the display unit 15. In other words, the display control unit 1310 may display parts indicating item objects other than cards as "instruction objects" in the match image G300.

Alternatively, the display control unit 1310 may display the seven parts respectively indicating the areas A1 to A7 as "instruction objects" in the match image G300. In this way, the user may directly specify at least one of the areas A1 to A7.

[3-5] Next, the changing unit 1320, the reception restricting unit 1330, and the restriction cancel unit 1340 that are functional blocks related to the receiving unit 1300 will be described. [3-5-1] First, the basic structures of the changing unit 1320, the reception restricting unit 1330, and the restriction cancel unit 1340 will be described.

The changing unit 1320 changes a predetermined parameter, and includes a first changing unit 1321 and a second changing unit 1322. The first changing unit 1321 gives a first change, which is either a decrease or an increase, to a predetermined parameter when a change command is received by the receiving unit 1300. The second changing unit 1322 gives a second change, which is the other of decrease and increase, to a predetermined parameter.

The "predetermined parameter" is a parameter to which the first change, either a decrease or an increase, is given each time a change command is received by the receiving unit 1300, and a second change, the other of decrease and increase, is given based on the passage of time. The "predetermined parameter" is a parameter that is referred to as the basis for determining whether to limit the receipt of change commands by the receiving unit 1300.

For example, the first changing unit 1321 decreases the predetermined parameter when a change command is received by the receiving unit 1300, and the second changing unit 1322 increases the predetermined parameter based on the passage of time. In other words, the second changing unit 1322 adds an amount corresponding to the elapsed time to the predetermined parameter. For example, the second changing unit 1322 adds a predetermined amount to the predetermined parameter every time a predetermined time elapses.

Alternatively, the first changing unit 1321 increases the predetermined parameter when a change command is received by the receiving unit 1300, and the second changing unit 1322 decreases the predetermined parameter based on the passage of time. In other words, the second changing unit 1322 subtracts an amount corresponding to the elapsed time from the predetermined parameter. For example, the second changing unit 1322 subtracts a predetermined amount from the predetermined parameter every time a predetermined time elapses.

The reception restricting unit 1330 restricts reception of an instruction by the receiving unit 1300 based on the first change of the predetermined parameter. The restriction cancel unit 1340 cancels the restriction by the reception restricting unit 1330 based on the second change of the predetermined parameter.

[3-5-2] Next, the configuration of the changing unit 1320, the reception restricting unit 1330, and the restriction cancel unit 1340 will be described based on a precondition that a plurality of instruction objects are displayed on the display unit 15.

When at least one of the instruction objects is specified, the first changing unit 1321 gives the first change (either decrease or increase) to the predetermined parameter.

For example, the first changing unit 1321 determines an amount of the first change to the predetermined parameter to an amount that varies depending on the specified instruction object (the amount corresponding to the specified instruction object). For example, each of the instruction objects is associated with change amount information on a change amount of the first change of the predetermined parameter. The first changing unit 1321 sets a change amount of the first change to the predetermined parameter based on the change amount information associated with the specified instruction object among the instruction objects.

Here, the change amount of the predetermined parameter varies depending on the specified instruction object, although the change amount may be a constant amount regardless of the specified instruction object.

The reception restricting unit 1330 restricts reception of an instruction by the receiving unit 1300 based on the first change of the predetermined parameter. That is, the reception restricting unit 1330 prevents reception of at least one of a plurality of instruction objects based on the first change of the predetermined parameter.

For example, the reception restricting unit 1330 prevents the receiving unit 1300 from receiving at least one of the instruction objects based on the predetermined parameter and change amount information of each of the instruction objects.

The second changing unit 1322 gives a second change (the other of decrease and increase) to the predetermined parameter based on the passage of time. The restriction cancel unit 1340 cancels the restriction on the reception of the specification of at least one of the instruction objects by the reception restricting unit 1330 based on the second change of the predetermined parameter.

[3-5-2-1] For example, the first changing unit 1321 decreases the predetermined parameter when an instruction object is specified. When the predetermined parameter is decreased by the first changing unit 1321 and thus an instruction object that satisfies a predetermined restriction condition is appeared, the reception restricting unit 1330 prevents the reception of such an instruction object. Here, "instruction object that satisfies a predetermined restriction condition" is an instruction object in which, when the instruction object is specified, the predetermined parameter becomes less than the lower limit value (e.g., zero). In other words, "instruction object that satisfies a predetermined restriction condition" is an instruction object in which, when the instruction object is specified, the amount of decrease in the predetermined parameter is greater than the difference (absolute value) between the current value of the predetermined parameter and the lower limit of the predetermined parameter.

The second changing unit 1322 increases the predetermined parameter based on the passage of time. When the predetermined parameter is increased by the second changing unit 1322 and the instruction object that has satisfied the predetermined restriction condition no longer satisfies the restriction condition, the restriction cancel unit 1340 allows the reception of the specification of such an instruction object.

In the soccer game described above, the card points of the user correspond to an example of "predetermined parameter", and the cost information of the player card corresponds to an example of "change amount information."

When any of the parts P340-1 to P340-5 of the match image G300 is specified, the first changing unit 1321 reduces the points corresponding to the cost of the player card corresponding to the specified part P340 from the card points of the user. The second changing unit 1322 increases the card points of the user by one point every time a predetermined time elapses.

If the card points of the user are reduced and less than the cost of the player card corresponding to the part P340, the reception restricting unit 1330 prevents the part P340 from being specified (see FIG. 7, parts P340-2 and P340-5). Subsequently, when the card points of the user become equal to or greater than the cost of the player card corresponding to the part P340 due to the card points of the user are increased as time passes, the restriction cancel unit 1340 cancels the restriction by the restriction restricting unit 1330 and allows the user to specify such a part P340.

[3-5-2-2] Alternatively, the first changing unit 1321 increases the predetermined parameter when an instruction object is specified. When the predetermined parameter is increased by the first changing unit 1321 and thus an instruction object that satisfies a predetermined restriction condition is appeared, the reception restricting unit 1330 prevents the reception of such an instruction object. Here, "instruction object that satisfies a predetermined restriction condition" is an instruction object in which, when the instruction object is specified, the predetermined parameter exceeds the upper limit value. In other words, "instruction object that satisfies a predetermined restriction condition" is an instruction object in which, when the instruction object is specified, the amount of increase in the predetermined parameter is greater than the difference (absolute value) between the current value of the predetermined parameter and the upper limit value of the predetermined parameter.

The second changing unit 1322 decreases the predetermined parameter based on the passage of time. When the predetermined parameter is decreased by the second changing unit 1322 and the instruction object that has satisfied the predetermined restriction condition no longer satisfies the restriction condition, the restriction cancel unit 1340 allows the reception of the specification of such an instruction object.

In the soccer game described above, when one of the parts P340-1 to P340-5 of the match image G300 is specified, the first changing unit 1321 may add the points corresponding to the cost (an example of change amount information) of the player card corresponding to the specified part P340 to the card points of the user (an example of a predetermined parameter). The second changing unit 1322 may decrease the card points of the user by one point every time a predetermined time elapses.

If the card points of the user are increased and the difference between the card points of the user and a predetermined upper limit value (e.g., 10) is less than the cost of the player card corresponding to the part P340, the reception restricting unit 1330 may prevent the part P340 from being specified. Subsequently, when the difference become equal to or greater than the cost of the player card corresponding to the part P340 because the card points of the user are decreased as time passes, the restriction cancel unit 1340 may cancel the restriction by the restriction restricting unit 1330 and allow the user to specify such a part P340.

[3-6] For example, in the game system 1, a game is played in which a plurality of game objects associated with a plurality of item objects among a predetermined group of item objects move in a virtual space. Here, the motion control unit 1100, the performance changing unit 1200, the receiving unit 1300, the display control unit 1310, and the information changing unit 1400 will be described based on a precondition that such a game is executed.

The motion control unit 1100 moves a plurality of game objects associated with a plurality of item objects in a predetermined group of item objects in the virtual space. Further, the motion control unit 1100 controls the motion of the respective game objects based on the performance information of the respective game objects.

The "item object" is an item object that is associated with a game object. For example, the "item object" is an object that represents a game object in the form of an item. In other words, the "item object" is an object that is obtained by converting a game object into an item. Also, the "item object" is to be displayed in the display unit 15.

For example, the game character is an example of a "game object", and the card object representing a character in the form of a card (i.e., a card object representing a character card) is an example of an "item object".

For example, one item object is associated with one game object. In this regard, a plurality of game objects may be associated with a single item object. A plurality of item objects may be associated with the same game object. The game objects having the same name may be treated as different game objects if their performance information is different.

The "predetermined group of item objects" is a group of a plurality of item objects.

For example, the "predetermined group of item objects" is a group of item objects set by the user before the start of a game. Specifically, the "predetermined group of item objects" is a group of item objects that is set by the user when the user selects a plurality of item objects to be used in the game from the user's group of item objects. Alternatively, the "predetermined group of item objects" may be a group of item objects set by the user when the user selects a plurality of item objects to be used in the game from a plurality of groups of item objects predetermined by the game developer. The "predetermined group of item objects" may be referred to as a deck, for example.

For example, the "predetermined group of item objects" may be a group of item objects owned by the user. Alternatively, the "predetermined group of item objects" may be a group of item objects predetermined by the game developer, for example.

In the description "moves a plurality of game objects associated with a plurality of item objects in a predetermined group of item objects in the virtual space", "a plurality of item objects in a predetermined group of item objects" may be some of the item objects in the predetermined group of item objects or all of the item objects in the predetermined group of item objects. In the soccer game described above, the player card corresponds to an example of "item object," the user's deck configured to correspond to the user's team (the user's soccer team) corresponds to an example of "a predetermined group of item objects," and eleven player cards in the user's deck correspond to an example of "a plurality of item objects in a predetermined group of item objects" in the description. In the case of a soccer game in which no reserve member is set and the user characters UC associated with all of the player cards in the user's deck participate in the match (in other words, when the user's deck is formed of eleven player cards), all the player cards in the user's deck correspond to an example of "a plurality of item objects in a predetermined group of item objects" in the description.

For each of the target areas in the virtual space, the performance changing unit 1200 changes, the performance information of a game object when any of the game objects is located in a target area, based on the first change information regarding the change of performance information associated with such a target area.

The display control unit 1310 displays a plurality of item objects among from the predetermined group of item objects in the display unit 15.

In the description "displays a plurality of item objects among from the predetermined group of item objects in the display unit 15", "a plurality of item objects among from the predetermined group of item objects" may be some of the item objects among the predetermined group of item objects, or all of the item objects among the predetermined group of item objects.

The phrase "a plurality of item objects among from the predetermined group of item objects" may be different from or the same as "a plurality of item objects in a predetermined group of item objects" in the description "moves a plurality of game objects associated with a plurality of item objects in a predetermined group of item objects in the virtual space." That is, the plurality of item objects displayed in the display unit 15 may be different from or the same as the plurality of item objects associated with the plurality of objects moving in the virtual space. In the soccer game described above, eleven user characters UC associated with eleven player cards selected from the user's deck participate in the match, and five player cards selected from the eleven player cards correspond to an example of "a plurality of item objects among from the predetermined group of item objects" in the description "displays a plurality of item objects among from the predetermined group of item objects in the display unit 15."

For example, the display control unit 1310 displays a plurality of item objects as a plurality of options for selecting a combination of at least one target area and the second change information. The display control unit 1310 may display a plurality of item objects on the display unit 15 at once or sequentially. The display unit 15 may display a predetermined number of item objects in order.

The receiving unit 1300 receives the specification of at least one of the item objects to be displayed in the display unit 15. The information changing unit 1400 changes the first change information associated with at least one of the target areas based on the reception by the receiving unit 1300. For example, each item object in the predetermined group of item objects is associated with at least one of the target areas and the second change information regarding the change of the first change information. Based on the second change information associated with the item object specified from the item objects displayed in the display unit 15, the information changing unit 1400 changes the first change information associated with the target area associated with the specified item object.

In the soccer game described above, the eighteen player cards included in the user's deck correspond to an example of "a predetermined group of item objects," and the eleven user characters UC associated with eleven of the eighteen player cards included in the user's deck participate in the match. In other words, the motion control unit 1100 moves the eleven user characters UC participating in the match in the virtual space VW. For each of the areas A1 to A7, the performance changing unit 1200 changes the performance information of one of the eleven user characters UC participating in the match when the one of the eleven user characters UC is located in an area A based on the momentum value associated with the area A.

The display control unit 1310 displays the parts P340-1 to P340-5, which represent five player cards selected from the eleven player cards, in the match image G300. The receiving unit 1300 receives the specification of one of the parts P340-1 to P340-5. The information changing unit 1400 changes a momentum value of at least one of the areas A1 to A7 based on the part P340 specified from the parts P340-1 to P340-5.

The display control unit 1310 may display eleven parts P340 representing the eleven player cards in the match image G300. The display control unit 1310 may also display, in the match image G300, a plurality of parts P340 indicating a plurality of player cards selected from the seven player cards other than the eleven player cards described above out of the eighteen player cards in the user's deck. The display control unit 1310 may also display, in the match image G300, seven parts P340 representing seven player cards that are included in the eighteen player cards in the user's deck and other than the eleven card objects described above. The display control unit 1310 may also display, in the match image G300, a plurality of parts P340 showing a plurality of player cards selected from the eighteen player cards in the user's deck regardless of the participation in the match. The display control unit 1310 may also display the eighteen parts P340 representing the eighteen player cards that are the members of the user's deck in the match image G300.

The display control unit 1310 may display, instead of the part P340, a part indicating an item object other than a player card in the match image G300. In other words, in the soccer game, an item object other than a player card may be used instead of a player card. For example, a card indicating a tactic or strategy may be used, or an item object other than a card may be used.

[3-7] For example, in the game system 1, a game is played in which a user and an opponent play against each other and a user object, which is a game object used by the user, and an opponent object, which is a game object used by the opponent, move in a virtual space.

The "user" here is a player who plays a game and plays against an opponent in the game. The "opponent" is a player competing against the user. The "opponent" may be a computer or another user.

The "user object" is a game object that a user uses in a game. The "user object" may be a game object that is a member of a group (e.g., team, party) of game objects used by the user in the game.

For example, the "user object" may be a game object to be indicated or operated by the user. For example, the "user object" may be a game object that is an avatar of the user. For example, the "user object" may be a game object that is a member of a group of game objects organized by the user.

In some games, the user object moves in response to an instruction from a computer (i.e., the user object operates the computer).

The "opponent object" is a game object used by the opponent in a match. The "opponent object" may be a game object that is a member of a group (e.g., team, party) of game objects used by the opponent in the game.

For example, the "opponent object" may be a game object to be indicated or operated by the opponent. For example, the "opponent object" may be a game object that is an avatar of the opponent. For example, the "opponent object" may be a game object that is a member of a group of game objects organized by the opponent.

In the following, the motion control unit 1100, the performance changing unit 1200, and the information changing unit 1400 will be described assuming that the competitive game as described above is executed. The first motion control unit 1101 and the second motion control unit 1102 included in the motion control unit 1100 and the first performance changing unit 1201 and the second performance changing unit 1202 included in the performance changing unit 1200 are functional blocks for the case where such a game is executed.

The first motion control unit 1101 controls motion of a user object based on the first performance information relating to the performance of the user object. The first performance changing unit 1201 changes the first performance information when the user object is located in a target area based on the first change information associated with the target area. The "first performance information" is performance information of the user object.

The second motion control unit 1102 controls motion of an opponent object based on the second performance information relating to the performance of the opponent object. The second performance changing unit 1202 changes the second performance information when the opponent object is located in a target area based on the first change information associated with the target area. The "second performance information" is performance information of the opponent object.

In this case, the "first change information" associated with the target area is the information about changes of the first performance information and the second performance information.

For example, the "first change information" in this case is the information as the basis of determining whether to change the first performance information or the second performance information.

For example, the "first change information" in this case is the information as the basis of determining how to change the first performance information or the second performance information.

Specifically, "first change information" in this case is the information as the basis for determining whether to change the first performance information so as to increase the performance of the user object (or to change the first performance information so as to decrease the performance of the user object). Alternatively, "first change information" in this case is the information as the basis for determining whether to change the second performance information so as to increase the performance of the opponent object (or to change the second performance information so as to decrease the performance of the opponent object).

In this case, "first change information" is the information as the basis for determining whether to change the first performance information or the second performance information in favor of the user (or to disadvantage of the user).

Alternatively, "first change information" in this case is the information as the basis for determining whether to change the first performance information or the second performance information in favor of the opponent (or to disadvantage of the opponent).

For example, "first change information" in this case is the information as the basis of determining the extent of change of the first performance information or the second performance information.

For example, in this case, "first change information" serves as an indicator of the superiority or inferiority (advantage or disadvantage) of the user object or opponent object in the target area. For example, if the first change information indicates that the user object is dominant (advantageous) in the target area, in other words, the opponent object is inferior (disadvantageous) in the target area, the first performance information is changed so that the performance of the user object increases, or the second performance information is changed so that the performance of the opponent object decreases. For example, if the first change information indicates that the user object is inferior (disadvantageous) in the target area, in other words, the opponent object is dominant (advantageous) in the target area, the first performance information is changed so that the performance of the user object decreases, or the second performance information is changed so that the performance of the opponent object increases.

The "first performance information when the user object is located in a target area" is first performance information used (referred to) by the first motion control unit 1101 to control the motion of the user object when the user object is located in the target area.

The "second performance information when the opponent object is located in a target area" is second performance information used (referred to) by the second motion control unit 1102 to control the motion of the opponent object when the opponent object is located in the target area.

"Changes first performance information when the user object is located in a target area" and "changes second performance information when the opponent object is located in a target area" are the same as "changes the performance information when the game object is located in the target area" described above. Further, "changes the first performance information when the user object is located in a target area based on the first change information associated with the target area" and "changes the second performance information when the opponent object is located in a target area based on the first change information associated with the target area" is the same as "change the performance information when the game object is located in the target area based on the first change information associated with the target area."

The information changing unit 1400 changes the first change information associated with the target area in the virtual space based on a change command from the user or the opponent. For example, when the change command is received from the user or the opponent, the information changing unit 1400 changes the first change information associated with the target area.

Here, "changes the first change information" means, for example, changing the first change information so as to affect the decision to change the first performance information or the second performance information. Alternatively, "changes the first change information" means, for example, changing the first change information so as to affect how to change the first performance information or the second performance information.

For example, when a change command containing a specification command to specify (select) a target area is received from the user or the opponent, the information changing unit 1400 changes the first change information associated with the target area specified by the specification command.

For example, when the user or the opponent gives a change command including a specification command of how to change the first change information, the information changing unit 1400 changes the first change information in the target area in a manner (degree) specified by the specification command.

For example, the first change information contains specifying information that specifies whether the first performance information or the second performance information is to be changed in favor of the user or the opponent.

"Specifying information" includes at least one of (a) information specifying whether to change the first performance information to the advantage of the user (in other words, to the disadvantage of the opponent); (b) information specifying whether to change the second performance information to the advantage of the user (in other words, to the disadvantage of the opponent); (c) information specifying whether to change the first performance information to the advantage of the opponent (in other words, to the disadvantage of the user); and (d) information specifying whether to change the second performance information to the advantage of the opponent (in other words, to the disadvantage of the user).

The information changing unit 1400 changes the first change information (specifying information) associated with the target area to the advantage of the user based on the user's change command. Further, the information changing unit 1400 changes the first change information (specifying information) associated with the target area to the advantage of the opponent based on the opponent's change command.

"Changes the first change information to the advantage of the user" means to change the first change information (specifying information) so that the first performance information or second performance information to be advantage of the user is changed. On the other hand, "changes the first change information to the advantage of the opponent" means to change the first change information (specifying information) so that the first performance information or second performance information to be advantage of the opponent is changed. Whether the game is advantageous to the user (or disadvantageous to the user) and whether the game is advantageous to the opponent (or disadvantageous to the opponent) is determined by the rules of the game.

[3-7-1] Specifically, the first change information contains, as specifying information, a first value corresponding to the user's change command and a second value corresponding to the opponent's change command.

The "first value" is a value that changes according to the user's change command, and the "second value" is a value that changes according to the opponent's change command. The first performance information or the second performance information is changed so that the result of the comparison between the first value and the second value is a first result, which is advantageous for the user (in other words, disadvantageous for the opponent). On the other hand, the first performance information or the second performance information is changed so that the result of the comparison between the first value and the second value is a second result, which is advantageous for the opponent (in other words, disadvantageous for the user). For example, an example of a "first result" is that one of the first value and the second value is greater than the other, and an example of a "second result" is that the other of the first value and the second value is greater than the one.

Specifically, the "first value" is a value that increases according to the user's change command, and the "second value" is a value that increases according to the opponent's change command. In this case, the first performance information or the second performance information is changed so that the first result, in which the first value is greater than the second value, is advantageous for the user (in other words, disadvantageous for the opponent). On the other hand, the first performance information or the second performance information is changed so that the second result, in which the second value is greater than the first value, is advantageous for the opponent (in other words, disadvantageous for the user).

Alternatively, the "first value" may be a value that decreases according to the user's change command, and the "second value" may be a value that decreases according to the opponent's change command. In this case, the first performance information or the second performance information is changed so that the first result, in which the first value is smaller than the second value, is advantageous for the user (in other words, disadvantageous for the opponent). On the other hand, the first performance information or the second performance information is changed so that the second result, in which the second value is smaller than the first value, is advantageous for the opponent (in other words, disadvantageous for the user).

For example, when the result of the comparison between the first value and the second value is the first result, the first performance changing unit 1201 changes the first performance information of a user object so as to increase the performance of the user object when the user object is located in the target area. Alternatively, when the result of the comparison between the first value and the second value is the second result, the first performance changing unit 1201 changes the first performance information of a user object so as to decrease the performance of the user object when the user object is located in the target area.

Further, for example, when the result of the comparison between the first value and the second value is the second result, the second performance changing unit 1202 changes the second performance information of an opponent object so as to increase the performance of the opponent object when the opponent object is located in the target area. Alternatively, when the result of the comparison between the first value and the second value is the first result, the second performance changing unit 1202 changes the second performance information of an opponent object so as to decrease the performance of the opponent object when the opponent object is located in the target area.

The soccer game described above corresponds to an example of "a game in which a user and an opponent play against each other and a user object, which is a game object used by the user, and an opponent object, which is a game object used by the opponent, move in a virtual space." The user character UC is an example of a "user object", and the opponent character OC is an example of an "opponent object." The ability information (or overall ability information) of the user character UC corresponds to an example of "first performance information", and the ability information (or overall ability information) of the opponent character OC corresponds to an example of "second performance information."

The first motion control unit 1101 controls the motion of a user character UC based on ability information (or overall ability information) of the user character UC. The second motion control unit 1102 controls the motion of an opponent character OC based on ability information (or overall ability information) of the opponent character OC.

In the soccer game described above, the sum of the influence values of the area A1 (increase effect on the momentum value of the area A1) by the used cards of the user corresponds to an example of the "first value" of the area A1. Further, the sum of the influence values of the area A1 (decrease effect on the momentum value of the area A1) of the used cards of the opponent corresponds to an example of the "second value" of the area A1. Further, the case where the sum of the influence values (increase effect) of the area A1 of the used cards of the user is greater than the sum of the influence values (decrease effect) of the area A1 of the used cards of the opponent is an example of the "first result." The case where the sum of the influence values (increase effect) of the area A1 by the used cards of the user is smaller than the sum of the influence values (decrease effect) of the area A1 of the used cards of the opponent is an example of the "second result." The same applies to the areas A2 to A7.

For example, if the sum of the influence values (increase effect) of the area A1 by the used cards of the user is greater than the sum of the influence values (decrease effect) of the area A1 by the used cards of the opponent (i.e., when the area A1 is the dominant area of the user team), the first performance changing unit 1201 sets the ability information of the user character UC located in the area A1 to be higher than the original ability information.

If the sum of the influence values (increase effect) of the area A1 by the used cards of the user is smaller than the sum of the influence values (decrease effect) of the area A1 by the used cards of the opponent (i.e., when the area A1 is the dominant area of the opponent team), the second performance changing unit 1202 sets the ability information of the opponent character OC located in the area A1 to be higher than the original ability information.

If the sum of the influence values (increase effect) of the area A1 by the used cards of the user is smaller than the sum of the influence values (decrease effect) of the area A1 by the used cards of the opponent (i.e., when the area A1 is the dominant area of the opponent team), the first performance changing unit 1201 sets the ability information of the user character UC located in the area A1 to be lower than the original ability information.

If the sum of the influence values (increase effect) of the area A1 by the used cards of the user is greater than the sum of the influence values (decrease effect) of the area A1 by the used cards of the opponent (i.e., when the area A1 is the dominant area of the opponent team), the second performance changing unit 1202 sets the ability information of the user character UC located in the area A1 to be lower than the original ability information.

[3-7-2] Alternatively, the first change information contains, as specifying information, a value that changes in response to the user's change command and the opponent's change command.

Here, "value" is given a first change, which is either an increase or a decrease, in response to the user's change command, and given a second change, which is either an increase or a decrease, in response to the opponent's change command. Further, the first performance information or the second performance information is changed such that the user has an advantage (in other words, the opponent has a disadvantage) when the value is included within a first value range. On the other hand, the first performance information or the second performance information is changed such that the opponent has an advantage (in other words, the user has a disadvantage) when the value is included within a second value range. The "first value range" is a range of values in which a value is likely included when the first change is given to the value, and the "second value range" is a range of values in which a value is likely included when the second change is given to the value.

For example, the "value" is increased in response to the user's change command and decreased in response to the opponent's change command. The first value range is a range of values larger than a first threshold value, and the second value range is a range of values smaller than a second threshold value. The first threshold value and the second threshold value may be the same (e.g., zero) or different. In the latter case, the second threshold value is smaller than the first threshold value.

Alternatively, the "value" is decreased in response to the user's change command and increased in response to the opponent's change command. The first value range is a range of values smaller than a first threshold value, and the second value range is a range of values larger than a second threshold value. The first threshold value and the second threshold value may be the same (e.g., zero) or different. In the latter case, the second threshold value is larger than the first threshold value.

When a value associated with the target area is included in the first value range, the first performance changing unit 1201 changes the first performance information of a user object located in the target area so as to increase the performance of the user object. Alternatively, when a value associated with the target area is included in the second value range, the first performance changing unit 1201 changes the first performance information of a user object located in the target area so as to decrease the performance of the user object.

When a value associated with the target area is included in the second value range, the second performance changing unit 1202 changes the second performance information of an opponent object located in the target area so as to increase the performance of the opponent object. Alternatively, a value associated with the target area is included in the first value range, the second performance changing unit 1202 changes the second performance information of an opponent object located in the target area so as to decrease the performance of the opponent object.

The information changing unit 1400 gives the first change, which is one of an increase and a decrease, to a value associated with the target area in response to the user's change command. Further, the information changing unit 1400 gives the second change, which is the other of an increase and a decrease, to a value associated with the target area in response to the opponent's change command.

In the soccer game described above, the momentum value of the area A1 corresponds to an example of the "value" of the area A1. Increasing the momentum value of the area A1 corresponds to an example of the "first change", and decreasing the momentum value of the area A1 corresponds to an example of the "second change." The same applies to the areas A2 to A7. The range of values greater than zero corresponds to an example of the "first value range" and the range of values less than zero corresponds to an example of the "second value range."

In the soccer game described above, the information changing unit 1400 increases the momentum value of the area A1 based on the influence value of the area A1 of the used card of the user. Further, the information changing unit 1400 decreases the momentum value of the area A1 based on the influence value of the area A1 of the used card of the opponent.

When the momentum value of the area A1 is greater than zero (i.e., when the area A1 is the dominant area of the user team), the first performance changing unit 1201 sets the ability information of the user character UC located in the area A1 to be higher than the original ability information. Further, when the momentum value of the area A1 is smaller than zero (i.e., when the area A1 is the dominant area of the opponent team), the second performance changing unit 1202 sets the ability information of the opponent character OC located in the area A1 to be higher than the original ability information.

When the momentum value of the area A1 is smaller than zero (i.e., when the area A1 is the dominant area of the opponent team), the first performance changing unit 1201 may set the ability information of the user character UC located in the area A1 to be lower than the original ability information. Further, when the momentum value of the area A1 is greater than zero (i.e., when the area A1 is the dominant area of the user team), the second performance changing unit 1202 may set the ability information of the opponent character OC located in the area A1 to be lower than the original ability information.

[4. Processing] The processing performed by the system 1 will be described.

Figure 20:
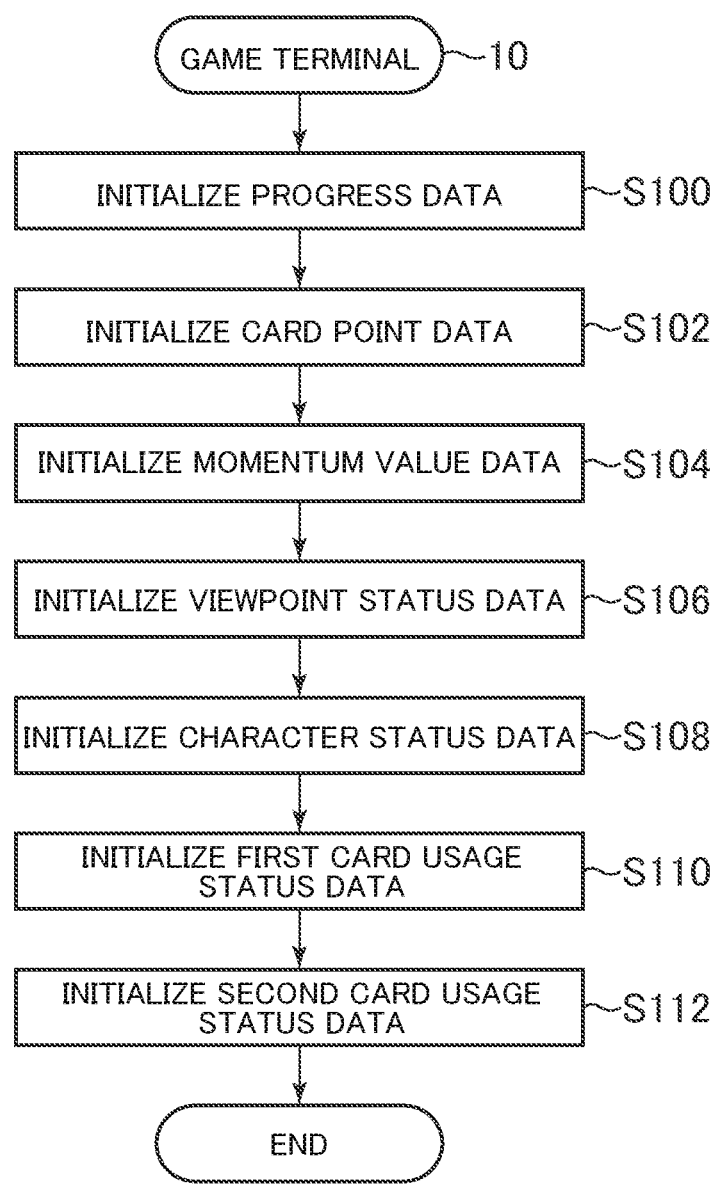
FIG. 20 is a diagram showing an example of processing executed in the game system.

[4-1] FIG. 20 shows an example of the processing performed by the control unit 11 of the game terminal 10 before the start of a match between the user team and the opponent team.

As shown in FIG. 20, the control unit 11 first initializes the progress data D1051 (S100). That is, the control unit 11 sets "0" in the "elapsed time" field and "0" in the "score" fields as the score of the user team and opponent team.

After the step S100 is executed, the control unit 11 initializes the card point data D1052 (S102). That is, the control unit 11 sets "5" in each of the "card points" fields as the card points of the user and the opponent, and "0" in the "elapsed time" field.

After the step S102 is executed, the control unit 11 initializes the momentum value data D1053 (S104). That is, the control unit 11 sets "0" in each of the "momentum value" fields as the momentum value for each of the areas A1 to A7.

After the step S104 is executed, the control unit 11 initializes the virtual space status data D1054 (S106). That is, the control unit 11 sets the state information of the viewpoint VP and the ball BO to a predetermined initial state.

After the step S106 is executed, the control unit 11 initializes the character status data D1055 (S108).

That is, the control unit 11 registers eighteen user characters UC corresponding to the eighteen player cards registered in the user deck data D1030 (member data D1031) in the character status data D1055. At this case, the control unit 11 registers the values registered in the "ability" fields of the card list data D1010 regarding the eighteen player cards, which are registered in user deck data D1030 (member data D1031), in both the "original ability" and "current ability" fields of the character status data D1055. The control unit 11 sets the "participation flag" field of the user character UC corresponding to the player card for which the starting member flag is on to ON, and also initializes the "position number", "position", "orientation", "movement speed", "playback motion", and "playback frame" fields. Further, the control unit 11 sets the "participation flag" field of the user character UC corresponding to the player card for which the starting member flag is off to OFF. The control unit 11 also sets the "substitution flag" fields of all the user characters UC to OFF.

Similarly, the control unit 11 also registers eighteen opponent characters OC corresponding to the eighteen player cards registered in the opponent deck data D1040 (member data) in the character status data D1055.

After the step S108 is executed, the control unit 11 initializes the first card usage status data D1056 (S110). That is, the control unit 11 refers to the character status data D1055 to randomly select five player cards from the eleven player cards respectively corresponding to the eleven user characters UC for which the participation flag is ON. The control unit 11 then obtains the cost information and the influence information of the selected five player cards from the card list data D1010, and registers the obtained information in the first card usage status data D1056. The control unit 11 sets the "usage flag" fields of these five player cards to "OFF" and the "elapsed time" field to "0."

After the step S110 is executed, the control unit 11 initializes the second card usage status data D1057 (S112). That is, the control unit 11 refers to the character status data D1055 to randomly select five player cards from the eleven player cards respectively corresponding to the eleven opponent characters OC for which the participation flag is ON. The control unit 11 then obtains the cost information and the influence information of the selected five player cards from the card list data D1010, and registers the obtained information in the second card usage status data D1057. The control unit 11 sets the "usage flag" fields of these five player cards to "OFF" and the "elapsed time" field to "0."

Figure 21A:
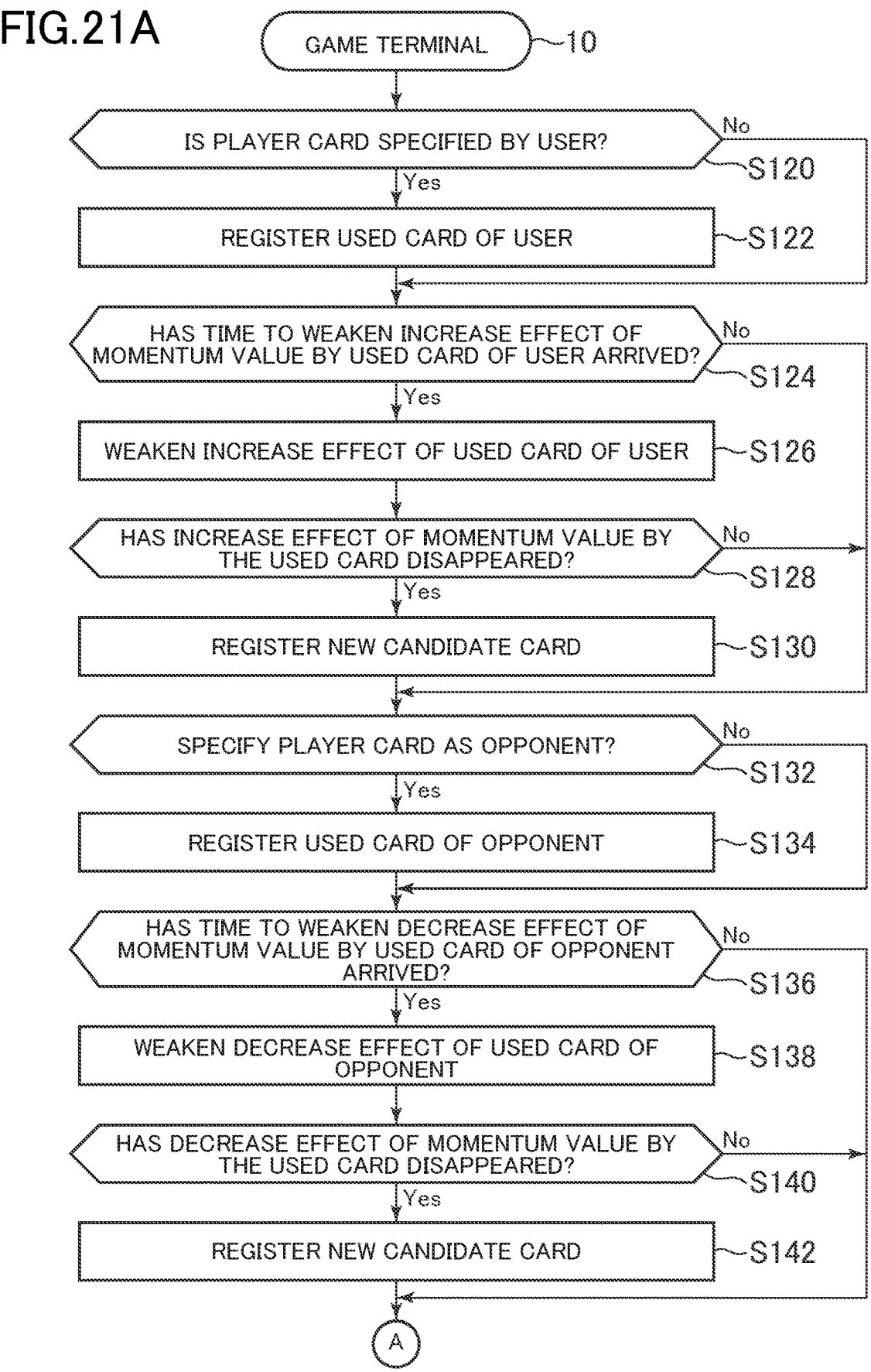
FIG. 21A is a diagram showing an example of another processing executed in the game system.
Figure 21B:
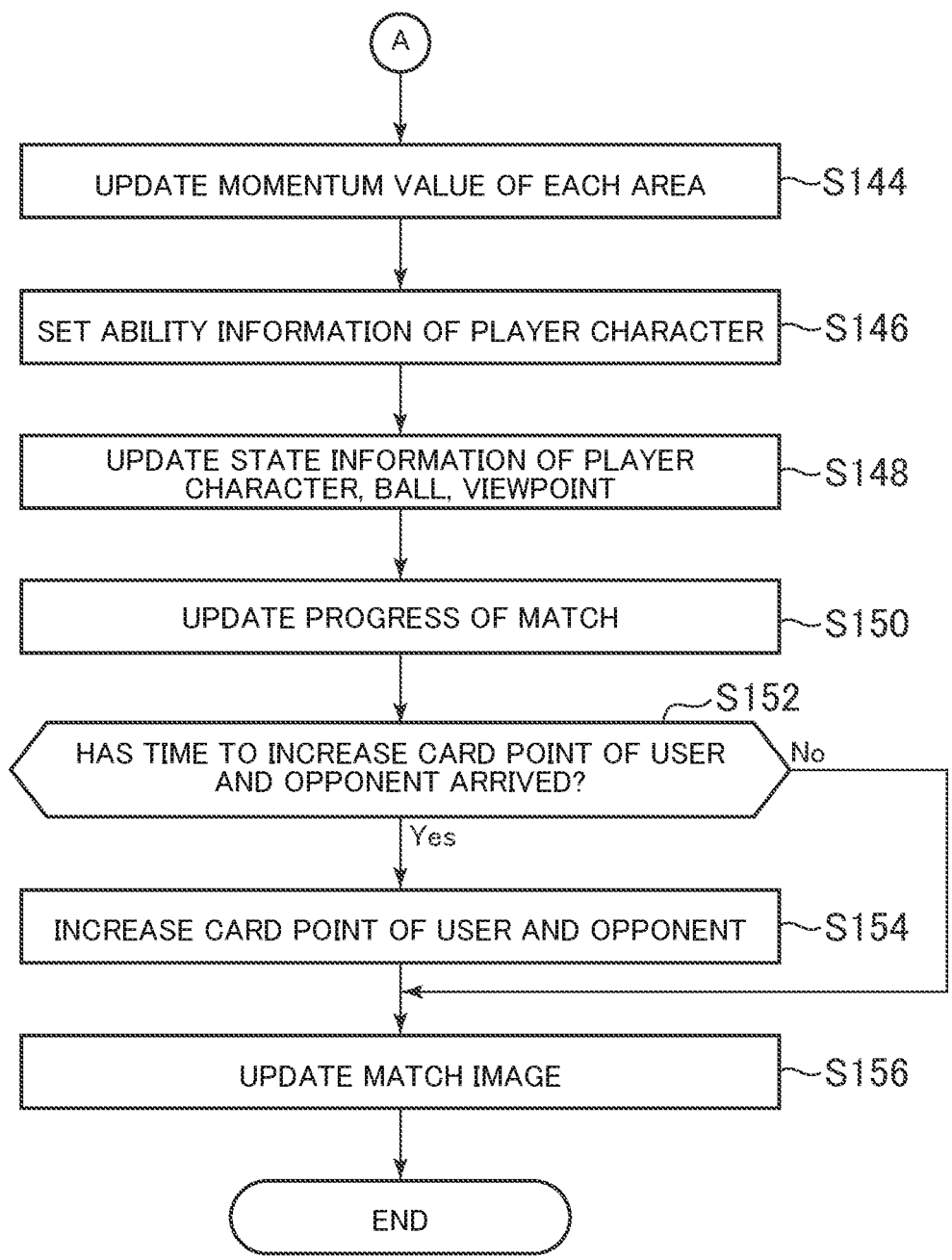
FIG. 21B is a diagram showing an example of another processing executed in the game system.

[4-2] FIGS. 21A and 21B shows an example of the processing performed by the control unit 11 of the game terminal 10 during a match between the user team and the opponent team. That is, while the match image G300 is displayed on the display unit 15, the processing shown in FIGS. 21A and 21B is executed every predetermined time (here, 1/60 second).

As shown in FIG. 21A, the control unit 11 determines whether any of the candidate cards presented in the match image G300 has been specified by the user (S120). For example, the control unit 11 determines whether an operation to specify one of the parts P340-1 to P340-5 of the match image G300 has been performed.

When it is determined that one of the candidate cards has been specified by the user (S120: Yes), the control unit 11 registers the player card specified by the user as the user's used card (S122). For example, the control unit 11 accesses the first card usage status data D1056 and sets the "usage flag" field of the player card specified by the user to ON.

In this case, the control unit 11 changes the influence value of the player card based on the skill information of the player card specified by the user. For example, if the player card specified by the user has the "adversity" skill and the current scores of the opponent team are more than the scores of the user team, the control unit 11 accesses the "influence value (increase effect)" of the first card usage status data D1056 and increases the influence value of the player card that is greater than zero by 1.

After the step S122 is executed or if it is not determined in step S120 that any of the candidate cards has been specified by the user as a used card (S120: No), the control unit 11 determines whether the time has come to weaken the effect of increasing the momentum value by the used card of the user (S124). For example, in the soccer game, the effect of increasing the momentum value by the used card of the user is weakened for every five minutes of time elapsed in the virtual space VW. As such, in step S124, it is determined whether the time in the virtual space VW has elapsed for five minutes.

Specifically, the control unit 11 accesses the first card usage status data D1056 and adds a predetermined value to the value in the "elapsed time" field of the player card for which the usage flag is ON. For example, if one minute in the real world corresponds to ten minutes in the virtual space VW (i.e., 1/60 second in the real world corresponds to 10/60 second in the virtual space VW), the predetermined value is set to "10."

Further, the control unit 11 determines whether there is a player card having a value in the "elapsed time" field of 18000 or more among the player cards for which the usage flag is ON. The "elapsed time" field stores a value indicating the elapsed time in units of 1/60 second, and thus, "a value in the "elapsed time" field is 18000 or more" corresponds to a case where five minutes or more have elapsed.

If there is a player card having a value in the "elapsed time" field value of 18000 or more among the player cards for which the usage flag is ON, the control unit 11 determines that the time has come to weaken the effect of the player card (used card) to increase the momentum value. In this case, the control unit 11 sets the "elapsed time" field to "0."

When it is determined that the time has come to weaken the effect of increasing the momentum value by the user's used card (S124: Yes), the control unit 11 weakens the effect of increasing the momentum value by the used card (S126). For example, the control unit 11 accesses the first card usage status data D1056 and updates the influence value (increase effect) field of the used card. For example, if the value of the area A1 registered in the "influence value (increase effect)" field is greater than zero, the control unit 11 decreases the value of the area A1 registered in the "influence value (increase effect)" field by one. The control unit 11 executes the same processing for the areas A2 to A7.

After the step S126 is executed, the control unit 11 determines whether the effect of increasing the momentum value by the used card has disappeared (S128). For example, the control unit 11 refers to the "influence value (increase effect)" fields of the first card usage status data D1056 to check whether the influence values (increase effect) of the areas A1 to A7 of the used card are all zero. If all of the influence values (increase effect) of the areas A1 to A7 of the used card are zero, it is determined that the increase effect of the momentum value by the used card has disappeared.

If it is determined that the increase effect of the momentum value by the used card no longer exists (S128: Yes), the control unit 11 registers a new player card as the user's candidate card to use in the first card usage status data D1056 (S130).

For example, the control unit 11 refers to the character status data D1055 to randomly select one player card from the eleven player cards respectively corresponding to the eleven user characters UC for which the participation flag is ON and the substitution flag is OFF. The control unit 11 deletes the used card that is determined to have lost the effect of increasing the momentum value from the first card usage status data D1056, and registers the newly selected player card in the first card usage status data D1056. At this time, the control unit 11 obtains the cost information and the influence information of the newly selected player card from the card list data D1010, and registers the obtained information in the first card usage status data D1056. The control unit 11 sets the "usage flag" field of the newly selected player card to "OFF" and the "elapsed time" field to "0."

After the step S130 is executed, or if it is determined in step S124 that the time to weaken the effect of the increase in momentum value by the used card has not arrived (S124: No), or if it is determined in step S128 that the effect of the increase in momentum value by the used card has not disappear (S128: No), the control unit 11 determines whether to specify one of the player cards registered in the second card usage status data D1057 as a card to be used as the opponent (S132). For example, the control unit 11 performs the processing described below according to the algorithm for determining whether to use a player card or which player card to use.

First, the control unit 11 determines whether to use a player card. If it is determined to use a player card, the control unit 11 selects a player card, for which the usage flag is OFF and the cost is equal to or less than the opponent's card points, from the player cards registered in the second card usage status data D1057 based on the card point data D1052 and the second card usage status data D1057.

If the control unit 11 specifies a player card as the opponent (S132: Yes), the control unit 11 registers the specified player card as the opponent's card (S134). For example, the control unit 11 accesses the second card usage status data D1057 and sets the "usage flag" field of the specified player card to ON.

After the step S134 is executed or if a player card is not specified as the opponent in step S132 (S132: No), the control unit 11 determines whether the time has come to weaken the effect of decreasing the momentum value by the opponent's used card (S136). In other words, the control unit 11 executes the same processing as in step S124 for the second card usage status data D1057.

If it is determined that the time has come to weaken the effect of decreasing the momentum value by the opponent's used card (S136: Yes), the control unit 11 weakens the effect of decreasing the momentum value by the used card (S138). In other words, the control unit 11 executes the same processing as in step S126 for the second card usage status data D1057.

After the step S138 is executed, the control unit 11 determines whether the effect of decreasing the momentum value by the used card has disappeared (S140). In other words, the control unit 11 executes the same processing as in step S128 for the second card usage status data D1057.

If it is determined that the decrease effect of the momentum value by the used card no longer exists (S140: Yes), the control unit 11 registers a new player card as the opponent's candidate card to use in the second card usage status data D1057 (S142).

For example, the control unit 11 refers to the character status data D1055 to randomly select one player card from the eleven player cards respectively corresponding to the eleven opponent characters OC for which the participation flag is ON and the substitution flag is OFF. The control unit 11 deletes the used card that is determined to have lost the effect of decreasing the momentum value from the second card usage status data D1057, and registers the newly selected player card in the second card usage status data D1057. This processing is the same as in step S130.

After the step S142 is executed, or if it is determined in step S136 that the time to weaken the effect of decreasing the momentum value by the used card has not arrived (S136: No), or if it is determined in step S140 that the effect of decreasing the momentum value by the used card has not disappear (S140: No), the control unit 11 updates the momentum values of the respective areas A1 to A7 as shown in FIG. 21B (S144).

For example, the control unit 11 updates the momentum value of the area A1 as described below. The control unit 11 refers to the first card usage status data D1056 and calculates the sum X of the influence values (increase effect) on the area A1 by the player cards for which the usage flag is ON. Further, the control unit 11 refers to the second card usage status data D1057 and calculates the sum Y of the influence values (decrease effect) on the area A1 by the player cards for which the usage flag is ON. Subsequently, the control unit 11 accesses the momentum value data D1053 and registers the value obtained by subtracting the sum Y from the sum X as the momentum value of the area A1. For example, in the example shown in FIG. 18, "2" is calculated as the sum X, and in the example shown in FIG. 19, "0" is calculated as the sum Y. Then, "+2" is registered as the momentum value of the area A1. Similarly, the control unit 11 updates the momentum values of the other areas A2 to A7.

After the step S144 is executed, the control unit 11 sets the ability information of the player character PC (user character UC or opponent character OC) (S146).

Figure 22:
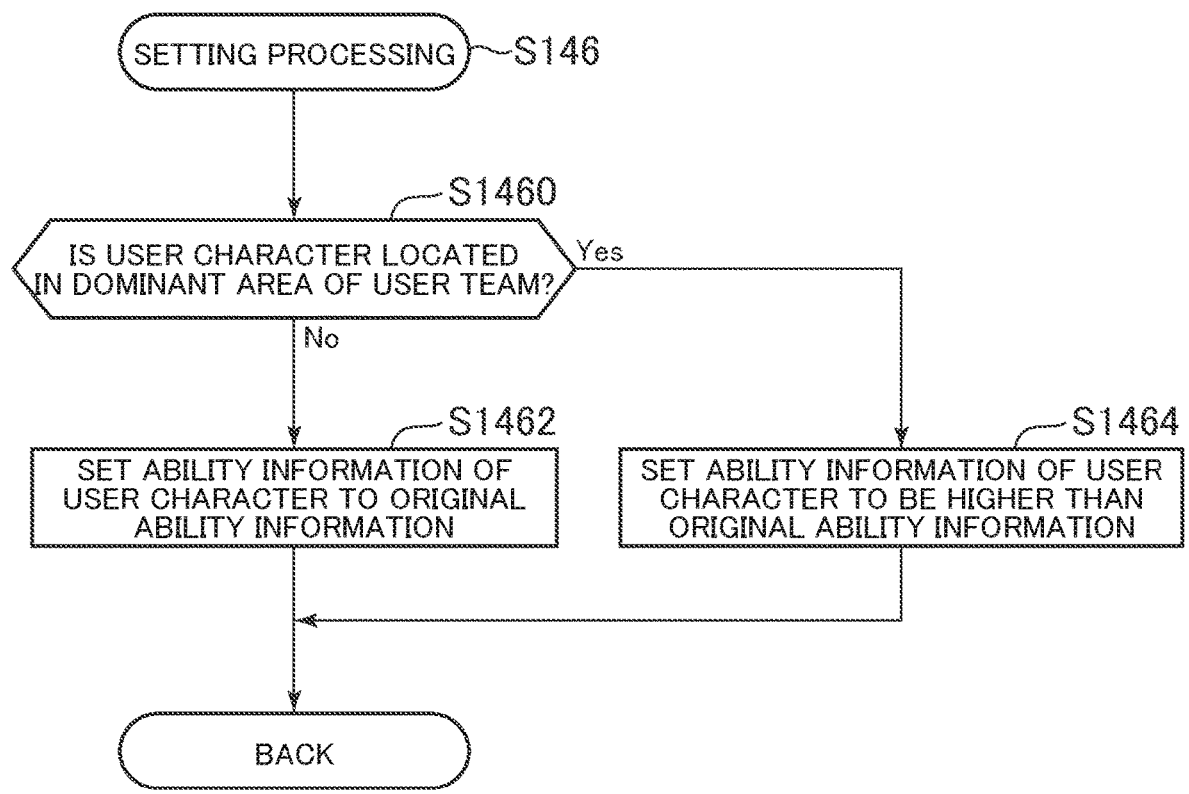
FIG. 22 is a diagram showing an example of another processing executed in the game system.

FIG. 22 shows an example of the processing executed in step S146 as to the setting processing to set the ability information of the user character UC. In step S146, the control unit 11 executes the setting processing shown in FIG. 22 for each of the user characters UC participating in the match (i.e., the user characters UC for which the participation flag is ON and the substitution flag is OFF).

As shown in FIG. 22, the control unit 11 determines whether the user character UC is located in the dominant area of the user team (S1460).

For example, the control unit 11 determines whether the current position of the user character UC is contained in the area A where the momentum value is greater than zero. Specifically, the control unit 11 refers to the "position" field of the character status data D1055 to obtain the current position of the user character UC, and identifies the area A that contains the current position of the user character UC among the areas A1 to A7. Further, the control unit 11 refers to the momentum value data D1053 and determines whether the momentum value of the identified area A is greater than zero. If the momentum value of the identified area A is greater than zero, the control unit determines that the user character UC is located in the dominant area of the user team. On the other hand, if the momentum value of the identified area A is less than zero, the control unit 11 determines that the user character UC is not located in the dominant area of the user team.

If it is determined that the user character UC is not located in the dominant area of the user team (S1460: No), the control unit 11 sets the ability information of the user character UC to the original ability information (i.e. (S1462). In other words, the control unit 11 accesses the character status data D1055 and registers the value registered in the "original ability" field of the user character UC into the "current ability" field.

On the other hand, if it is determined that the user character UC is located in the dominant area of the user team (S1460: Yes), the control unit 11 sets the ability information of the user character UC to be higher than the original ability information (S1464). That is, the control unit 11 accesses the character status data D1055 and registers the value obtained by increasing the value registered in the "original ability" field of the user character UC into the "current ability" field. Specifically, the control unit 11 registers the value obtained by adding a predetermined value to the value registered in the "original ability" field in the "current ability" field. The "predetermined value" may be a fixed value, or a value obtained by multiplying the value registered in the "original ability" field by a predetermined percentage.

In step S146, the same processing as shown in FIG. 22 is executed for each of the opponent characters OC participating in the match (i.e., the opponent characters OC for which the participation flag is ON and the substitution flag is OFF). In this case, in step S1460, it is determined whether the opponent character OC is located in the dominant area of the opponent team. That is, it is determined whether the current position of the opponent character OC is contained in the area A where the momentum value is less than zero.

After step S146 is executed, the control unit 11 updates the state information of the player characters PC (user character UC and opponent character OC), the ball BO, and the viewpoint VP (S148).

The control unit 11 updates the position, orientation, movement speed, playback motion, and playback frame of the player character PC. For example, according to the algorithm for determining actions to be performed by the player character PC, the control unit 11 determines the actions to be performed by the player character PC and updates the position, orientation, movement speed, playback motion, and playback frame of the player character PC based on the determination results.

When maintaining the orientation and the movement speed of the player character PC, the control unit 11 updates the position of the player character PC based on the orientation and the movement speed. On the other hand, when changing at least one of the orientation and the movement speed of the player character PC, the control unit 11 updates at least one of the orientation and the movement speed of the player character PC, and then updates the position of the player character PC based on the orientation and the movement speed.

When making the player character PC start a new motion, the control unit 11 sets the motion data of such a motion as the playback motion of the player character PC and sets the first frame as a playback frame. On the other hand, when making the player character PC continue the current motion, the control unit 11 sets a frame following the current frame as a playback frame.

Further, the control unit 11 updates the position, movement direction, and speed of the ball BO. For example, when any of the player characters PC performs a kicking motion (e.g., pass, shoot, dribble) to the ball BO, the control unit 11 updates the movement direction and speed of the ball BO based on the kicking direction and strength, and updates the position of the ball BO based on the movement direction and speed. When no kicking motion is performed to the ball BO, the control unit 11 updates the position of the ball BO based on the movement direction and speed.

When the status information of the player character PC and the ball BO is updated, the "current ability" field of the character status data D1055 is referred to.

For example, the control unit 11 sets the movement speed of the player character PC based on the value of the running ability registered in the "current ability" field of the character status data D1055.

For example, the control unit 11 sets the accuracy of passing or shooting of the player character PC based on the value of the passing or shooting ability registered in the "current ability" field of the character status data D1055. That is, the control unit 11 sets the movement direction of the ball BO passed or shot by the player character PC based on the value of the passing or shooting ability registered in the "current ability" field of the character status data D1055.

Specifically, when the passing or shooting ability of the player character PC is low, the control unit 11 sets the movement direction of the ball BO passed or shot by the player character PC such that the gap between the movement direction of the ball BO passed or shot and the target direction is larger than when the passing or shooting ability of the player character PC is high.

For example, when the user character UC tries to dribble past the opponent character OC, the control unit 11 determines whether the user character UC can dribble past the opponent character OC based on the value of the user character UC's dribbling ability and the value of the opponent character OC's defensive ability registered in the "current ability" fields of the character status data D1055.

In step S148, the control unit 11 sets the viewpoint VP and the viewing direction VD so that the position of the ball BO is included within the field of view from the viewpoint VP.

After the step S148 is executed, the control unit 11 updates the progress information of the match (S150). For example, the control unit 11 accesses the progress data D1051 and adds a predetermined value to the value in the "elapsed time" field. For example, if one minute in the real world corresponds to ten minutes in the virtual space VW (i.e., 1/60 second in the real world corresponds to 10/60 second in the virtual space VW), the predetermined value is set to "10." Further, for example, when the user team or opponent team scores a point, the control unit 11 updates the "score" field.

After the step S150 is executed, the control unit 11 determines whether the time to increase the card points of the user and the opponent has arrived (S152). For example, in the soccer game, the card points of the user and the opponent are increased by one point for every minute that elapses in the virtual space VW. As such, in step S152, it is determined whether the time in the virtual space VW has elapsed for one minute.

Specifically, the control unit 11 accesses the card point data D1052 and adds a predetermined value to the value in the "elapsed time" field. For example, if one minute in the real world corresponds to ten minutes in the virtual space VW (i.e., 1/60 second in the real world corresponds to 10/60 second in the virtual space VW), the predetermined value is set to "10."

The control unit 11 also determines whether the value of the "elapsed time" field is equal to or more than 3600. The "elapsed time" field stores a value indicating the elapsed time in units of 1/60 second, and thus, a value in the "elapsed time" field is 3600 or more corresponds to a case where one minute or more has elapsed.

When the value of the "elapsed time" field is 3600 or more, the control unit 11 determines that the time has come to increase the card points of the user and the opponent. In this case, the control unit 11 updates the value of the "elapsed time" field to zero.

When it is determined that the time to increase the card points of the user and the opponent has arrived (S152: Yes), the control unit 11 accesses the card point data D1052 and increases the card points of the user and the opponent by one point (S154).

After the step S154 is executed, or if it is determined in step S152 that the time to increase the card points of the user and the opponent has not arrived (S152: No), the control unit 11 updates the match image G300 (S156). The control unit 11 generates the match image G300 on a VRAM based on the match status data D1050. The match image G300 generated on the VRAM is displayed on the display unit 15.

At this time, the control unit 11 generates a virtual space image G310, which represents the virtual space VW viewed from the viewpoint VP in the viewing direction VD, based on the virtual space status data D1054 and the character status data D1055.

The control unit 11 sets the part P330 based on the momentum value data D1053. The control unit 11 also sets the parts P350 and P360-1 to P360-10 based on the user's card points stored in the card point data D1052.

Further, the control unit 11 sets five parts P340-1 to P340-5 that respectively represent the five player cards registered in the first card usage status data D1056. The control unit 11 sets the part P340, which corresponds to the player card for which the usage flag is ON, to a manner that indicates that the player card has been used and that cannot be specified by the user (see part P340-1 in FIG. 7). Further, based on the user's card points stored in the card point data D1052, the control unit 11 sets the part P340 corresponding to the player card, which has a cost greater than the user's card points, to a manner that indicates that the user's card points are insufficient (see parts P340-2 and P340-5 in FIG. 7).

Although omitted in FIGS. 21A and 21B, when the part P320 of the match image G300 is specified, the control unit 11 displays the player substitution image on the display unit 15 to receive the player substitution instruction. The control unit 11 then updates the character status data D1055 based on the player substitution instruction. That is, the control unit 11 updates the substitution flag of the user character UC to be substituted to ON, and updates the participation flag of a user character UC that participates in the match instead of the user character UC to ON.

Similarly, although omitted in FIGS. 21A and 21B, the control unit 11 determines whether to change the players of the opponent team as the user's opponent during the match. This is determined based on the algorithm for determining whether to change players in the opponent team. The control unit 11 updates the character status data D1055 when it is determined to change players in the opponent team. That is, the control unit 11 updates the substitution flag of the opponent character OC to be substituted to ON, and updates the participation flag of an opponent character OC to play in the match instead of the opponent character OC to ON.

[5. Conclusion] In the game system described above, the ability of the user character UC is higher than the original ability in the dominant area of the user team, and the ability of the opponent character OC is higher than the original ability in the dominant area of the opponent team. The user then uses a player card to change the momentum value of the area A so as to make the area A the dominant area of the user team or prevent the area A from being the dominant area of the opponent team, thereby getting involved in the user team (user character UC) and the match.

That is, the game system 1 provides a new way for a user to be involved in the user team (user character UC) by changing a momentum value of each of areas A1 to A7 using the player card. In other words, the game system 1 can provide a new interest to the user by enabling the user to be indirectly involved in the user team (user character UC) by changing the momentum value of each of areas A1 to A7 instead of being directly involved in the user team (user character UC) by operating the user character UC.

In a game of viewing a soccer game between the user team (user character UC) and the opponent team (opponent character OC) that are controlled by the computer, the degree of user involvement in the user team (user character UC) is lower than a game where the user character UC is controlled by the user. However, the game system 1 increases the degree of user involvement in the user team (user character UC) controlled by the computer.

Further, the game system 1 can provide a new interest to the user in which each player card has a different influence on each of areas A1 to A7, and the user can specify any player card to use among a plurality of player cards having different influences on the areas A1 to A7 so as to specify an area A to change its momentum value and the degree of change in the momentum value of the area A (in other words, specify which area A's momentum value is to be changed and how it is to be changed).

[6. Variations] The present invention is not to be limited to the above described embodiment.

[6-1] In the above, the case has been described in which the processing of FIGS. 20, 21A, and 21B are executed by the control unit 11 of the game terminal 10, although such processing may be executed by the control unit 31 of the server 30. In this case, the data necessary to execute the processing may be previously stored in the storage unit 32 of the server 30 or the database 34, or may be transmitted from the game terminal 10 to the server 30.

[6-2] In the above, the example has been described in which the present invention is applied to a soccer game, although the present invention may also be applied to sports games other than the soccer game. The present invention may also be applied to games other than sports games. The present invention may also be applied to games other than match games. The present invention may also be applied to various games in which game objects move in a virtual space.

[7. Appendixes] From the above description, the present invention can be understood, for example, as follows. In the following, the numerals given in accompanying drawings are shown in parentheses for the purpose of easier understanding, although the invention is not limited to the embodiments shown in the drawings.

A1) A game system (1) according to an aspect of the present invention includes motion control unit (1100) for controlling a motion of a game object (e.g., user character UC) that moves in a virtual space (e.g., virtual space VW) in response to an instruction from a computer based on performance information (e.g., ability information) relating to the performance of the game object, performance change unit (1200) for changing the performance information in a case where the game object is located in a target area (e.g., each of areas A1 to A7) in the virtual space based on performance change information (e.g., momentum value) associated with the target area, receiving unit (1300) for receiving a change operation (e.g., operation to specify one of parts P340-1 to P340-5) to change the performance change information associated with the target area, and information changing unit (1400) for changing the performance change information associated with the target area based on the change operation.

A7) A game control device (10 or 30) according to an aspect of the present invention includes motion control unit (1100) for controlling a motion of a game object that moves in a virtual space in response to an instruction from a computer based on performance information relating to the performance of the game object, performance change unit (1200) for changing the performance information in a case where the game object is located in a target area in the virtual space based on performance change information associated with the target area, receiving unit (1300) for receiving a change operation to change the performance change information associated with the target area, and information changing unit (1400) for changing the performance change information associated with the target area based on the change operation.

A8) A program according to an aspect of the present invention is a program for causing a computer to function as the game system (1) described in any one of A1) to A6) or the game control device (10 or 30) described in A7).

A9) A game control method according to an aspect of the present invention includes a motion control step (S148) for motion control unit (1100) to control a motion of a game object that moves in a virtual space in response to an instruction from a computer based on performance information relating to the performance of the game object, performance change step (S146) for performance change unit (1200) to change the performance information in a case where the game object is located in a target area in the virtual space based on performance change information associated with the target area, receiving step (S120) for receiving unit (1300) to receive a change operation to change the performance change information associated with the target area, and information changing step (S144) for information changing unit (1400) for changing the performance change information associated with the target area based on the change operation.

A10) An information storage medium according to an aspect of the present invention is an information storage medium that is readable by a computer that stores the program described in A8).

B1) A game system (1) according to one aspect of the present invention includes, in the game system (1) that executes a game in which a game object (e.g., user character UC) moves in a virtual space (e.g., virtual space VW), motion control unit (1100) for controlling a motion of the game object based on performance information (e.g., ability information) relating to performance of the game object, performance change unit (1200) for changing, for each of a plurality of target areas (e.g., areas A1 to A6) in the virtual space, the performance information in a case where the game object is located in the target area based on first change information (e.g., momentum value) relating to change of the performance information and associated with the target area, display control unit (1310) for displaying on display unit (15) an instruction object associated with at least one of the target areas and second change information (e.g., influence value) relating to change of the first change information, the instruction object (e.g. parts P340-1 to P340-5: in other words, player cards) instructing the change of the first change information associated with at least one of the target areas, receiving unit (1300) for receiving specification of the instruction object, and information changing unit (1400) for changing the first change information associated with the target area associated with the instruction object based on the second change information associated with the instruction object based on the specification of the instruction object.

B10) A game control device (10 or 30) according to one aspect of the present invention includes, in the game control device (10 or 30) that executes a game in which a game object moves in a virtual space, motion control unit (1100) for controlling a motion of the game object based on performance information relating to performance of the game object, performance change unit (1200) for changing, for each of a plurality of target areas in the virtual space, the performance information in a case where the game object is located in the target area based on first change information (e.g., momentum value) relating to change of the performance information and associated with the target area, display control unit (1310) for displaying on display unit (15) an instruction object associated with at least one of the target areas and second change information (e.g., influence value) relating to change of the first change information, receiving unit (1300) for receiving specification of the instruction object, and information changing unit (1400) for changing the first change information associated with the target area associated with the instruction object based on the second change information associated with the instruction object based on the specification of the instruction object.

B12) A program according to an aspect of the present invention is a program for causing a computer to function as the game system (1) described in any one of B1) to B9) or the game control device (10 or 30) described in B10) or B11).

B13) A game control method according to one aspect of the present invention includes, in the game control method of controlling a game in which a game object moves in a virtual space, a motion control step (S148) for motion control unit (1100) to control a motion of the game object based on performance information relating to performance of the game object, a performance change step (S146) for performance change unit (1200) to change, for each of a plurality of target areas in the virtual space, the performance information in a case where the game object is located in the target area based on first change information (e.g., momentum value) relating to change of the performance information and associated with the target area, a display control step (S156) for display control unit (1310) to display on display unit (15) an instruction object associated with at least one of the target areas and second change information (e.g., influence value) relating to change of the first change information, a receiving step (S120) for receiving unit (1300) to receive specification of the instruction object, and an information changing step (S144) for information changing unit (1400) to change the first change information associated with the target area associated with the instruction object based on the second change information associated with the instruction object based on the specification of the instruction object.

B15) An information storage medium according to an aspect of the present invention is an information storage medium that is readable by a computer that stores the program described in B12).

C1) A game system (1) according to an aspect of the present invention includes, in the game system that executes a game in which a user and an opponent play against each other and a user object (e.g., user character UC), which is a game object used by the user, and an opponent object (e.g., opponent character OC), which is a game object used by the opponent, move in a virtual space (e.g., virtual space VW) includes first motion control unit (1101) for controlling a motion of the user object based on first performance information (e.g., ability information of the user character UC) relating to performance of the user object, second motion control unit (1102) for controlling a motion of the opponent object based on second performance information (e.g., ability information of the opponent character OC) relating to performance of the opponent object, information changing unit (1400) for changing performance change information (e.g., momentum value) relating to change of the first performance information and the second performance information based on a change command from the user or the opponent, the performance change information being associated with a target area (e.g., each of areas A1 to A7) in the virtual space, first performance change unit (1201) for changing the first performance information in a case where the user object is located in the target area based on the performance change information associated with the target area, and second performance change unit (1202) for changing the second performance information in a case where the opponent object is located in the target area based on the performance change information associated with the target area.

C5) A game control device (10 or 30) according to an aspect of the present invention includes, in the game control device that executes a game in which a user and an opponent play against each other and a user object, which is a game object used by the user, and an opponent object, which is a game object used by the opponent, move in a virtual space includes first motion control unit (1101) for controlling a motion of the user object based on first performance information (e.g., ability information of the user character UC) relating to performance of the user object, second motion control unit (1102) for controlling a motion of the opponent object based on second performance information relating to performance of the opponent object, information changing unit (1400) for changing performance change information relating to change of the first performance information and the second performance information based on a change command from the user or the opponent, the performance change information being associated with a target area in the virtual space, first performance change unit (1201) for changing the first performance information in a case where the user object is located in the target area based on the performance change information associated with the target area, and second performance change unit (1202) for changing the second performance information in a case where the opponent object is located in the target area based on the performance change information associated with the target area.

C6) A program according to an aspect of the present invention is a program for causing a computer to function as the game system (1) described in any one of C1) to C4) or the game control device (10 or 30) described in C5).

C7) A game control method according to an aspect of the present invention includes, in the game control method of controlling a game in which a user and an opponent play against each other and a user object, which is a game object used by the user, and an opponent object, which is a game object used by the opponent, move in a virtual space includes a first motion control step (S148) for first motion control unit (1101) to control a motion of the user object based on first performance information relating to performance of the user object, a second motion control step (S148) for second motion control unit (1102) to control a motion of the opponent object based on second performance information relating to performance of the opponent object, an information changing step (S144) for information changing unit (1400) to change performance change information relating to change of the first performance information and the second performance information based on a change command from the user or the opponent, the performance change information being associated with a target area in the virtual space, a first performance change step (S146) for first performance change unit (1201) to change the first performance information in a case where the user object is located in the target area based on the performance change information associated with the target area, and a second performance change step (S146) for second performance change unit (1202) to change the second performance information in a case where the opponent object is located in the target area based on the performance change information associated with the target area.

C8) An information storage medium according to an aspect of the present invention is an information storage medium that is readable by a computer that stores the program described in C6).

C2) In one aspect of the present invention, the performance change information includes specifying information that specifies whether the first performance information or the second performance information is changed to be advantageous to either the user or the opponent, and the information changing unit (1400) may change the performance change information associated with the target area to be advantageous to the user based on a change command from the user, and change the performance change information associated with the target area to be advantageous to the opponent based on a change command from the opponent.

C3) In one aspect of the present invention, the performance change information may include, as the specifying information, a first value (e.g., the sum of the influence values of the user's used cards) according to the change command from the user and a second value (the sum of the influence values of the opponent's used cards) according to the change command from the opponent. The first performance changing unit (1201) may include at least one of unit for changing the first performance information in a case where the user object is located in the target area so as to improve the performance of the user object when a result of the comparison between the first value and the second value is a first result (e.g., when the sum of influence values of the user's used cards is greater than the sum of influence values of the opponent's used card) and unit for changing the first performance information in a case where the user object is located in the target area so as to decrease the performance of the user object when the result of the comparison is a second result (e.g., when the sum of influence values of the user's used cards is smaller than the sum of influence values of the opponent's used card). The second performance changing unit (1202) may include at least one of unit for changing the second performance information in a case where the opponent object is located in the target area so as to improve the performance of the opponent object when the result of the comparison is the second result and unit for changing the second performance information in a case where the opponent object is located in the target area so as to decrease the performance of the opponent object when the result of the comparison is the second result.

C4) In one aspect of the present invention, the performance change information may include, as the specifying information, a value (e.g., momentum value) that changes in response to the change command from the user and in response to the change command from the opponent. The information changing unit (1400) may give a first change (e.g., increase), which is either an increase or a decrease, to the value associated with the target area in response to the user's change command, and give a second change (e.g., decrease), which is the other one of an increase or a decrease, to the value associated with the target area in response to the opponent's change command. The first performance changing unit (1201) may include at least one of unit for changing the first performance information in a case where the user object is located in the target area so as to improve the performance of the user object when the value associated with the target area is included within a first value range (e.g., when the momentum value is greater than zero) and unit for changing the first performance information in a case where the user object is located in the target area so as to decrease the performance of the user object when the value associated with the target area is included within a second value range (e.g., when the momentum value is smaller than zero). The second performance changing unit (1202) may include at least one of unit for changing the second performance information in a case where the opponent object is located in the target area so as to improve the performance of the opponent object when the value associated with the target area is included within the second value range and unit for changing the second performance information in a case where the opponent object is located in the target area so as to decrease the performance of the opponent object when the value associated with the target area is included within the first value range.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game system that executes a game in which a user and an opponent play against each other, where a user object, which is a game object used by the user, and an opponent object, which is a game object used by the opponent, move in a virtual space, the game system comprising:
   at least one processor; and
   at least one memory device that stores a plurality of instructions, which when executed by the at least one processor:
      cause the at least one processor to control a motion of the user object based on first performance information relating to a performance of the user object;
      cause the at least one processor to control a motion of the opponent object based on second performance information relating to a performance of the opponent object;
      cause the at least one processor to modify performance change information relating to a change of the first performance information and the second performance information based on a change command from the user or the opponent, the performance change information being associated with a target area in the virtual space;
         wherein the performance change information indicates whether the target area is a dominant area of a user team;
      cause the at least one processor to change the first performance information when the user object is located in the target area, based on whether the target area is determined to be the dominant area of the user team, based on the performance change information associated with the target area; and
      cause the at least one processor to change the second performance information when the opponent object is located in the target area, based on whether the target area is determined to be the dominant area of the user team, based on the performance change information associated with the target area;
      cause the at least one processor to cause the virtual space to be displayed on a user terminal from a viewing point and a viewing direction as a virtual display image;
      cause the at least one processor to depict the user object in the virtual space according to motion data which specifies changes in the user object posture for each of a plurality of frames associated with the motion of the user object.

2. The game system according to claim 1, wherein
the performance change information includes specifying information that indicates whether the first performance information or the second performance information is changed to be advantageous to either the user or the opponent,
the instructions cause the at least one processor to:
modify the performance change information associated with the target area to be advantageous to the user based on a change command from the user; and
modify the performance change information associated with the target area to be advantageous to the opponent based on a change command from the opponent.

3. The game system according to claim 2, wherein
the performance change information includes, as the specifying information, a first value according to the change command from the user and a second value according to the change command from the opponent,
the instructions further cause the at least one processor to:
change the first performance information in a case where the user object is located in the target area so as to increase performance of the user object, if a comparison result between the first value and the second value is a first result, and
change the second performance information in a case where the opponent object is located in the target area so as to increase performance of the opponent object if the comparison result is a second result.

4. The game system according to claim 2, wherein
the performance change information includes, as the specifying information, a first value according to the change command from the user and a second value according to the change command from the opponent,
the instructions further cause the at least one processor to:
change the first performance information when the user object is located in the target area so as to reduce performance of the user object if a comparison result between the first value and the second value is a second result; and
change the second performance information when the opponent object is located in the target area so as to reduce performance of the opponent object if the comparison result is a first result.

5. The game system according to claim 2, wherein
the performance change information includes, as the specifying information, a value that changes in response to a change command from the user and in response to a change command from the opponent,
the instructions further cause the at least one processor to:
provide a first change to the value associated with the target area in response to the change command from the user, the first change being one of an increase or a decrease;
provide a second change to the value associated with the target area in response to the change command from the opponent, the second change being the other one of the increase or the decrease;
change the first performance information in a case where the user object is located in the target area so as to increase performance of the user object if the value associated with the target area is included in a first value range; and
change the second performance information in a case where the opponent object is located in the target area so as to increase performance of the opponent object if the value associated with the target area is included in the second value range.

6. The game system according to claim 5, wherein the first value range is positive numbers.

7. The game system according to claim 2, wherein
the performance change information includes, as the specifying information, a value that changes in response to the change command from the user and in response to the change command from the opponent,
the instructions cause the at least one processor to:
provide a first change to the value associated with the target area in response to the change command from the user, the first change being one of an increase or a decrease; and
provide a second change to the value associated with the target area in response to the change command from the opponent, the second change being the other one of the increase or the decrease,
change the first performance information in a case where the user object is located in the target area so as to decrease performance of the user object if the value associated with the target area is included in the second value range; and
change the second performance information in a case where the opponent object is located in the target area so as to decrease performance of the opponent object if the value associated with the target area is included in the first value range.

8. The game system according to claim 1, wherein the instructions cause the at least one processor to:
wherein the at least one processor controls the motion of the user object by controlling the speed, accuracy, or result of the motion;
wherein the at least one processor controls the motion of the opponent object by controlling the speed, accuracy, or result of the motion.

9. The game system according to claim 1,
wherein the virtual space further comprises a ball object; and
wherein the instructions cause the at least one processor to cause the virtual space to be displayed on the user terminal such that the ball object is in in the virtual display image from the viewing point and viewing direction based on a location of the ball object in the virtual space.

10. The game system according to claim 1,
wherein the virtual space comprises a plurality of target areas;
wherein the plurality of target areas each have a performance change information for both the player and the opponent;
wherein the instructions cause the at least one processor to cause each of the plurality of target areas to be depicted based on the performance change information.

11. The game system according to claim 1, wherein the performance change information applies to each of a plurality of user objects in the target area.

12. The game system according to claim 1, wherein there are at least two momentum values associated with a target area;
wherein a first momentum value is a sum of an influence value for each of a plurality of user objects in the target area; and
wherein a second momentum value is a sum of an influence value for each of a plurality of opponent objects in the target area.

13. A game control device that executes a game in which a user and an opponent play against each other, where a user object, which is a game object used by the user, and an opponent object, which is a game object used by the opponent, move in a virtual space, the game control device comprising:
  at least one processor; and
  at least one memory device that stores a plurality of instructions, which when executed by the at least one processor:
    cause the at least one processor to control a motion of the user object based on first performance information relating to a performance of the user object;
    cause the at least one processor to control a motion of the opponent object based on second performance information relating to a performance of the opponent object;
    cause the at least one processor to modify performance change information relating to a change of the first performance information and the second performance information based on a change command from the user or the opponent, the performance change information being associated with a target area in the virtual space;
    wherein the performance change information indicates whether the target area is a dominant area of a user team;
    cause the at least one processor to change the first performance information when the user object is located in the target area, based on whether the target area is determined to be the dominant area of the user team, based on the performance change information associated with the target area; and
    cause the at least one processor to change the second performance information when the opponent object is located in the target area, based on whether the target area is determined to be the dominant area of the user team, based on the performance change information associated with the target area;
    cause the at least one processor to cause the virtual space to be displayed on a user terminal from a viewing point and a viewing direction as a virtual display image;
    cause the at least one processor to depict the user object in the virtual space according to motion data which specifies changes in the user object posture for each of a plurality of frames associated with the motion of the user object.

14. A non-transitory information storage medium having stored thereon a program for executing a game in which a user and an opponent play against each other, where a user object, which is a game object used by the user, and an opponent object, which is a game object used by the opponent, move in a virtual space, wherein the program is for:
  causing a computer to control a motion of the user object based on first performance information relating to a performance of the user object;
  causing a computer to control a motion of the opponent object based on second performance information relating to a performance of the opponent object;
  causing a computer to modify performance change information relating to a change of the first performance information and the second performance information based on a change command from the user or the opponent, the performance change information being associated with a target area in the virtual space;
  wherein the performance change information indicates whether the target area is a dominant area of a user team;
  causing a computer to change the first performance information when the user object is located in the target area, based on whether the target area is determined to be the dominant area of the user team, based on the performance change information associated with the target area; and
  causing a computer to change the second performance information when the opponent object is located in the target area, based on whether the target area is determined to be the dominant area of the user team, based on the performance change information associated with the target area;
  causing a computer to cause the virtual space to be displayed on a user terminal from a viewing point and a viewing direction as a virtual display image;
  causing a computer to depict the user object in the virtual space according to motion data which specifies changes in the user object posture for each of a plurality of frames associated with the motion of the user object.

15. A game control method in which a user and an opponent play against each other, where a user object, which is a game object used by the user, and an opponent object, which is a game object used by the opponent, move in a virtual space, the method comprising:
  controlling a motion of the user object based on first performance information relating to a performance of the user object;
  controlling a motion of the opponent object based on second performance information relating to a performance of the opponent object;
  modifying performance change information relating to a change of the first performance information and the second performance information based on a change command from the user or the opponent, the performance change information being associated with a target area in the virtual space;
  wherein the performance change information indicates whether the target area is a dominant area of a user team;
  changing the first performance information when the user object is located in the target area, based on whether the target area is determined to be the dominant area of the user team, based on the performance change information associated with the target area; and
  changing the second performance information when the opponent object is located in the target area, based on whether the target area is determined to be the dominant area of the user team, based on the performance change information associated with the target area;
  causing the virtual space to be displayed on a user terminal from a viewing point and a viewing direction as a virtual display image;
  causing the at least one processor to depict the user object in the virtual space according to motion data which specifies changes in the user object posture for each of a plurality of frames associated with the motion of the user object.

* * * * *